US012461496B2

(12) United States Patent
Ersavas et al.

(10) Patent No.: US 12,461,496 B2
(45) **Date of Patent: *Nov. 4, 2025**

(54) METHODS AND SYSTEMS FOR IRRIGATION AND CLIMATE CONTROL

(71) Applicant: Rain Bird Corporation, Azusa, CA (US)

(72) Inventors: Pelin Ersavas, Montrose, CA (US); Bulut F. Ersavas, Montrose, CA (US); Semih Pekol, Istanbul (TR); Thomas Devol, Chico, CA (US)

(73) Assignee: Rain Bird Corporation, Azusa, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/372,807

(22) Filed: Sep. 26, 2023

(65) Prior Publication Data

US 2024/0012375 A1 Jan. 11, 2024

Related U.S. Application Data

(63) Continuation of application No. 17/493,329, filed on Oct. 4, 2021, now Pat. No. 11,768,472, which is a (Continued)

(51) Int. Cl.

| | |
|---|---|
| ***G05B 15/02*** | (2006.01) |
| ***A01G 25/16*** | (2006.01) |
| ***G05B 19/042*** | (2006.01) |

(52) U.S. Cl.

CPC ............. *G05B 15/02* (2013.01); *A01G 25/16* (2013.01); *G05B 19/0426* (2013.01);

(Continued)

(58) Field of Classification Search

CPC ................ G05B 15/02; G05B 19/0426; G05B 2219/23109; G05B 2219/25167;

(Continued)

(56) References Cited

U.S. PATENT DOCUMENTS

| | | | |
|---|---|---|---|
| 1,001,593 | A | 8/1911 | Hertzberg |
| 5,479,339 | A | 12/1995 | Miller |

(Continued)

FOREIGN PATENT DOCUMENTS

| | | | |
|---|---|---|---|
| CN | 101021729 A | | 8/2007 |
| EP | 1798907 | | 6/2007 |

(Continued)

OTHER PUBLICATIONS

'PureSense on-line help', https://www.pserm.com/IrrigationManagerHelp/PureSense_Irrigation_Manager.htm, Mar. 24, 2010; 36 pages.

(Continued)

*Primary Examiner* — Adnan Aziz

(74) *Attorney, Agent, or Firm* — Fitch, Even, Tabin & Flannery, LLP

(57) ABSTRACT

Methods and systems are provided for monitoring and controlling irrigation and climate conditions in landscapes (such as, e.g., municipal parks, gardens, and sports fields) and agricultural environments (such as, e.g., open agricultural fields, greenhouses, and other sites growing crops).

20 Claims, 52 Drawing Sheets

Related U.S. Application Data continuation of application No. 15/616,736, filed on Jun. 7, 2017, now Pat. No. 11,163,274, which is a continuation of application No. 13/844,304, filed on Mar. 15, 2013, now Pat. No. 9,703,275, which is a continuation-in-part of application No. 13/532,557, filed on Jun. 25, 2012, now Pat. No. 9,829,869.

(60) Provisional application No. 61/500,392, filed on Jun. 23, 2011.

(52) U.S. Cl.
CPC .............. *G05B 2219/23109* (2013.01); *G05B 2219/25167* (2013.01); *G05B 2219/25168* (2013.01); *G05B 2219/2625* (2013.01)

(58) Field of Classification Search
CPC .. G05B 2219/25168; G05B 2219/2625; A01G 25/16; G06Q 50/02
See application file for complete search history.

(56) References Cited

U.S. PATENT DOCUMENTS

| | | | |
|---|---|---|---|
| 5,621,669 | A | 4/1997 | Bjornsson |
| 5,714,931 | A | 2/1998 | Petite |
| 5,740,031 | A | 4/1998 | Gagnon |
| 5,926,531 | A | 7/1999 | Petite |
| 6,028,522 | A | 2/2000 | Petite |
| 6,061,603 | A | 5/2000 | Papadopoulos |
| 6,079,433 | A | 6/2000 | Saarem |
| 6,098,898 | A | 8/2000 | Storch |
| 6,218,953 | B1 | 4/2001 | Petite |
| 6,233,327 | B1 | 5/2001 | Petite |
| 6,430,268 | B1 | 8/2002 | Petite |
| 6,437,692 | B1 | 8/2002 | Petite |
| 6,529,589 | B1 | 3/2003 | Nelson |
| 6,553,336 | B1 | 4/2003 | Johnson |
| 6,600,971 | B1 | 7/2003 | Smith |
| 6,618,578 | B1 | 9/2003 | Petite |
| 6,628,764 | B1 | 9/2003 | Petite |
| 6,671,586 | B2 | 12/2003 | Davis |
| 6,708,084 | B2 | 3/2004 | Battistutto |
| 6,747,557 | B1 | 6/2004 | Petite |
| 6,782,310 | B2 | 8/2004 | Bailey |
| 6,784,807 | B2 | 8/2004 | Petite |
| 6,792,323 | B2 | 9/2004 | Krzyzanowski |
| 6,823,239 | B2 | 11/2004 | Sieminski |
| 6,836,737 | B2 | 12/2004 | Petite |
| 6,853,883 | B2 | 2/2005 | Kreikemeier |
| 6,862,498 | B2 | 3/2005 | Davis |
| 6,874,707 | B2 | 4/2005 | Skinner |
| 6,891,838 | B1 | 5/2005 | Petite |
| 6,892,114 | B1 | 5/2005 | Addink |
| 6,895,987 | B2 | 5/2005 | Addink |
| 6,898,467 | B1 | 5/2005 | Smith |
| 6,914,533 | B2 | 7/2005 | Petite |
| 6,914,893 | B2 | 7/2005 | Petite |
| 6,938,834 | B2 | 9/2005 | Harris |
| 6,947,810 | B2 | 9/2005 | Skinner |
| 6,950,728 | B1 | 9/2005 | Addink |
| 6,963,808 | B1 | 11/2005 | Addink |
| 6,978,794 | B2 | 12/2005 | Dukes |
| 6,997,642 | B2 | 2/2006 | Bishop |
| 7,003,357 | B1 | 2/2006 | Kreikemeier |
| 7,010,395 | B1 | 3/2006 | Goldberg |
| 7,010,396 | B2 | 3/2006 | Ware |
| 7,012,394 | B2 | 3/2006 | Moore |
| 7,019,667 | B2 | 3/2006 | Petite |
| 7,024,256 | B2 | 4/2006 | Krzyzanowski |
| 7,053,767 | B2 | 5/2006 | Petite |
| 7,058,478 | B2 | 6/2006 | Alexanian |
| 7,063,270 | B2 | 6/2006 | Bowers |
| 7,069,115 | B1 | 6/2006 | Woytowitz |
| 7,079,810 | B2 | 7/2006 | Petite |
| 7,103,511 | B2 | 9/2006 | Petite |
| 7,123,993 | B1 | 10/2006 | Freeman |
| 7,133,749 | B2 | 11/2006 | Goldberg |
| 7,137,550 | B1 | 11/2006 | Petite |
| 7,146,254 | B1 | 12/2006 | Howard |
| 7,172,366 | B1 | 2/2007 | Bishop |
| 7,181,319 | B1 | 2/2007 | Woytowtiz |
| 7,182,272 | B1 | 2/2007 | Marian |
| 7,184,848 | B2 | 2/2007 | Krzyzanowski |
| 7,184,861 | B2 | 2/2007 | Petite |
| 7,209,840 | B2 | 4/2007 | Petite |
| 7,250,860 | B2 | 7/2007 | Smith |
| 7,263,073 | B2 | 8/2007 | Petite |
| 7,266,428 | B2 | 9/2007 | Alexanian |
| 7,295,128 | B2 | 11/2007 | Petite |
| 7,305,280 | B2 | 12/2007 | Marian |
| 7,328,089 | B2 | 2/2008 | Curren |
| 7,330,796 | B2 | 2/2008 | Addink |
| 7,339,957 | B2 | 3/2008 | Hitt |
| 7,346,463 | B2 | 3/2008 | Petite |
| 7,397,907 | B2 | 7/2008 | Petite |
| 7,403,840 | B2 | 7/2008 | Moore |
| 7,424,527 | B2 | 9/2008 | Petite |
| 7,468,661 | B2 | 12/2008 | Petite |
| 7,480,501 | B2 | 1/2009 | Petite |
| 7,487,925 | B2 | 2/2009 | Skinner |
| 7,546,181 | B2 | 6/2009 | Vidovich |
| 7,567,858 | B1 | 7/2009 | Dunlap |
| 7,574,284 | B2 | 8/2009 | Goldberg |
| 7,584,023 | B1 | 9/2009 | Palmer |
| 7,596,429 | B2 | 9/2009 | Cardinal |
| 7,619,322 | B2 | 11/2009 | Gardner |
| 7,643,823 | B2 | 1/2010 | Shamoon |
| 7,650,425 | B2 | 1/2010 | Davis |
| 7,668,532 | B2 | 2/2010 | Shamoon |
| 7,668,990 | B2 | 2/2010 | Krzyzanowski |
| 7,697,492 | B2 | 4/2010 | Petite |
| 7,711,454 | B2 | 5/2010 | Addink |
| 7,711,796 | B2 | 5/2010 | Gutt |
| 7,719,432 | B1 | 5/2010 | Hill |
| 7,738,999 | B2 | 6/2010 | Petite |
| 7,739,378 | B2 | 6/2010 | Petite |
| 7,756,086 | B2 | 7/2010 | Petite |
| 7,844,368 | B2 | 11/2010 | Alexanian |
| 7,844,369 | B2 | 11/2010 | Nickerson |
| 7,870,080 | B2 | 1/2011 | Budike, Jr. |
| 7,877,168 | B1 | 1/2011 | Porter |
| 7,883,027 | B2 | 2/2011 | Fekete |
| 7,899,580 | B2 | 3/2011 | Cardinal |
| 7,911,341 | B2 | 3/2011 | Raji |
| 7,930,069 | B2 | 4/2011 | Savelle |
| 7,933,945 | B2 | 4/2011 | Krzyzanowski |
| 7,953,517 | B1 | 5/2011 | Porter |
| 7,962,101 | B2 | 6/2011 | Vaswani |
| 7,962,244 | B2 | 6/2011 | Alexanian |
| 7,978,059 | B2 | 7/2011 | Petite |
| 7,996,115 | B2 | 8/2011 | Nickerson |
| 8,013,732 | B2 | 9/2011 | Petite |
| 8,019,482 | B2 | 9/2011 | Sutardja |
| 8,024,075 | B2 | 9/2011 | Fekete |
| 8,031,650 | B2 | 10/2011 | Petite |
| 8,042,049 | B2 | 10/2011 | Killian |
| 8,055,389 | B2 | 11/2011 | Holindrake |
| 8,064,412 | B2 | 11/2011 | Petite |
| 8,064,935 | B2 | 11/2011 | Shamoon |
| 8,104,993 | B2 | 1/2012 | Hitt |
| 8,116,889 | B2 | 2/2012 | Krzyzanowski |
| 8,145,360 | B2 | 3/2012 | Brundisini |
| 8,171,136 | B2 | 5/2012 | Petite |
| 8,193,930 | B2 | 6/2012 | Petite |
| 8,196,064 | B2 | 6/2012 | Krzyzanowski |
| 8,209,061 | B2 | 6/2012 | Palmer |
| 8,212,667 | B2 | 7/2012 | Petite |
| 8,214,496 | B2 | 7/2012 | Gutt |
| 8,219,254 | B2 | 7/2012 | O'Connor |
| 8,219,935 | B2 | 7/2012 | Hunts |
| 8,223,010 | B2 | 7/2012 | Petite |
| 8,224,493 | B2 | 7/2012 | Walker |
| 8,225,810 | B2 | 7/2012 | Blanchard |

(56) References Cited

U.S. PATENT DOCUMENTS 8,244,404 B2 8/2012 Nickerson
8,265,797 B2 9/2012 Nickerson
8,301,309 B1 10/2012 Woytoxitz
8,326,440 B2 12/2012 Christfort
8,335,304 B2 12/2012 Petite
8,335,842 B2 12/2012 Raji
8,374,726 B2 2/2013 Holindrake
8,379,564 B2 2/2013 Petite
8,396,606 B2 3/2013 Forbes, Jr.
8,401,705 B2 3/2013 Alexanian
8,410,931 B2 4/2013 Petite
8,412,382 B2 4/2013 Imes
8,417,390 B2 4/2013 Nickerson
8,433,448 B2 4/2013 Walker
8,437,879 B2 5/2013 Anderson
8,446,884 B2 5/2013 Petite
8,447,843 B2 5/2013 Johnson
8,457,798 B2 6/2013 Hackett
8,478,871 B2 7/2013 Gutt
8,494,683 B2 7/2013 Piper
8,516,087 B2 8/2013 Wilson
8,527,549 B2 9/2013 Cidon
8,528,834 B2 9/2013 Skinner
8,538,592 B2 9/2013 Alexanian
8,548,632 B1 10/2013 Porter
8,565,904 B2 10/2013 Kantor
8,600,569 B2 12/2013 Woytowitz
8,606,415 B1 12/2013 Woytowitz
8,620,480 B2 12/2013 Alexanian
8,620,481 B2 12/2013 Holindrake
8,630,743 B2 1/2014 Marsters
8,635,350 B2 1/2014 Gutt
8,649,907 B2 2/2014 Ersavas
8,650,069 B2 2/2014 Mason, Sr.
8,660,705 B2 2/2014 Woytowitz
8,700,222 B1 4/2014 Woytowitz
8,712,592 B2 4/2014 Carlson
8,738,188 B2 5/2014 Nickerson
8,738,189 B2 5/2014 Alexanian
8,739,830 B2 6/2014 Bradbury
8,751,052 B1 6/2014 Campbell
8,793,024 B1 7/2014 Woytowitz
8,812,007 B2 8/2014 Hitt
8,839,135 B2 9/2014 Vander Griend
8,849,461 B2 9/2014 Ersavas
8,862,277 B1 10/2014 Campbell
8,880,204 B2 11/2014 Frei
8,890,505 B2 11/2014 Forbes, Jr.
8,924,587 B2 12/2014 Petite
8,924,588 B2 12/2014 Petite
8,924,891 B2 12/2014 Hunts
8,930,032 B2 1/2015 Shupe
8,948,921 B2 2/2015 Halahan
8,977,400 B1 3/2015 Porter
8,996,183 B2 3/2015 Forbes, Jr.
9,032,998 B2 5/2015 O'Brien
9,043,036 B2 5/2015 Fekete
9,069,337 B2 6/2015 Forbes, Jr.
9,130,402 B2 9/2015 Forbes, Jr.
9,131,642 B2 9/2015 Groeneveld
9,149,013 B2 10/2015 Andrews
9,183,163 B2 11/2015 Frei
9,192,110 B2 11/2015 Standerfer
9,201,815 B2 12/2015 Frei
9,208,676 B2 12/2015 Fadell
9,241,451 B2 1/2016 Ersavas
9,288,102 B2 3/2016 Sobhy
9,301,460 B2 4/2016 Runge
9,348,338 B2 5/2016 Nickerson
9,425,978 B2 8/2016 Frei
9,602,655 B2 3/2017 Shamoon
9,678,485 B2 6/2017 Malaugh
9,703,275 B2 7/2017 Ersavas
9,704,122 B2 7/2017 Jung
9,733,274 B2 8/2017 Pietrowicz
9,756,797 B2 9/2017 Sarver
9,763,393 B2 9/2017 Parsons
9,766,609 B2 9/2017 Kah, Jr.
9,781,887 B2 10/2017 Woytowitz
9,800,463 B2 10/2017 Imes
9,814,190 B1 11/2017 Stange
9,829,869 B2 11/2017 Ersavas
9,832,939 B2 12/2017 Russell
9,872,445 B2 1/2018 Cline
10,301,020 B2 5/2019 Jones
10,362,739 B2 7/2019 Ersavas
10,716,269 B2 7/2020 Ersavas
11,064,664 B2 7/2021 Ersavas
11,163,274 B2 11/2021 Ersavas
11,178,829 B2 11/2021 Cline
11,277,714 B2 3/2022 Griggs
11,281,240 B1 3/2022 Eyring
11,510,373 B2 11/2022 Blejer
11,768,472 B2 9/2023 Ersavas
2001/0002210 A1 5/2001 Petite
2001/0024163 A1 9/2001 Petite
2002/0012323 A1 1/2002 Petite
2002/0013679 A1 1/2002 Petite
2002/0019712 A1 2/2002 Petite
2002/0019725 A1 2/2002 Petite
2002/0027504 A1 3/2002 Davis
2002/0031101 A1 3/2002 Petite
2002/0109608 A1 8/2002 Petite
2002/0125998 A1 9/2002 Petite
2002/0169643 A1 11/2002 Petite
2003/0036810 A1 2/2003 Petite
2003/0036822 A1 2/2003 Davis
2003/0067889 A1 4/2003 Petite
2003/0078029 A1 4/2003 Petite
2003/0093159 A1 5/2003 Sieminski
2003/0093484 A1 5/2003 Petite
2003/0179102 A1 9/2003 Barnes
2004/0039489 A1 2/2004 Moore
2004/0053639 A1 3/2004 Petite
2004/0088083 A1 5/2004 Davis
2004/0100394 A1 5/2004 Hitt
2004/0183687 A1 9/2004 Petite
2005/0030199 A1 2/2005 Petite
2005/0043059 A1 2/2005 Petite
2005/0043860 A1 2/2005 Petite
2005/0190055 A1 9/2005 Petite
2005/0195768 A1 9/2005 Petite
2005/0195775 A1 9/2005 Petite
2005/0201397 A1 9/2005 Petite
2005/0216580 A1 9/2005 Raji
2005/0243867 A1 11/2005 Petite
2006/0161309 A1 7/2006 Moore
2006/0181406 A1 8/2006 Petite
2006/0217934 A1 * 9/2006 Armstrong ............ G08B 21/20
702/188
2006/0282467 A1 12/2006 Peterson
2007/0016334 A1 1/2007 Smith
2007/0088462 A1 4/2007 Peleg
2007/0135973 A1 6/2007 Petite
2007/0140274 A1 6/2007 Battistutto
2007/0191991 A1 8/2007 Addink
2007/0208521 A1 9/2007 Petite
2007/0239317 A1 10/2007 Bogolea
2007/0286210 A1 12/2007 Gutt
2007/0286369 A1 12/2007 Gutt
2007/0293990 A1 12/2007 Alexanain
2008/0051036 A1 2/2008 Vaswani
2008/0097653 A1 4/2008 Kaprielian
2008/0119948 A1 5/2008 O'Connor
2008/0136620 A1 6/2008 Lee
2008/0147205 A1 6/2008 Ollis
2008/0157995 A1 7/2008 Crist
2008/0180240 A1 7/2008 Raji
2008/0183842 A1 7/2008 Raji
2008/0199359 A1 8/2008 Davis
2009/0006617 A1 1/2009 Petite
2009/0007706 A1 1/2009 Hitt
2009/0068947 A1 3/2009 Petite
2009/0094097 A1 4/2009 Gardenswartz

(56) References Cited

U.S. PATENT DOCUMENTS

| | | | |
|---|---|---|---|
| 2009/0096605 | A1 | 4/2009 | Petite |
| 2009/0099701 | A1 | 4/2009 | Li |
| 2009/0145974 | A1 | 6/2009 | Fekete |
| 2009/0150001 | A1 | 6/2009 | Fekete |
| 2009/0150002 | A1 | 6/2009 | Fekete |
| 2009/0168678 | A1 | 7/2009 | Han |
| 2009/0177330 | A1 | 7/2009 | Kah |
| 2009/0204265 | A1 | 8/2009 | Hackett |
| 2009/0215424 | A1 | 8/2009 | Petite |
| 2009/0216345 | A1 | 8/2009 | Christfort |
| 2009/0217189 | A1 | 8/2009 | Martin |
| 2009/0217194 | A1 | 8/2009 | Martin |
| 2009/0223128 | A1 | 9/2009 | Kuschak |
| 2009/0243840 | A1 | 10/2009 | Petite |
| 2009/0276102 | A1 | 11/2009 | Smith |
| 2009/0277506 | A1 | 11/2009 | Bradbury |
| 2009/0281672 | A1 | 11/2009 | Pourzia |
| 2009/0302870 | A1 | 12/2009 | Paterson |
| 2009/0326723 | A1 | 12/2009 | Moore |
| 2009/0328176 | A1 | 12/2009 | Martin |
| 2010/0038440 | A1 | 2/2010 | Ersavas |
| 2010/0082744 | A1 | 4/2010 | Raji |
| 2010/0095111 | A1 | 4/2010 | Gutt |
| 2010/0095369 | A1 | 4/2010 | Gutt |
| 2010/0109685 | A1 | 5/2010 | Morton |
| 2010/0147389 | A1 | 6/2010 | Blanchard |
| 2010/0152909 | A1 | 6/2010 | Hitt |
| 2010/0179701 | A1 | 7/2010 | Gilbert |
| 2010/0194582 | A1 | 8/2010 | Petite |
| 2010/0198712 | A1 | 8/2010 | Benisti |
| 2010/0222932 | A1 | 9/2010 | O'Connor |
| 2010/0250054 | A1 | 9/2010 | Petite |
| 2010/0251807 | A1 | 10/2010 | Morton |
| 2010/0256827 | A1 | 10/2010 | Bragg |
| 2010/0265909 | A1 | 10/2010 | Petite |
| 2010/0289411 | A1 | 11/2010 | Smits |
| 2010/0312881 | A1 | 12/2010 | Davis |
| 2010/0324987 | A1 | 12/2010 | Benisti |
| 2010/0325005 | A1 | 12/2010 | Benisti |
| 2011/0035059 | A1* | 2/2011 | Ersavas ................ A01G 25/167 455/466 |
| 2011/0043230 | A1 | 2/2011 | Morton |
| 2011/0093123 | A1 | 4/2011 | Alexanian |
| 2011/0111700 | A1 | 5/2011 | Hackett |
| 2011/0190947 | A1 | 8/2011 | Savelle |
| 2011/0190948 | A1 | 8/2011 | Fekete |
| 2011/0212700 | A1 | 9/2011 | Petite |
| 2011/0238228 | A1 | 9/2011 | Woytowitz |
| 2011/0264324 | A1 | 10/2011 | Petite |
| 2011/0270448 | A1 | 11/2011 | Kantor |
| 2011/0301767 | A1 | 12/2011 | Alexanian |
| 2011/0309953 | A1 | 12/2011 | Petite |
| 2011/0310929 | A1 | 12/2011 | Petite |
| 2011/0320050 | A1 | 12/2011 | Petite |
| 2012/0041606 | A1 | 2/2012 | Standerfer |
| 2012/0072036 | A1 | 3/2012 | Piper |
| 2012/0072037 | A1 | 3/2012 | Alexanian |
| 2012/0075092 | A1 | 3/2012 | Petite |
| 2012/0078425 | A1 | 3/2012 | Gardenswartz |
| 2012/0084115 | A1 | 4/2012 | Cline |
| 2012/0092154 | A1 | 4/2012 | Petite |
| 2012/0095604 | A1 | 4/2012 | Alexanian |
| 2012/0109387 | A1 | 5/2012 | Martin |
| 2012/0190386 | A1* | 7/2012 | Anderson ............... G01S 19/14 455/456.3 |
| 2012/0191261 | A1 | 7/2012 | Nickerson |
| 2012/0203383 | A1 | 8/2012 | Holindrake |
| 2012/0214532 | A1 | 8/2012 | Petite |
| 2012/0221154 | A1 | 8/2012 | Runge |
| 2012/0221718 | A1 | 8/2012 | Imes |
| 2012/0239807 | A1 | 9/2012 | Davis |
| 2012/0239808 | A1 | 9/2012 | Davis |
| 2012/0253529 | A1 | 10/2012 | Carlson |
| 2012/0266095 | A1 | 10/2012 | Killian |
| 2012/0273704 | A1 | 11/2012 | O'Connor |
| 2012/0290139 | A1 | 11/2012 | Brundisini |
| 2012/0290140 | A1 | 11/2012 | Groeneveld |
| 2012/0303168 | A1 | 11/2012 | Halahan |
| 2013/0048746 | A1 | 2/2013 | Littrell |
| 2013/0060389 | A1 | 3/2013 | Marsters |
| 2013/0085619 | A1 | 4/2013 | Howard |
| 2013/0110293 | A1 | 5/2013 | Illig |
| 2013/0116837 | A1 | 5/2013 | Malaugh |
| 2013/0131874 | A1 | 5/2013 | Shupe |
| 2013/0145482 | A1* | 6/2013 | Ricci .......................... B60R 7/04 726/28 |
| 2013/0162390 | A1 | 6/2013 | Ersavas |
| 2013/0190934 | A1 | 7/2013 | Holindrake |
| 2013/0274932 | A1 | 10/2013 | Curren |
| 2013/0310992 | A1 | 11/2013 | Larsen |
| 2013/0318231 | A1 | 11/2013 | Raji |
| 2014/0005810 | A1 | 1/2014 | Frei |
| 2014/0005843 | A1 | 1/2014 | Thomas |
| 2014/0005851 | A1 | 1/2014 | Frei |
| 2014/0006506 | A1 | 1/2014 | Frei |
| 2014/0018965 | A1 | 1/2014 | Pearson |
| 2014/0039696 | A1 | 2/2014 | Andrews |
| 2014/0081471 | A1 | 3/2014 | Woytowitz |
| 2014/0088770 | A1 | 3/2014 | Masters |
| 2014/0129039 | A1 | 5/2014 | Olive-Chahinian |
| 2014/0136286 | A1* | 5/2014 | Hovis .................. G09B 29/106 705/7.34 |
| 2014/0143397 | A1 | 5/2014 | Gutt |
| 2014/0172180 | A1 | 6/2014 | Woytowitz |
| 2014/0222223 | A1 | 8/2014 | Horton |
| 2014/0229024 | A1 | 8/2014 | Wang |
| 2014/0236868 | A1 | 8/2014 | Cook |
| 2014/0245160 | A1 | 8/2014 | Bauer |
| 2016/0057949 | A1 | 3/2016 | Williams |
| 2021/0360884 | A1 | 11/2021 | Woytowitz |
| 2022/0012823 | A1 | 1/2022 | Klein |
| 2022/0023894 | A1 | 1/2022 | Wright, III |

FOREIGN PATENT DOCUMENTS

| | | | |
|---|---|---|---|
| ES | 2209614 | A1 | 6/2004 |
| WO | 1999039567 | | 8/1999 |
| WO | 0235193 | A2 | 5/2002 |
| WO | 2007104152 | A2 | 9/2007 |
| WO | 2009132425 | A1 | 11/2009 |
| WO | 2010019109 | | 2/2010 |

OTHER PUBLICATIONS

Akyildiz et al., "Wireless sensor networks: a survey," Computer Networks 38 (2002) pp. 393-422.

Intel, "Instrumenting the World: An Introduction to Wireless Sensor Networks," Version 1, Feb. 2004; 6 pages.

Li, "Study on Precision Agriculture Monitoring Framework Based on WSN," Anti-counterfeiting, Security, and Identification, 2nd International Conference, 2008, pp. 182-185.

Nokia, "Machine-to-Machine," White Paper (2004); 10 pages.

PCT; App. No. PCT/TR2009/000103; International Report on Patentability mailed Feb. 24, 2011; 6 pages.

PCT; App. No. PCT/TR2009/000103; International Search Report mailed Feb. 1, 2010; 4 pages.

PCT; App. No. PCT/TR2009/000103; Written Opinion mailed Feb. 12, 2011; 5 pages.

U.S. Appl. No. 13/844,304; Office Action mailed Oct. 16, 2015; 16 pages.

U.S. Appl. No. 13/151,269; Office Action mailed Jan. 18, 2012; (29 pages).

U.S. Appl. No. 13/532,557; Notice of Allowance mailed Apr. 4, 2017; 7 pages.

U.S. Appl. No. 13/532,557; Notice of Allowance mailed Jul. 31, 2017; (pp. 1-8).

U.S. Appl. No. 13/532,557; Office Action mailed Sep. 9, 2016; 15 pages.

U.S. Appl. No. 13/532,557; Office Action mailed Jan. 2, 2015; 15 pages.

(56) References Cited

OTHER PUBLICATIONS

U.S. Appl. No. 13/532,557; Office Action mailed Oct. 15, 2015; 16 pages.
U.S. Appl. No. 13/844,304; Notice of Allowance mailed Mar. 6, 2017; 7 pages.
U.S. Appl. No. 13/844,304; Office Action mailed Oct. 3, 2016; 16 pages.
U.S. Appl. No. 13/844,304; Office Action mailed Dec. 30, 2014; 16 pages.
U.S. Appl. No. 15/616,736; Notice of Allowance mailed Jun. 24, 2021; 5 pages.
U.S. Appl. No. 15/616,736; Office Action mailed Feb. 1, 2021; 16 pages.
U.S. Appl. No. 15/616,736; Office Action mailed Feb. 20, 2020; 15 pages.
U.S. Appl. No. 15/616,736; Office Action mailed May 29, 2019; 16 pages.
U.S. Appl. No. 17/493,329; Non-Final Rejection mailed Oct. 24, 2022; (pp. 1-18).
U.S. Appl. No. 17/493,329; Notice of Allowance and Fees Due (PTOL-85) mailed May 10, 2023; (pp. 1-5).
Zigbee, 'Zigbee Resource Guide—Spring 2008,' 2008, pp. 28-31, Fourier Systems Ltd., New Albany, IN.
Zigbee; 'Zigbee Resource Guide—Spring 2008;' 2008; pp. 1-32; Fourier Systems Ltd.; New Albany, IN.

* cited by examiner

Main: Dashboard

Menu: Data->Charts

Menu: Data->Crop Health Monitor

Menu: Data->Degree Days Calculation

Menu: Data->Reports

Menu: Data->Repair Readings

Menu: Data->Notepad

Menu: Data->Maps

Figure 11: Control Process Flow

| Date | T-low °F | T-high °F | DD-day | DD-cum | Gen | Stag |
|---|---|---|---|---|---|---|
| 05/18/2011 | 50.43 | 75.7 | 11.05 | 2165.18 | 3 | larva |
| 05/17/2011 | 48.78 | 73.71 | 10.06 | 2154.13 | 3 | larva |
| 05/16/2011 | 44.89 | 77.97 | 12.19 | 2144.07 | 3 | larva |
| 05/15/2011 | 44.37 | 75.72 | 11.07 | 2131.88 | 3 | larva |
| 05/14/2011 | 46.72 | 80.19 | 13.3 | 2120.81 | 3 | larva |
| 05/13/2011 | 46.71 | 77.74 | 12.06 | 2107.51 | 3 | larva |
| 05/12/2011 | 48.16 | 82.36 | 14.38 | 2095.45 | 3 | larva |
| 05/11/2011 | 49.53 | 77.81 | 12.01 | 2081.07 | 3 | larva |
| 05/10/2011 | 43.81 | 76.03 | 11.21 | 2069.06 | 3 | larva |
| 05/09/2011 | 46.07 | 78.46 | 12.42 | 2057.85 | 3 | larva |
| 05/08/2011 | 48.81 | 73.87 | 10.13 | 2045.43 | 3 | larva |
| 05/07/2011 | 49.84 | 74.98 | 10.69 | 2035.3 | 3 | larva |
| 05/06/2011 | 47.84 | 74.62 | 10.51 | 2024.6 | 3 | larva |
| 05/05/2011 | 49.42 | 98.37 | 22.37 | 2014.09 | 3 | larva |
| 05/04/2011 | 46.98 | 101.17 | 23.8 | 1991.72 | 3 | larva |
| 05/03/2011 | 48.15 | 80.38 | 13.39 | 1967.92 | 3 | larva |
| 05/02/2011 | 43.95 | 98.55 | 21.47 | 1954.53 | 3 | larva |
| 05/01/2011 | 41.2 | 93.42 | 19.91 | 1933.06 | 3 | larva |

Irrigation Monitor Portlet

Soil Status

| Soil Status | Station | Water Bank | Est. Next Irrig. |
|---|---|---|---|
| | [1] Del Rey | 82% | 5.2 days (Fri, April 23) |
| | [2] El Dorado | 90% | 8.5 days (Tue., May 31) |
| | [3] ZoneA | [illegible] | 3 day (Mon., Apr. 22) |
| | [4] ZoneB | 48% | 1 day (Tue., Apr. 31) |

Irrigation Status

| Status | Valve/Switch | Last Irrigation | Duration | Amount |
|---|---|---|---|---|
| ON | [1] Del Rey | 2011-06-11 9:30am | 110 min. | 1200 gal. |
| ON | [2] El Dorado | 2011-06-11 9:40am | 100 min. | 1000 gal. |
| OFF | [3] ZoneA | 2011-06-07 7:00pm | 130 min. | 1300 gal. |
| OFF | [4] ZoneB | 2011-06-10 9:30am | 210 min. | 2100 gal. |

FIG. 46

FIG. 47: Control Element Definition Page
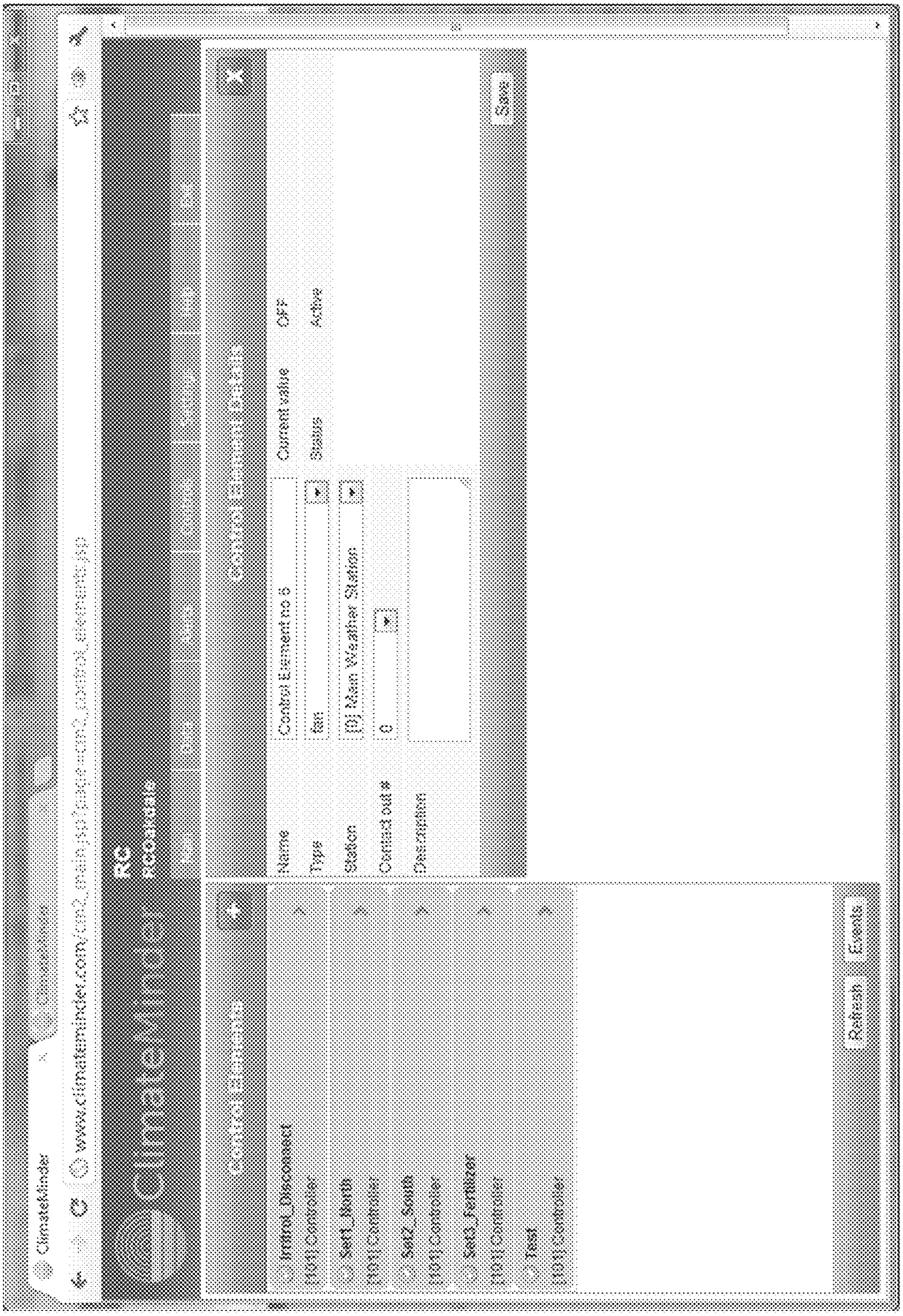

FIG. 48: Control Element Details Page (showing log of control events on this particular control element)
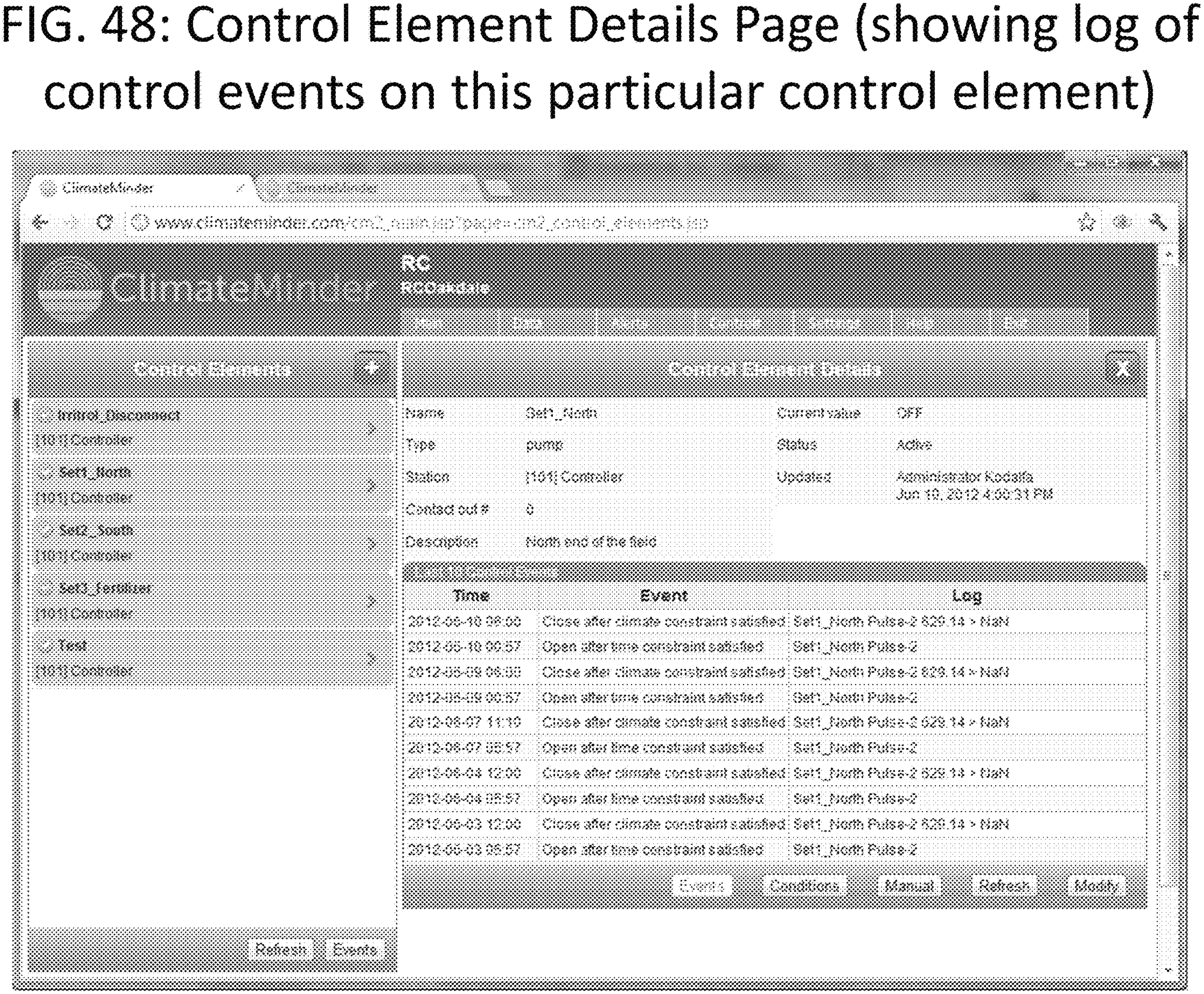

FIG. 49A : Control Element Page (Seen on a Mobile Device)
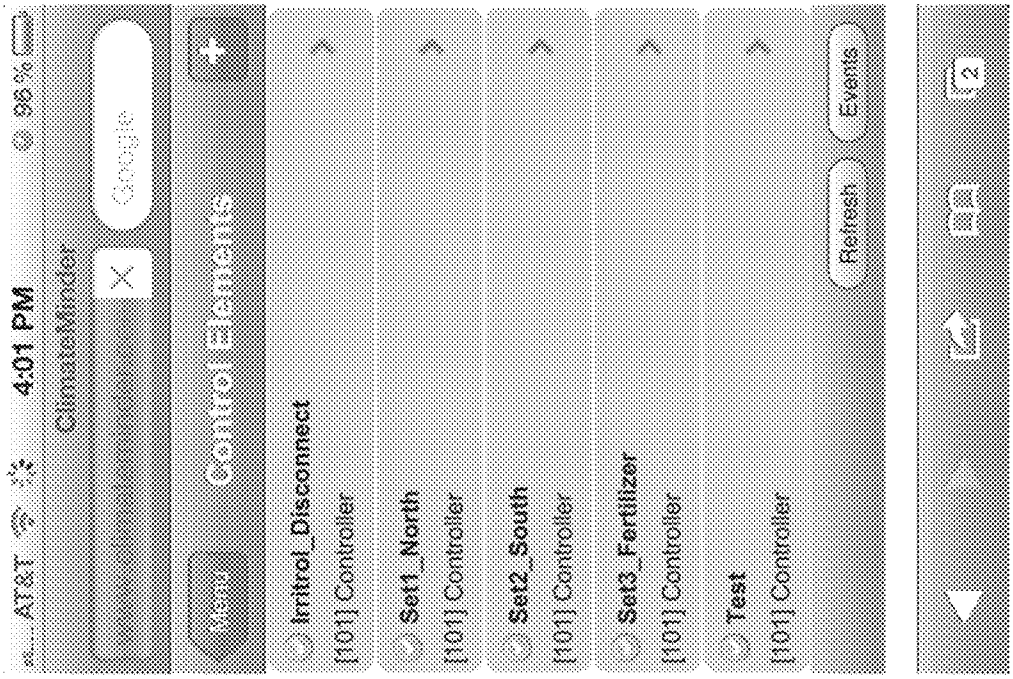
FIG. 49B : Control Element Page (Seen on a Mobile Device)
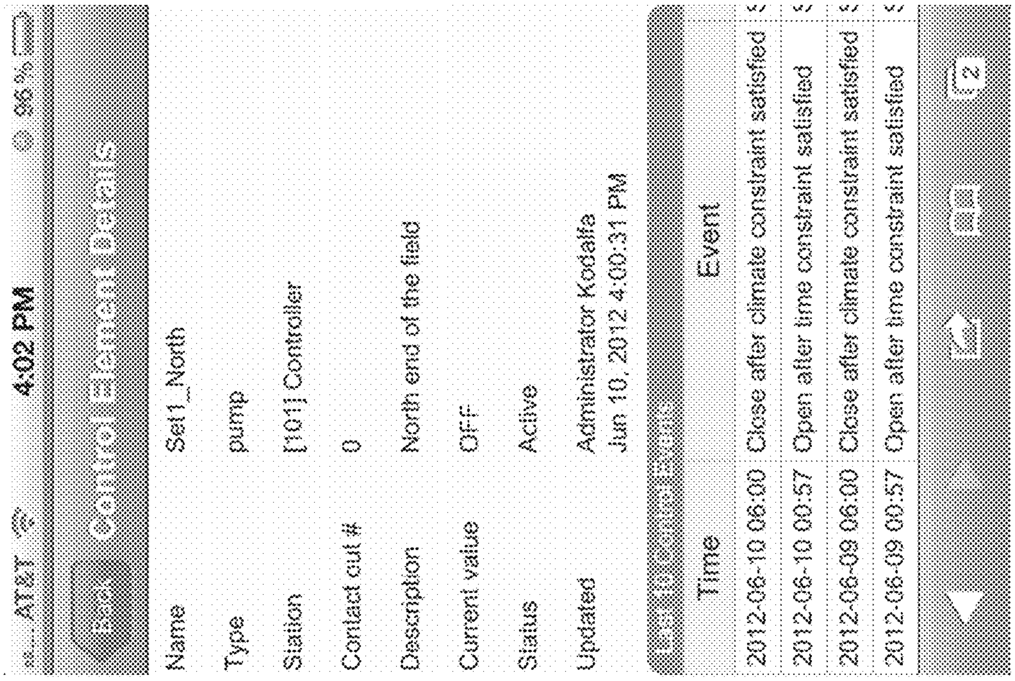

FIG. 50: Control Events Page
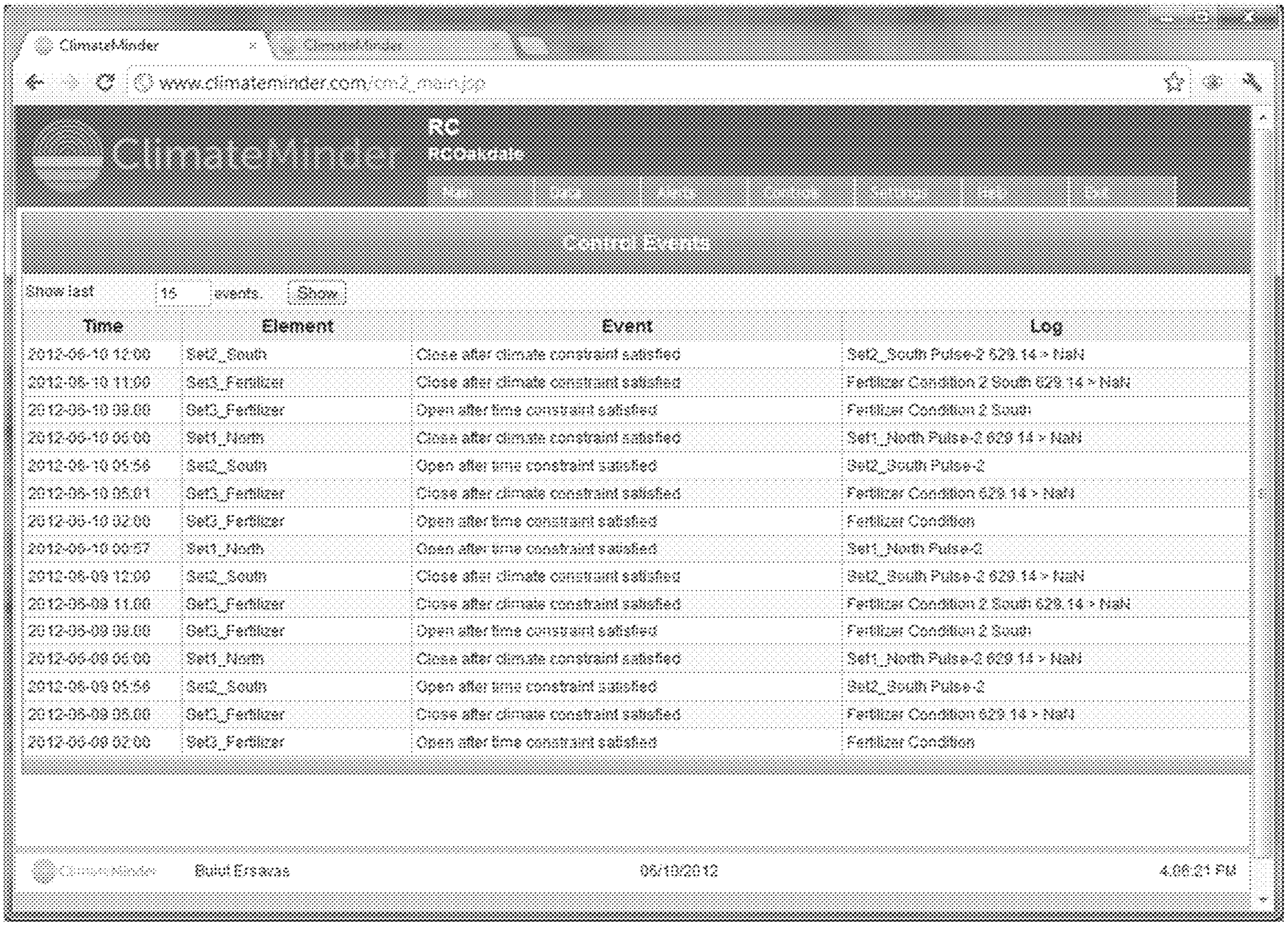

FIG. 51: Control Conditions Details Page

FIG. 52A: Control Conditions Page (Seen on a Mobile Device)
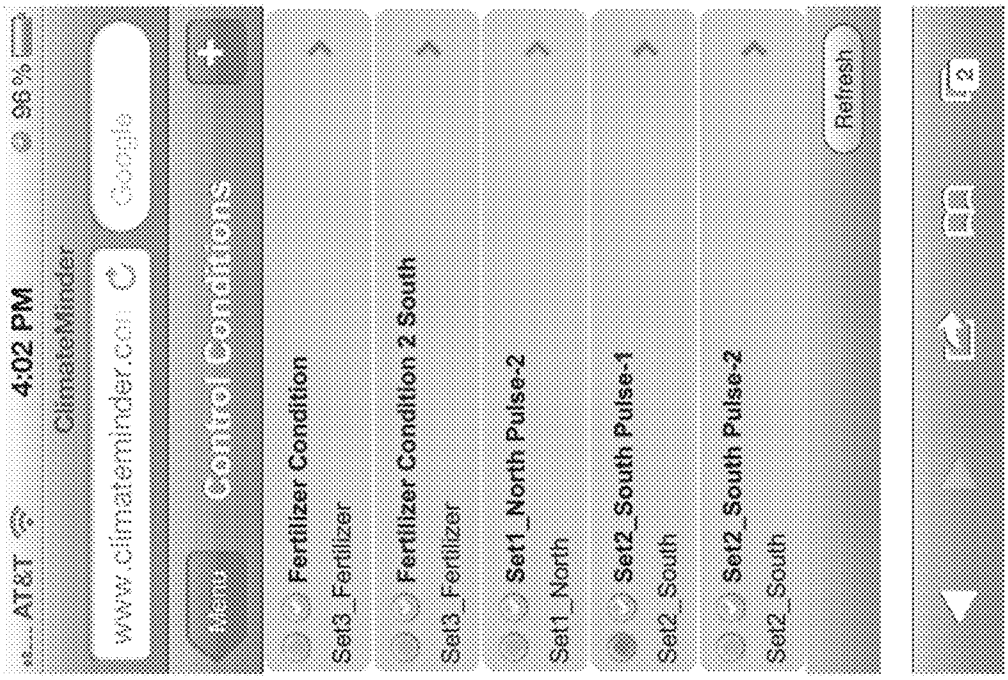
FIG. 52B: Control Conditions Page (Seen on a Mobile Device)
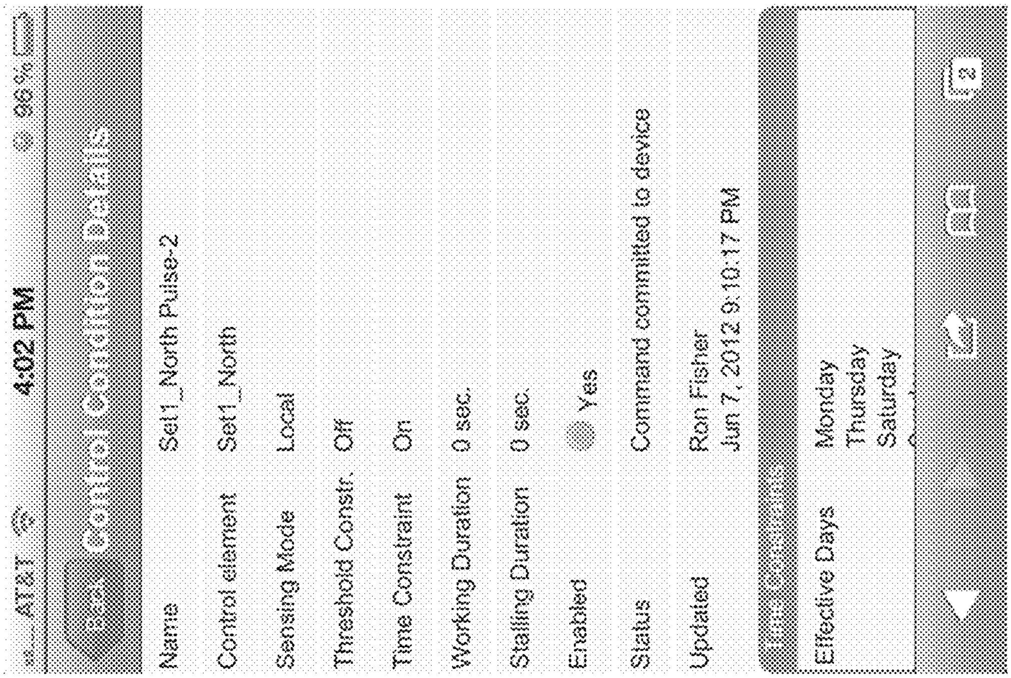

FIG. 53: Monitoring Element Details Page
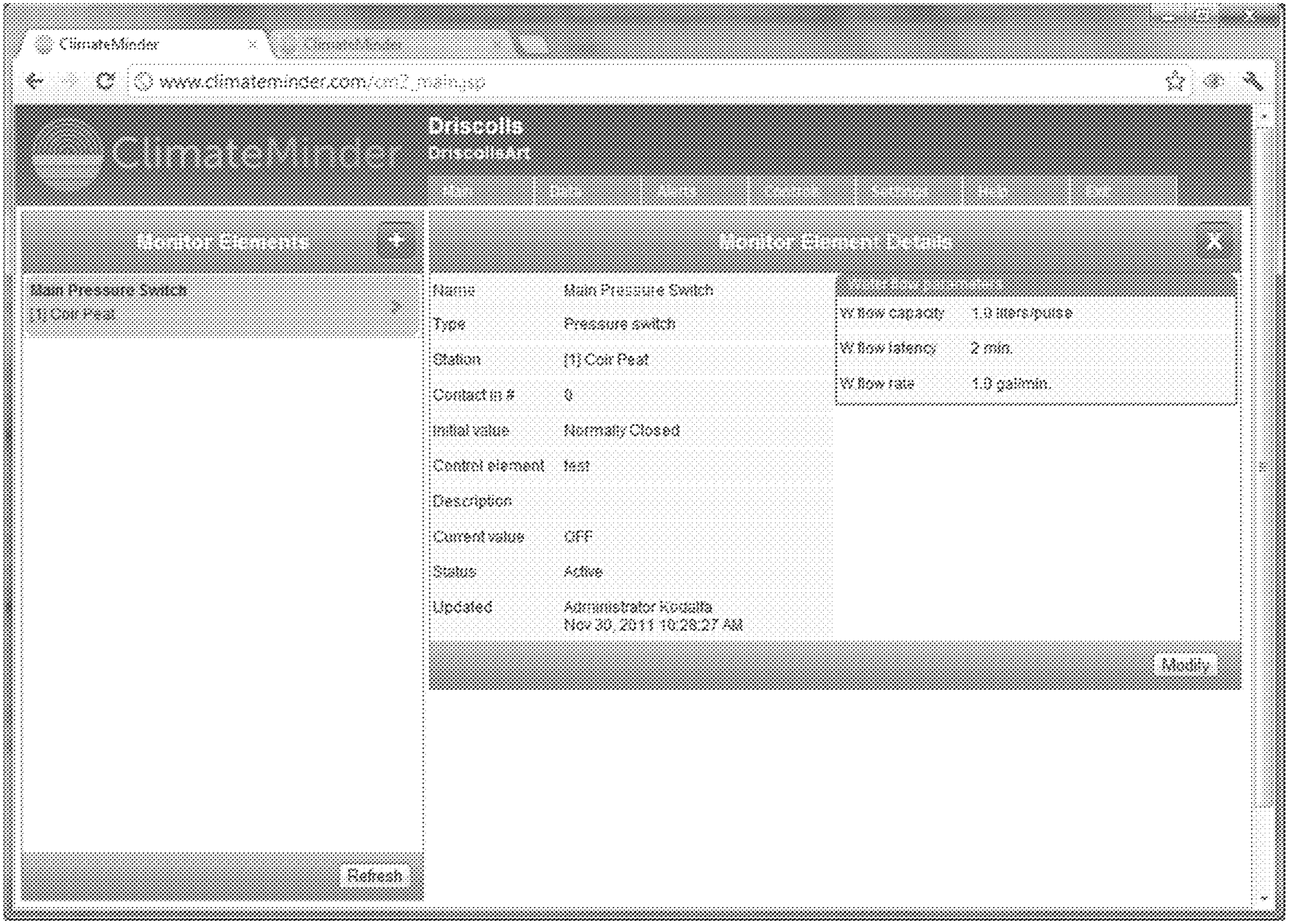

FIG. 54A: Monitoring Element Details Page (Seen on a Mobile Device)
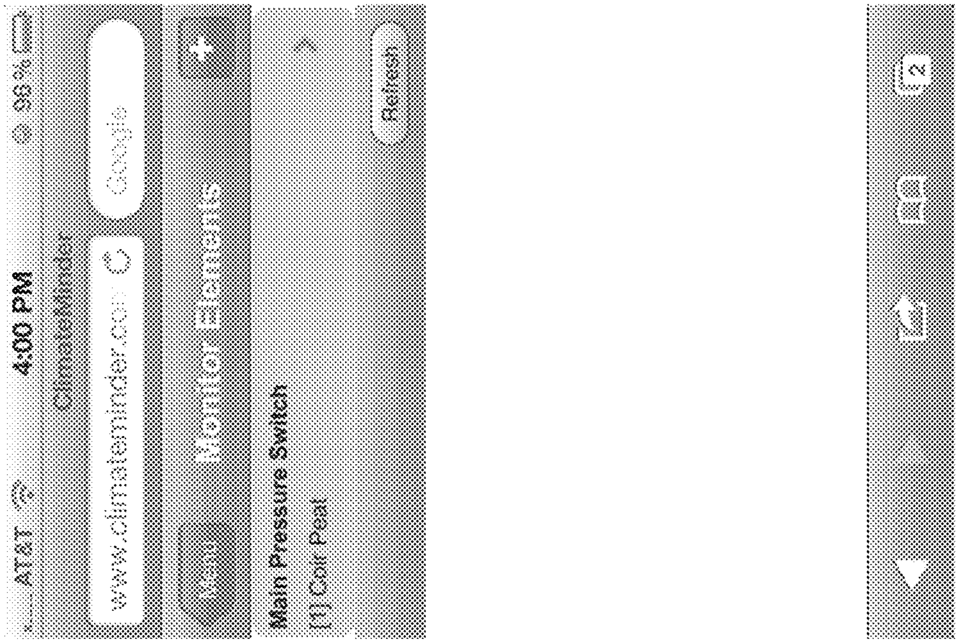
FIG. 54B: Monitoring Element Details Page (Seen on a Mobile Device)
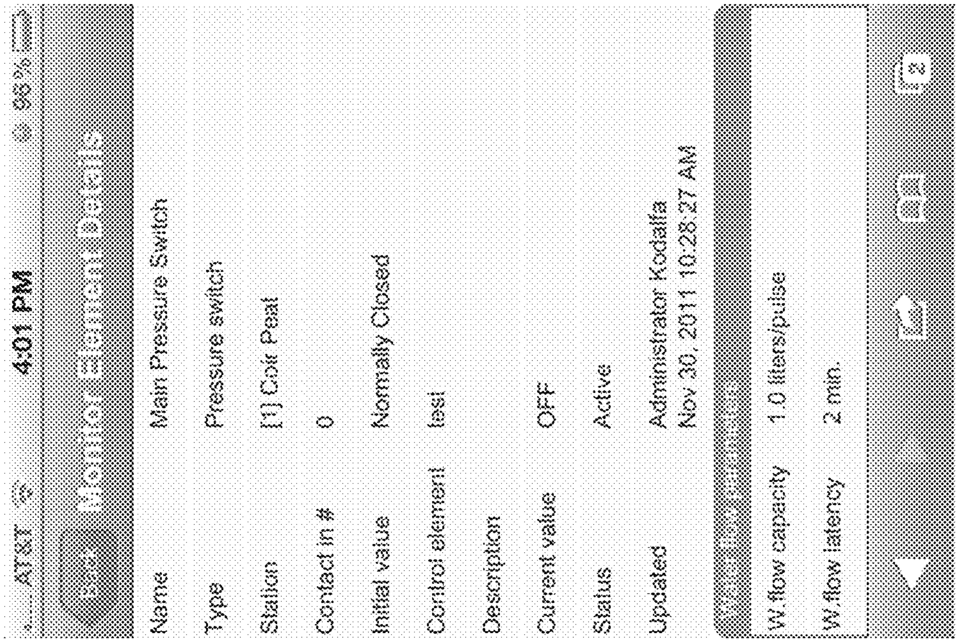

FIG. 55: Irrigation Alerts Details Page
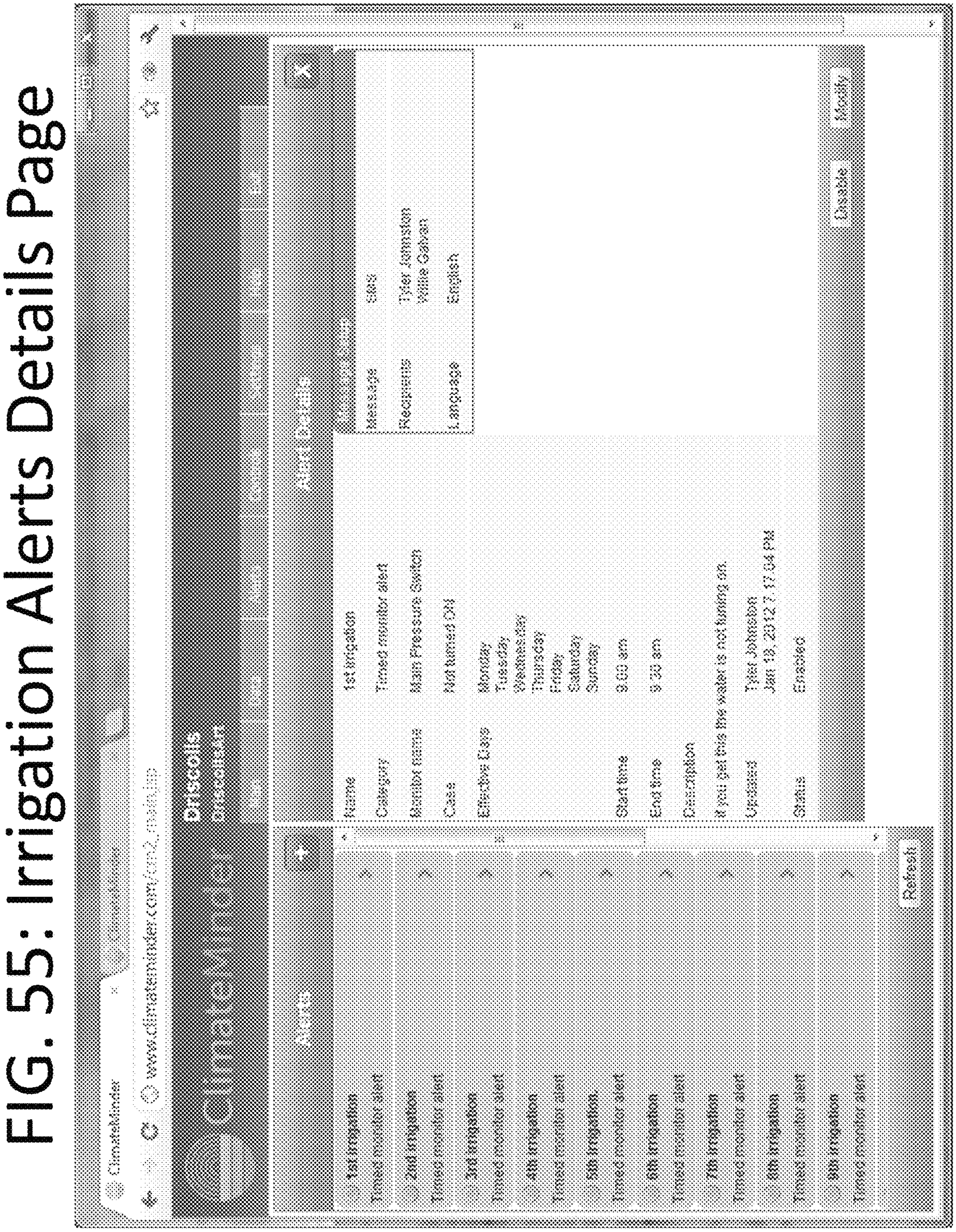

FIG. 56A: Irrigation Alerts Details Page
(Seen on a Mobile Device)
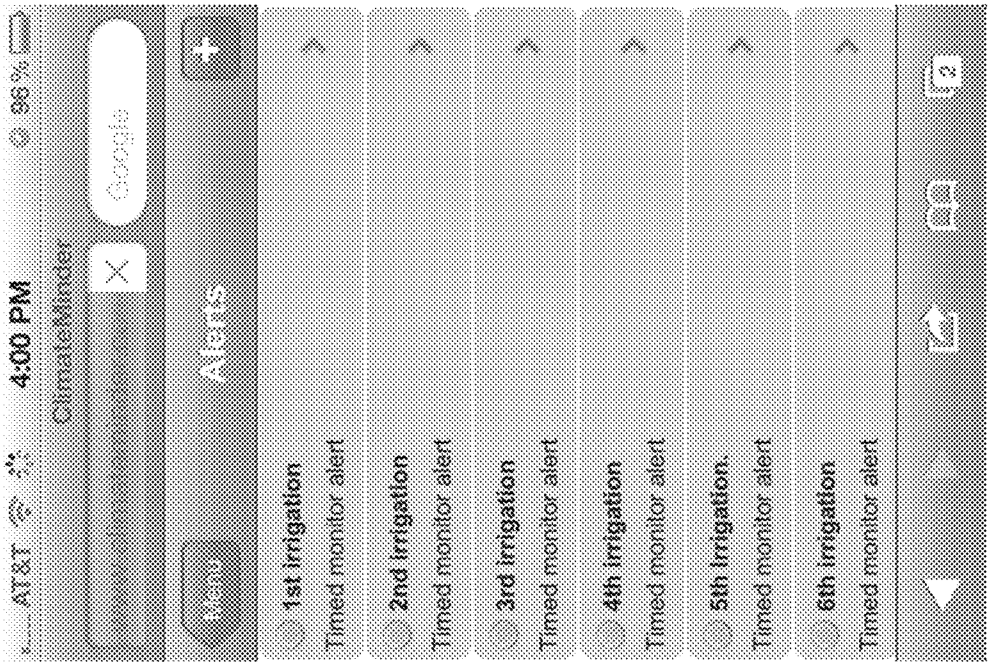
FIG. 56B: Irrigation Alerts Details Page
(Seen on a Mobile Device)

FIG. 57: Dashboard with a Map View
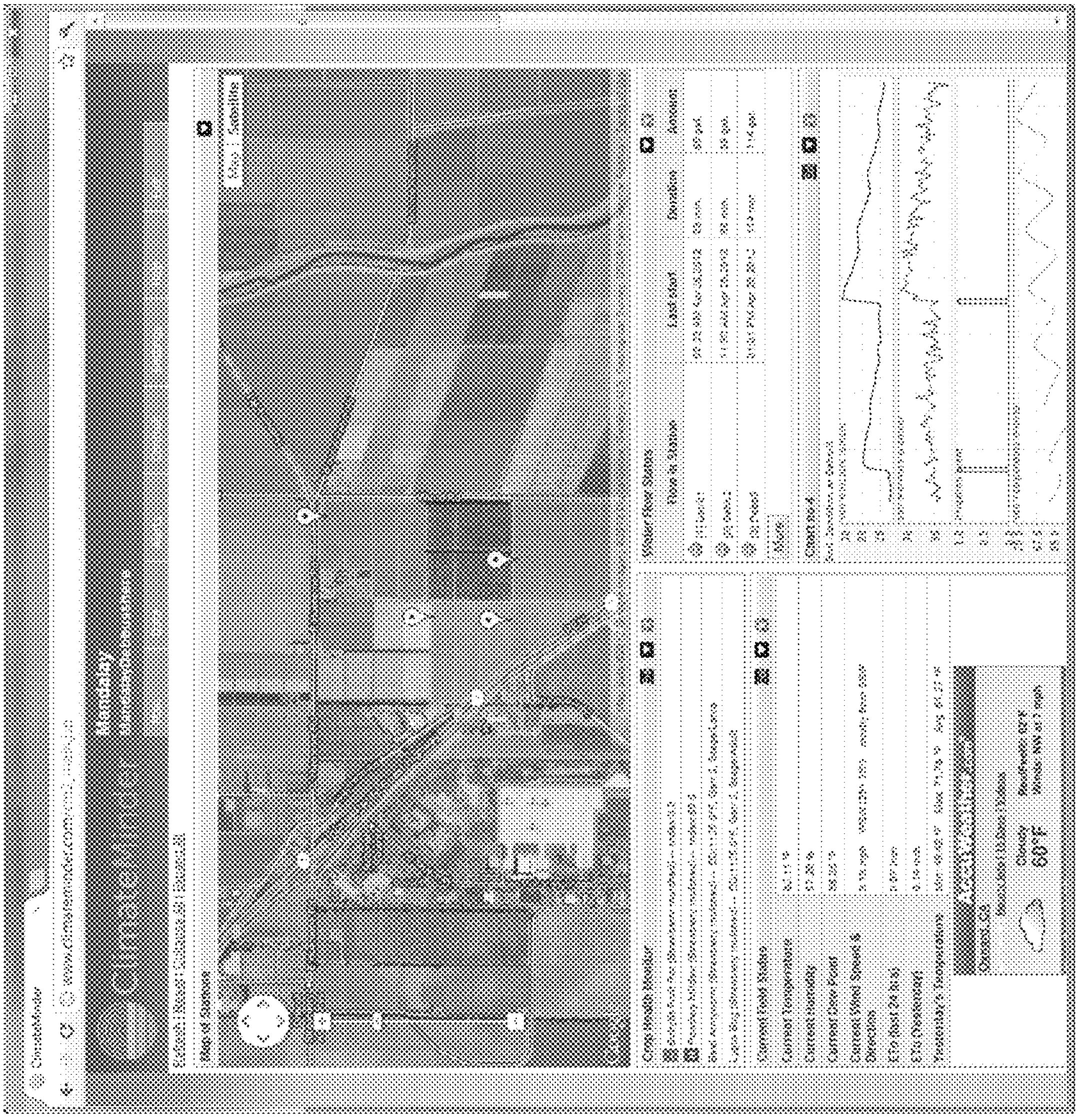

6000

Station Map

| Site | Station |
|---|---|
| Acme Field | North Blk |
| Acme Field | South Blk |
| Acme Field | SS Blk |
| Acme Field | East Blk |
| Gandolf Ranch | Blk A2 |
| Gandolf Ranch | Blk A3 |
| Gandolf Ranch | Blk A4 |
| Rigley Field | Blk 1 |
| Rigley Field | Blk 2 |
| Rigley Field | Blk 3 |
| Rigley Field | Blk 4 |
| Rigley Field | Blk 5 |

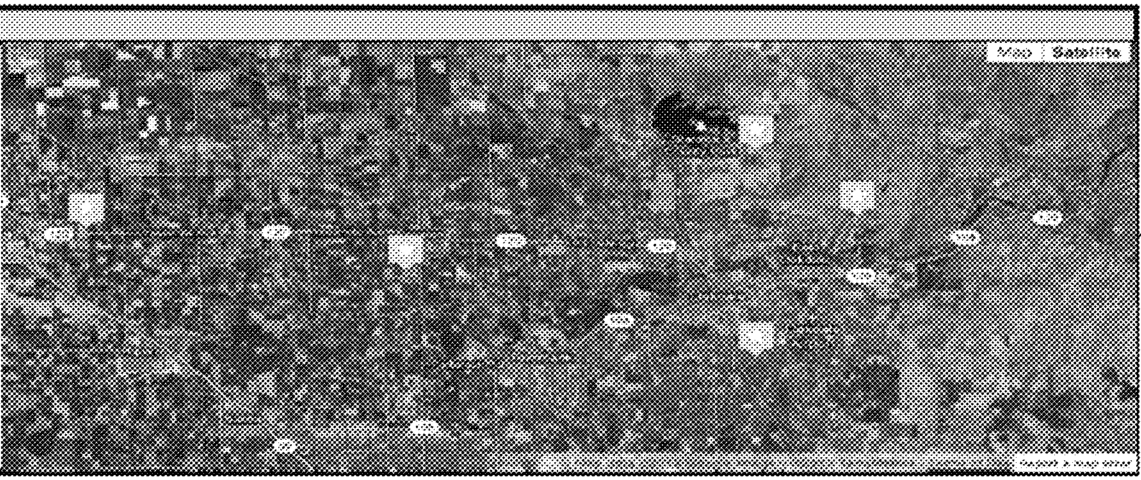

FIG. 60

6100

Current Irrigation Status

| Site | Station | Flow Status | Last State Time | Runtime | Amount | Applied Water | Applied W/O |
|---|---|---|---|---|---|---|---|
| Acme Field | North Blk | ON | Thursday 8AM | 24 HRS | ### GALS | 1.75" | 3" |
| Acme Field | South Blk | On | Tuesday 8 am | 18 HRS | ### GALS | 1.375" | 1.375" |
| Acme Field | SS Blk | OFF | | | | | |
| Acme Field | East Blk | OFF | | | | | |
| Gandolf Ranch | Blk A2 | OFF | | | | | |
| Gandolf Ranch | Blk A3 | OFF | | | | | |
| Gandolf Ranch | Blk A4 | OFF | | | | | |
| Rigley Field | Blk 1 | ON | | | | | |
| Rigley Field | Blk 2 | OFF | | | | | |
| Rigley Field | Blk 3 | ON | | | | | |
| Rigley Field | Blk 4 | ON | | | | | |
| Rigley Field | Blk 5 | ON | | | | | |

FIG. 61

6200

| Current Weather Status | | | | | | | |
|---|---|---|---|---|---|---|---|
| Site | Station | Temp | Humidity | Windspeed | Wind Direction | Dew Point | Previous Day ETo |
| Acme Field | North Blk | 78 | 24 | 6 | NNE | 65 | 0.18 |
| Acme Field | South Blk | 77 | 23 | 2 | NE | 66 | 0.17 |
| Acme Field | SS Blk | | | | | | |
| Acme Field | East Blk | | | | | | |
| Gandolf Ranch | Blk A2 | | | | | | |
| Gandolf Ranch | Blk A3 | | | | | | |
| Gandolf Ranch | Blk A4 | | | | | | |
| Rigley Field | Blk 1 | | | | | | |
| Rigley Field | Blk 2 | | | | | | |
| Rigley Field | Blk 3 | | | | | | |
| Rigley Field | Blk 4 | | | | | | |
| Rigley Field | Blk 5 | | | | | | |

FIG. 62

6300

| Flow Meter Readings | | | | | | | |
|---|---|---|---|---|---|---|---|
| Site | Station | | | Current GPM | Yesterday | Total MTD | Total YTD |
| Acme Field | North Blk | | | 1657 | 22,365 | 22,365 | 330,759 |
| Acme Field | South Blk | | | | | | |
| Acme Field | SS Blk | | | | | | |
| Acme Field | East Blk | | | | | | |
| Gandolf Ranch | Blk A2 | | | | | | |
| Gandolf Ranch | Blk A3 | | | | | | |
| Gandolf Ranch | Blk A4 | | | | | | |
| Rigley Field | Blk 1 | | | | | | |
| Rigley Field | Blk 2 | | | | | | |
| Rigley Field | Blk 3 | | | | | | |
| Rigley Field | Blk 4 | | | | | | |
| Rigley Field | Blk 5 | | | | | | |

FIG. 63

METHODS AND SYSTEMS FOR IRRIGATION AND CLIMATE CONTROL

CROSS REFERENCE TO RELATED APPLICATIONS

This application is a continuation of U.S. patent application Ser. No. 17/493,329, filed Oct. 4, 2021, which is a continuation of U.S. patent application Ser. No. 15/616,736 filed Jun. 7, 2017 and entitled METHODS AND SYSTEMS FOR IRRIGATION AND CLIMATE CONTROL, which is a continuation of U.S. patent application Ser. No. 13/844,304 filed Mar. 15, 2013 and entitled METHODS AND SYSTEMS FOR IRRIGATION AND CLIMATE CONTROL, which is a continuation-in-part of U.S. patent application Ser. No. 13/532,557 filed Jun. 25, 2012 and entitled METHODS AND SYSTEMS FOR IRRIGATION AND CLIMATE CONTROL, which application claims priority from U.S. Provisional Patent Application No. 61/500,392 filed on Jun. 23, 2011 and entitled METHODS AND SYSTEMS FOR IRRIGATION AND CLIMATE CONTROL, all of which are hereby incorporated by reference.

BACKGROUND

The present application relates generally to methods and systems for monitoring and controlling irrigation and climate conditions in landscapes (such as, e.g., municipal parks, gardens, and sports fields) and agricultural environments (such as, e.g., open agricultural fields, greenhouses, and other sites growing crops).

BRIEF SUMMARY

A web-based remote monitoring and control system is provided in accordance with one or more embodiments for monitoring environmental, soil, or climate conditions and/or controlling irrigation or climate control systems at an agricultural or landscape site. In some embodiments, at least one control and/or sensor node or other control and/or sensor device, controller or element monitors environmental, soil, or climate conditions and/or controls one or more irrigation or climate control systems at the site. The remote monitoring and control system communicates with the node/s over a communications network to receive data from and control operation of the node/s. The system can be accessed by personal computers, mobile devices, and other client devices operated by end-users. These devices communicate over a communications network with the system. The system transmits data to and receives remote control commands or queries from end-users.

Users can remotely control irrigation or climate control systems at one or more agricultural or landscape sites for which the users have authorization or access to do so. The system provides a user interface displaying the information for one or more sites by customizable windows (portlets on a dashboard) in one page (a dashboard) or at multiple respective pages. The system provides quick access to charts, reports, maps and gives the end user flexibility with various add/remove/edit options.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

FIGS. 13-57 are exemplary screenshots illustrating various aspects of the remote monitoring and control system user interface in accordance with various embodiments.

FIGS. 59-63 are exemplary screenshots illustrating various aspects of the remote monitoring and control system user interface relating to the display of information for multiple sites in accordance with various embodiments.

DETAILED DESCRIPTION

In accordance with one or more embodiments, a web-based remote monitoring and control system is provided for monitoring environmental, soil, or climate conditions and controlling irrigation or climate control systems at an agricultural or landscape site. In some embodiments, the system includes one or more devices or nodes at each site for monitoring environmental, soil, or climate conditions and/or for controlling one or more irrigation or climate control systems at the site. In some embodiments, the system includes a wireless sensor network at each site including a plurality of sensor and/or control nodes for monitoring environmental, soil, or climate conditions and and/or controlling one or more irrigation or climate control systems at the site. The remote monitoring and control system can be accessed by users operating client devices such as personal computers and mobile devices over a communications network. Users can use the system for receiving data from and transmitting remote control commands or queries to the system. The web-based remote monitoring and control system communicates with the local nodes, devices and/or local wireless network over a communications network. The system receives data from and controls operation of the nodes.

A web-based remote monitoring and control system user interface in accordance with one or more embodiments can include one or more of the following features:

- Main Dashboard (containing summary information in portlets or windows)
  - Quick access to the current site status (forecast, temperature, humidity, degree days etc.)
  - Charts
  - Crop health monitors
  - Readings
  - Events (e.g. control events)
  - Alerts
  - Pump status monitoring
  - Farm management and information (e.g. budget and yield status)
  - Soil nutrient status
  - Irrigation status/activity (show flow status, show valve status)
  - Notes
  - Maps (shows irrigation zones, soil status with color indicators—e.g. blue for wet, red for dry and green for normal)
  - Station/sensor status
- More detailed information in respective pages, which can be accessed through the dashboard
  - Data charts
  - Crop health monitors
  - Readings
  - Event
  - Alerts
  - Pump status monitoring
  - Farm management and information (e.g., budget and yield status)
  - Soil nutrient status
  - Irrigation status
  - Reports
  - Maps
  - Degree Days
  - Control Elements & Conditions
  - Monitoring Elements & Irrigation Alerts
- Switchable screen configuration:
  - Mobile user interface
  - Classic personal computer screen user interface It is understood that this is not intended to be an exhaustive listing of all possible windows and/or features and information displayable to users, as such will be implementation dependent.

Figure 1:
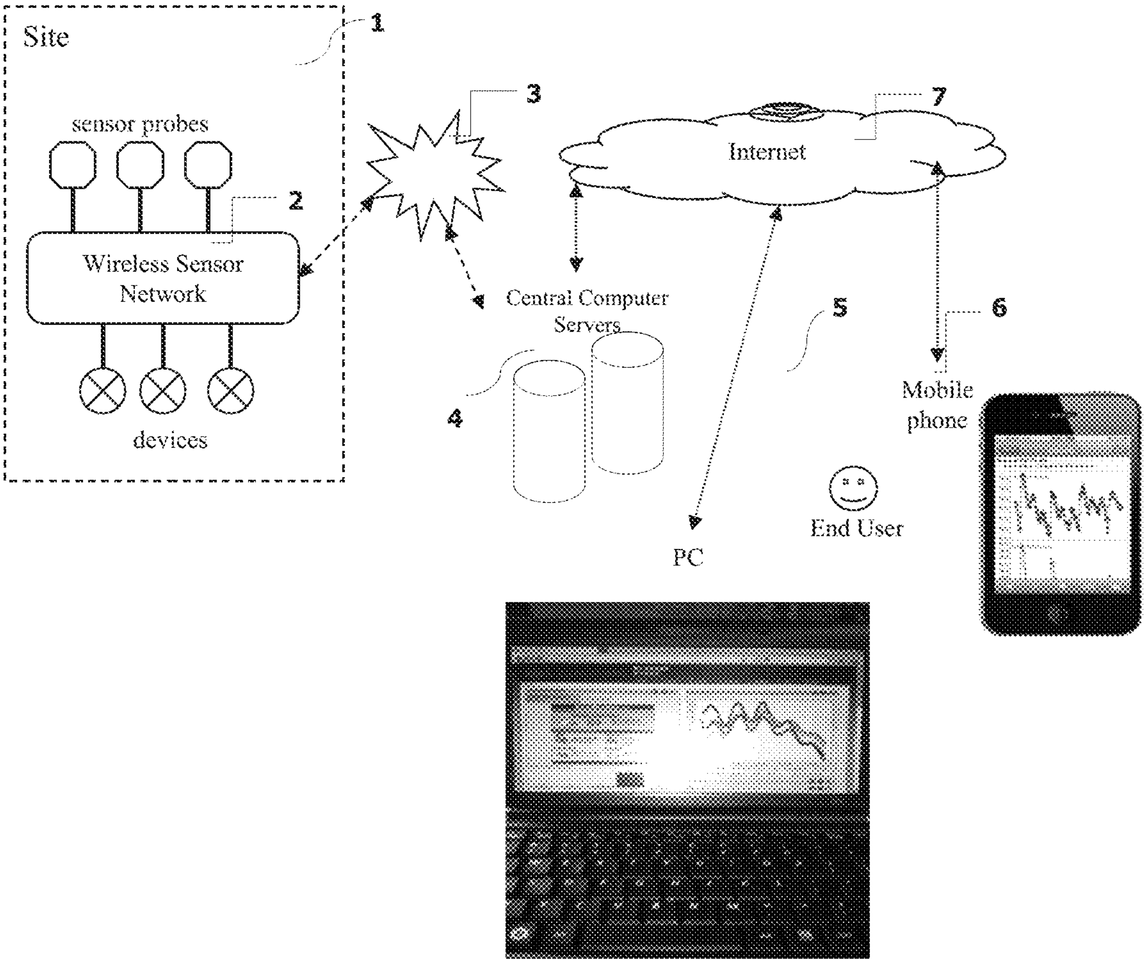
FIG. 1 is a schematic diagram illustrating a web-based remote monitoring and control system in accordance with one or more embodiments.
Figure 58:
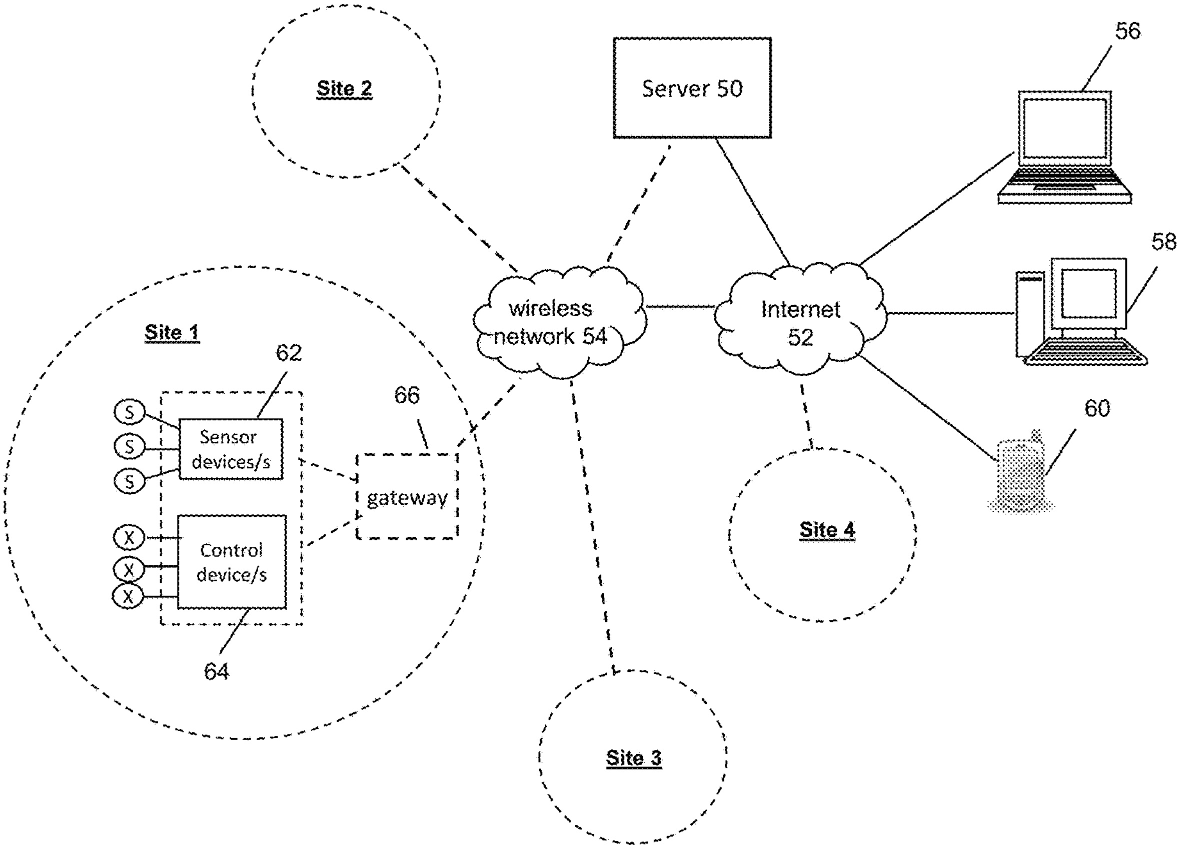
FIG. 58 is an exemplary system diagram of a web-based remote monitoring and/or control system in accordance with one or more embodiments.

FIG. 1 illustrates the architecture of an exemplary web-based remote climate monitoring and control system for an irrigation/climate control site (e.g., greenhouse, open field, or landscape) 1 in accordance with one or more embodiments. The system can be accessed by users using various client devices such as, e.g., a mobile device 6 or personal computer 5. In the illustrated embodiment, the system includes a wireless sensor network 2 having a plurality of sensor and/or control nodes installed in the site. The sensor network 2 includes sensor nodes, which form an ad-hoc (i.e., dynamic) wireless sensor network and monitor climate, environmental, and soil conditions, and to collect measurements. The sensor nodes send these measurements to a central computer server 4 through a communications network 3 such as a cellular network (e.g., GPRS, Edge, UMTS etc.) or a wireless wideband network (e.g., WiMAX). In other embodiments, the communications network includes a wireless wideband network, such as a satellite communications network. Users can communicate with the central server system 4 through a network such as the Internet 7 or a combination of networks, not only to gather the site information but also to configure the user interface according to the user settings stored on the server. FIG. 58 illustrates another embodiment of an exemplary web-based monitoring and/or control system.

In some embodiments, the wireless sensor network includes one or more general nodes or devices, such as one or more sensor devices and/or control devices, controllers or elements. At least one node is coupled to a sensor and receives sensor data. At least one node is coupled to and controls at least a portion of the irrigation or climate system, e.g., at least one node is coupled to an irrigation valve controlling the flow of water therethrough. In some cases, a given node is a control only node or the node is a sensor only node. In other cases, a given node is both a sensor and control node. It is understood that the number of nodes at a given site depends on the needs of the irrigation site, e.g., a given site may have 1-n nodes or devices, each having sensor and/or control functionality. Thus, in a general sense, the various methods and systems described herein are applicable to a variety of irrigation and/or climate monitoring and/or control systems, such that authorized users are provided remote access to information from the system/s and/or to remotely control the system/s via interaction with a configurable user interface provided by a server in communication with the local system/s. Typically, the server is coupled to a wide area network accessible by the remote users, e.g., coupled to the Internet. The server stores user information, user login and authorization information and system information for many irrigation and/or climate monitoring and/or control systems located at various sites. The server manages access to such sites allowing users only to get access to those systems and sites that the particular user is so authorized, and is not provided access to those systems and sites that the user particular user is not so authorized.

Figure 2:
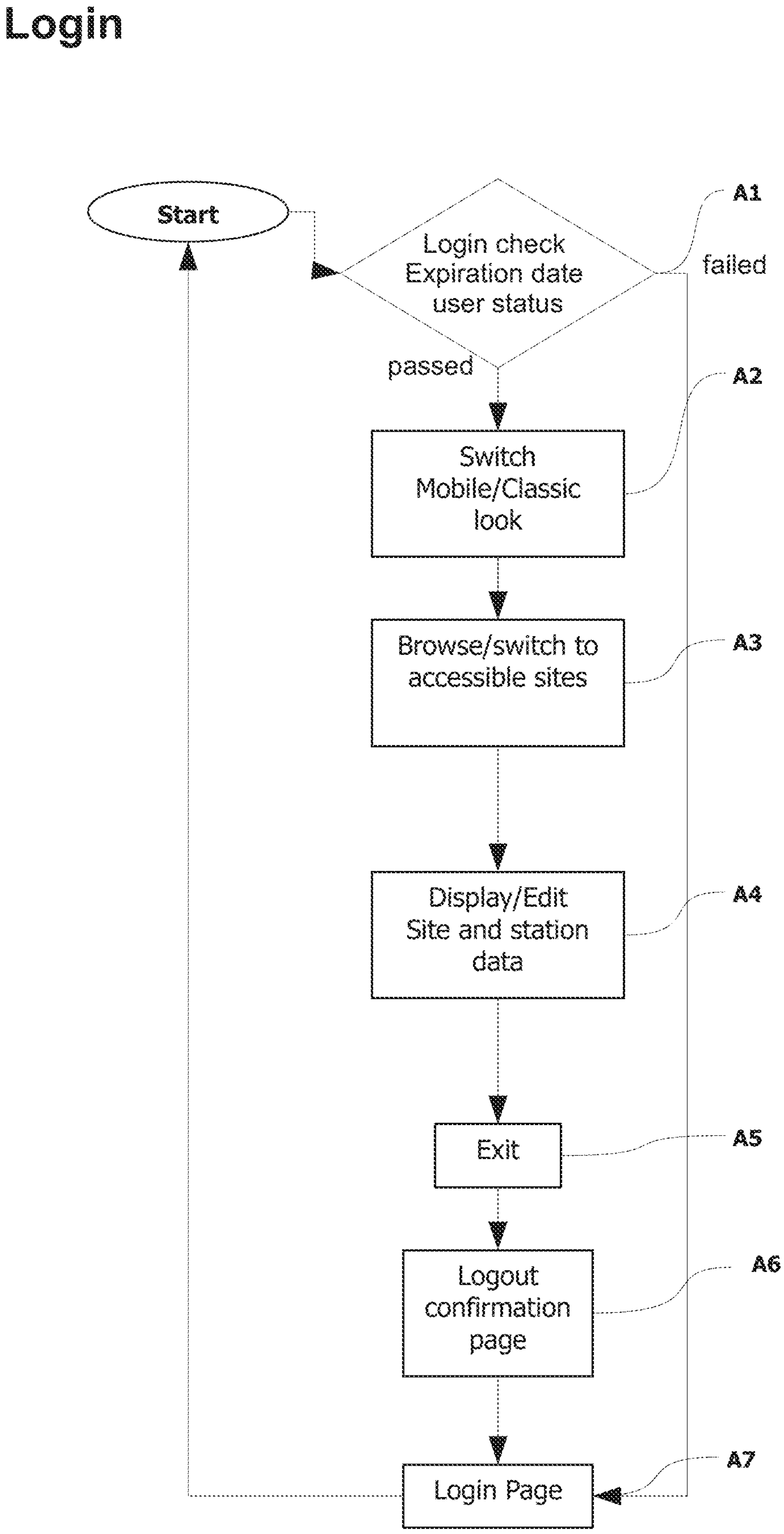
FIG. 2 is a flowchart illustrating an exemplary user login process flow in accordance with one or more embodiments.

FIG. 2 illustrates an exemplary end-user login flow to the web-based monitoring system. When the end user enters the username and password at the login page, a login check is performed on the server side, comparing with the information on the central database server as shown in step (A1). Login check can include: username and password match check, and user status check (active, inactive, blocked, expired). If the user is valid, the end-user can enter the system and display the accessible sites for that user by switching between sites as shown in step (A3). It is noted that in some embodiments, specifically referred to with references to FIGS. 58-63, users authorized to access multiple sites may not be required to switch between authorized sites (or otherwise log out of one site and log in to another site). The end-user can also switch between mobile and classic look of the pages as shown in step (A2). Users can display/change site/user data through main dashboard or at the respective pages as shown in step (A4). They can exit any time (A5), and after the logout confirmation page (A6) return to the login page (A7).

Figure 3:
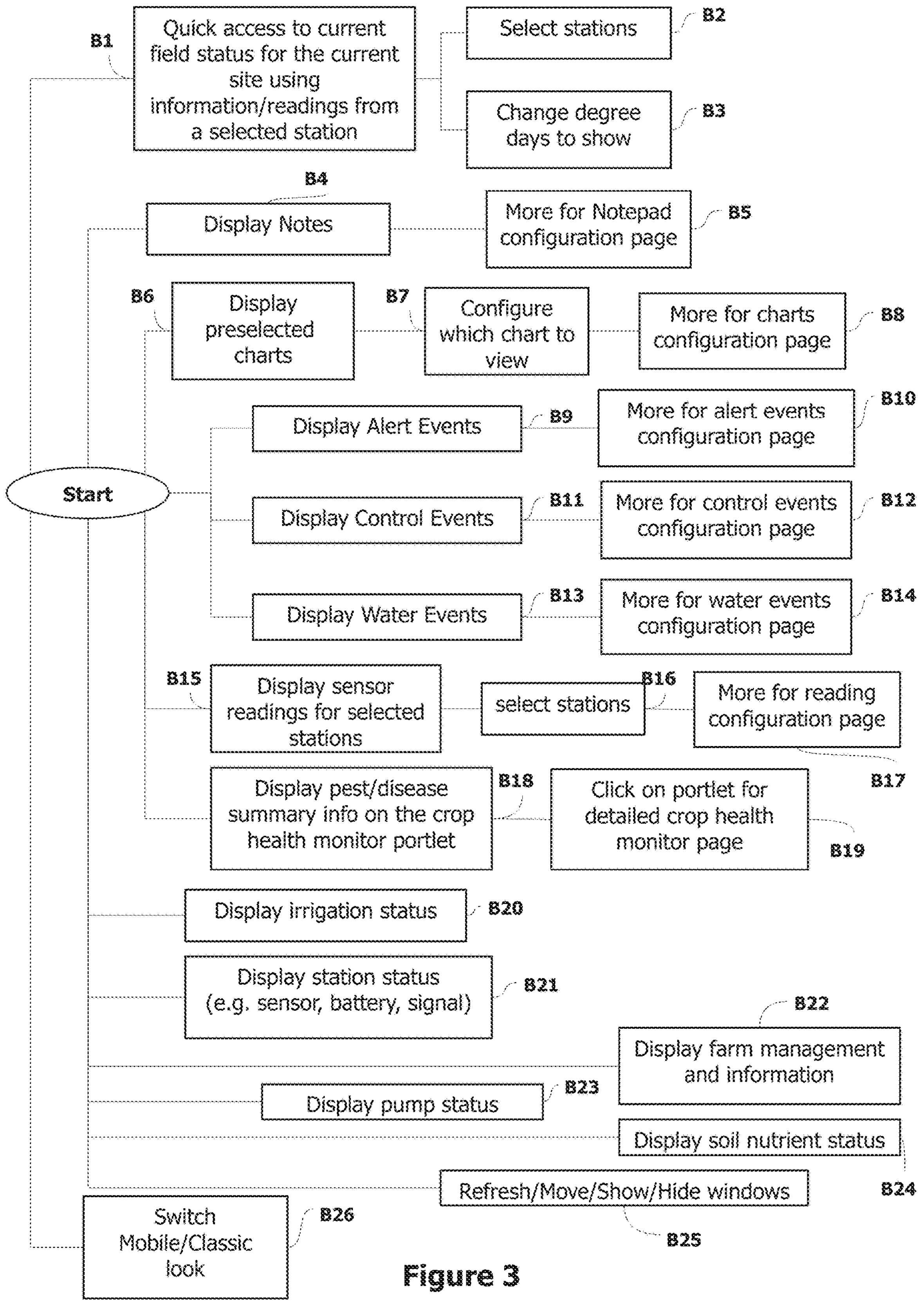
FIG. 3 is a flowchart illustrating an exemplary customizable dashboard page display/edit process flow in accordance with one or more embodiments.
Figure 6:
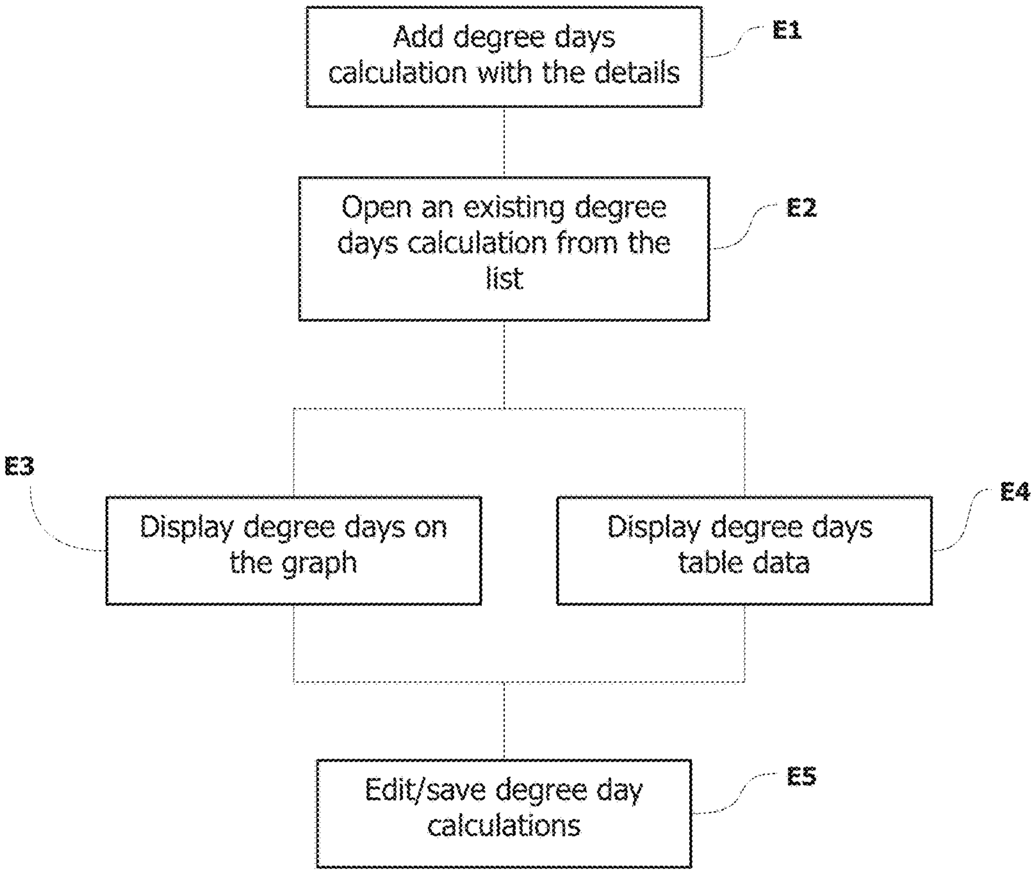
FIG. 6 is a flowchart illustrating an exemplary degree days calculation process flow in accordance with one or more embodiments.
Figure 13:
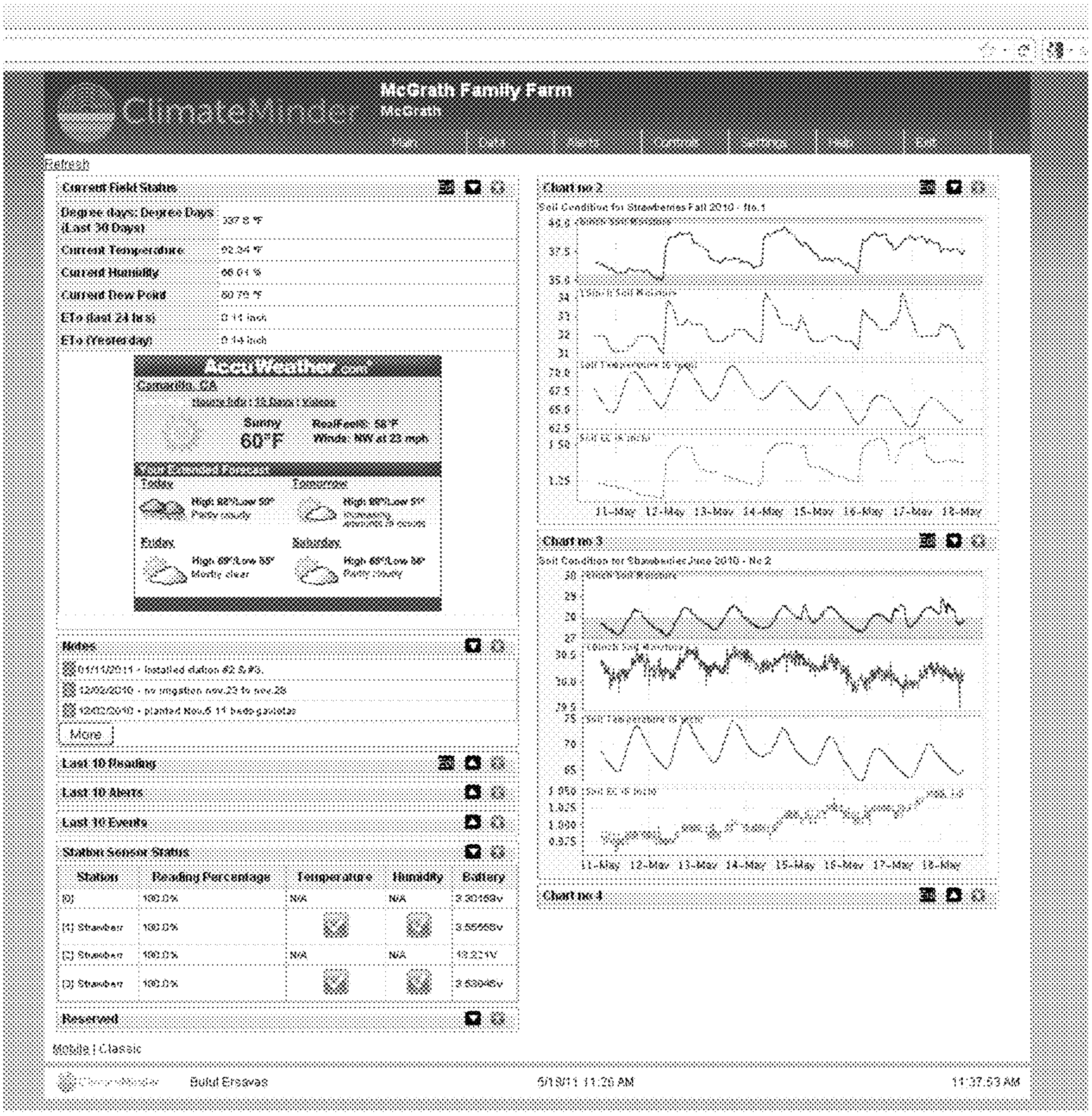
Figure 14:
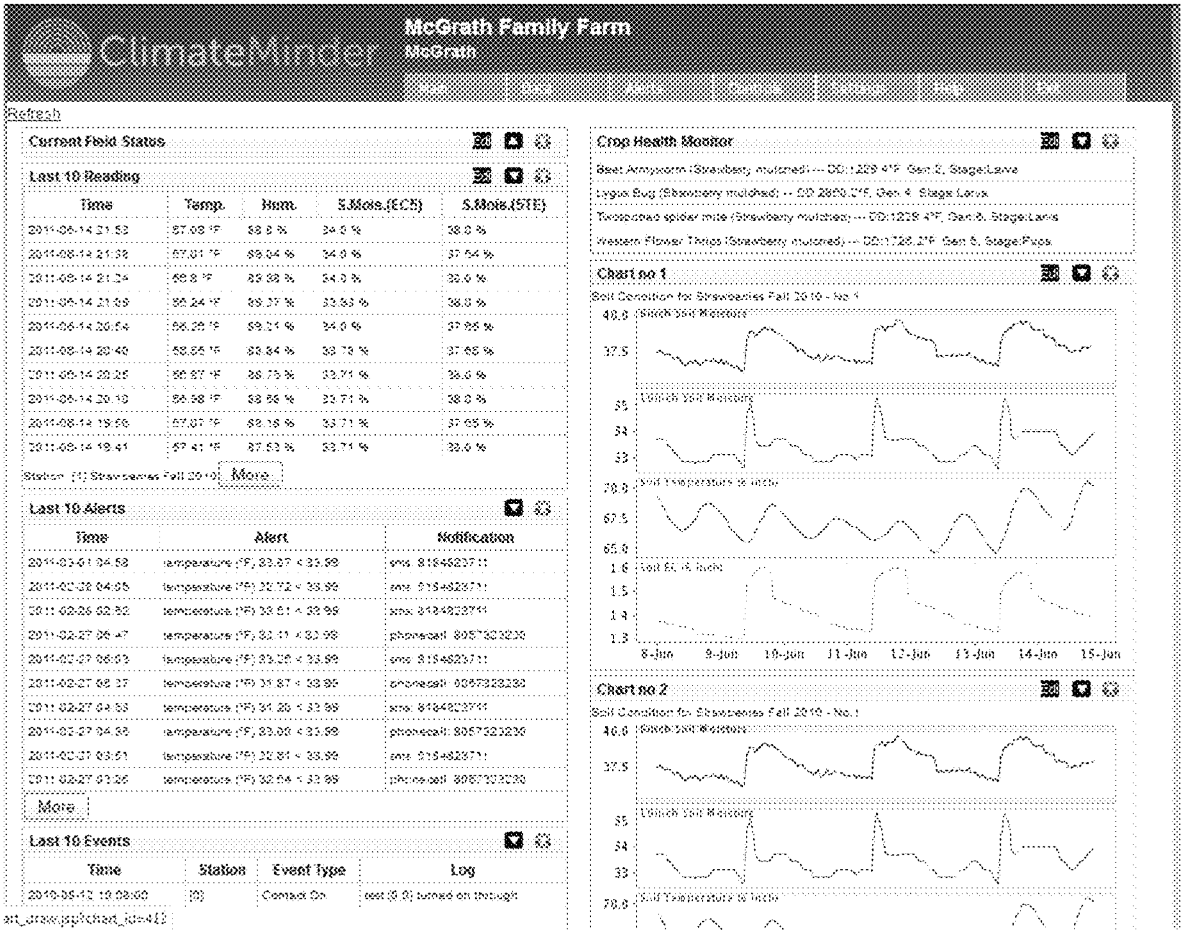
Figure 15:
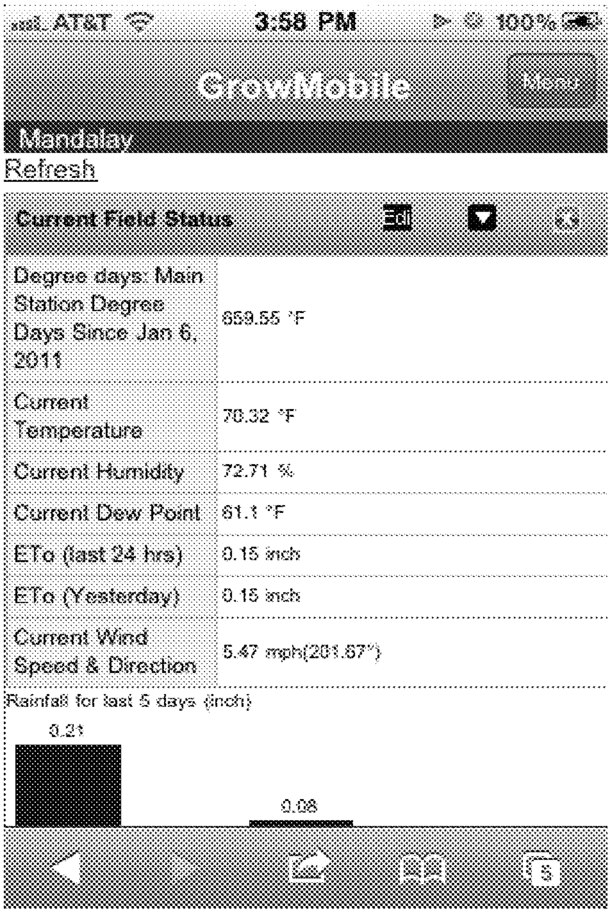
Figure 16:
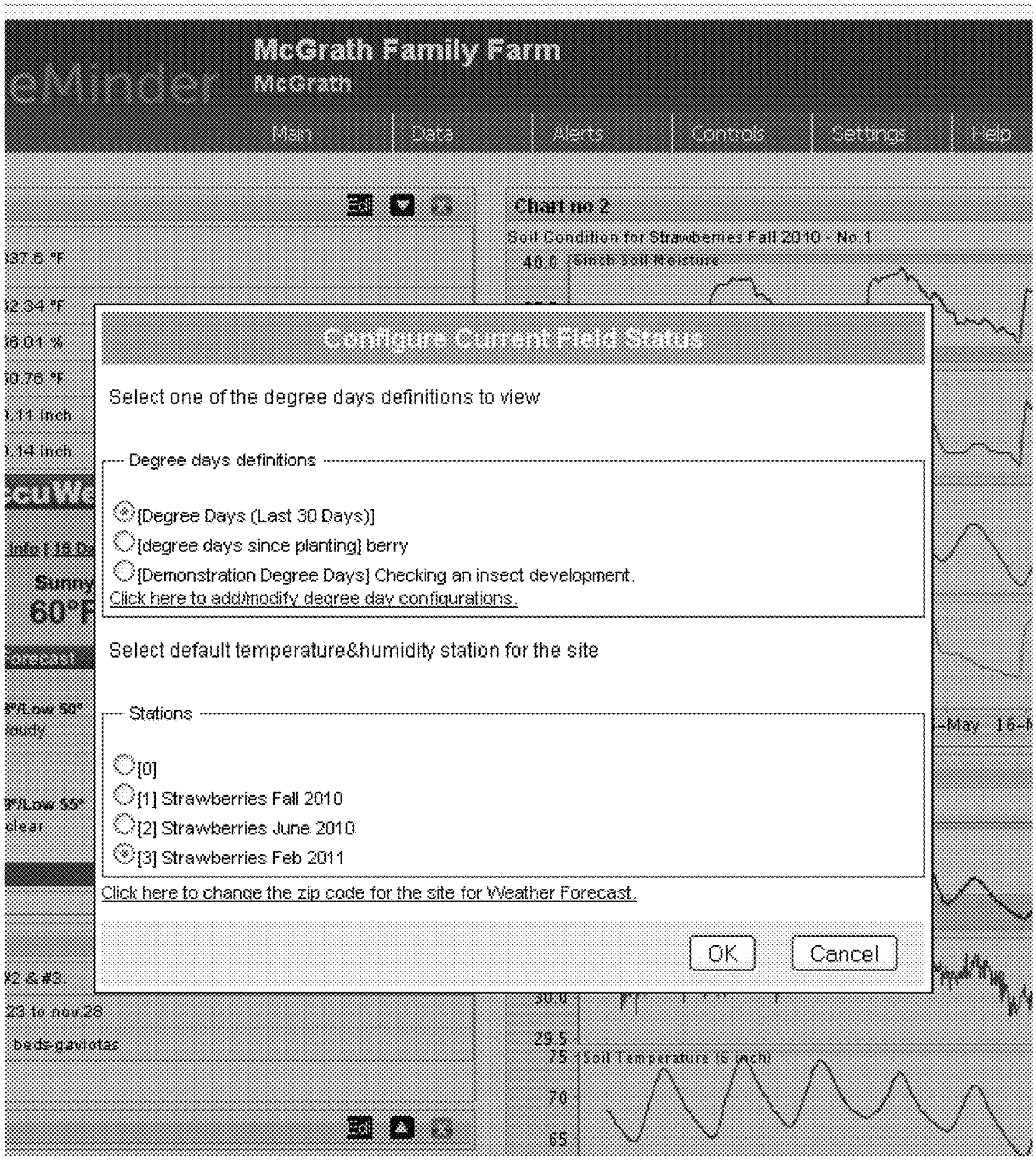

FIG. 3 illustrates an exemplary main dashboard page process flow for all users. This customized page includes user added charts, readings, events, alerts, field and sensor status windows. The current field status window (portlet)

gives the user quick access to the most important data from the site such as temperature, humidity, degree days, dew point, and ET (Evapotranspiration) values along with the live forecast info for that site by its zip code as shown in step (B1), FIG. 13, and mobile screen view FIG. 15 are exemplary dashboard screen shots. Users can display this portlet for the selected stations and degree days definitions as shown in steps (B2 and B3) and exemplary FIG. 16. Clicking on the degree days configuration link makes it very easy to access the details and will take the user to the degree days calculation page. All portlets can be minimized. Current field status portlet is minimized in FIG. 14. FIG. 6 describes the details for degree days calculation.

Figure 9:
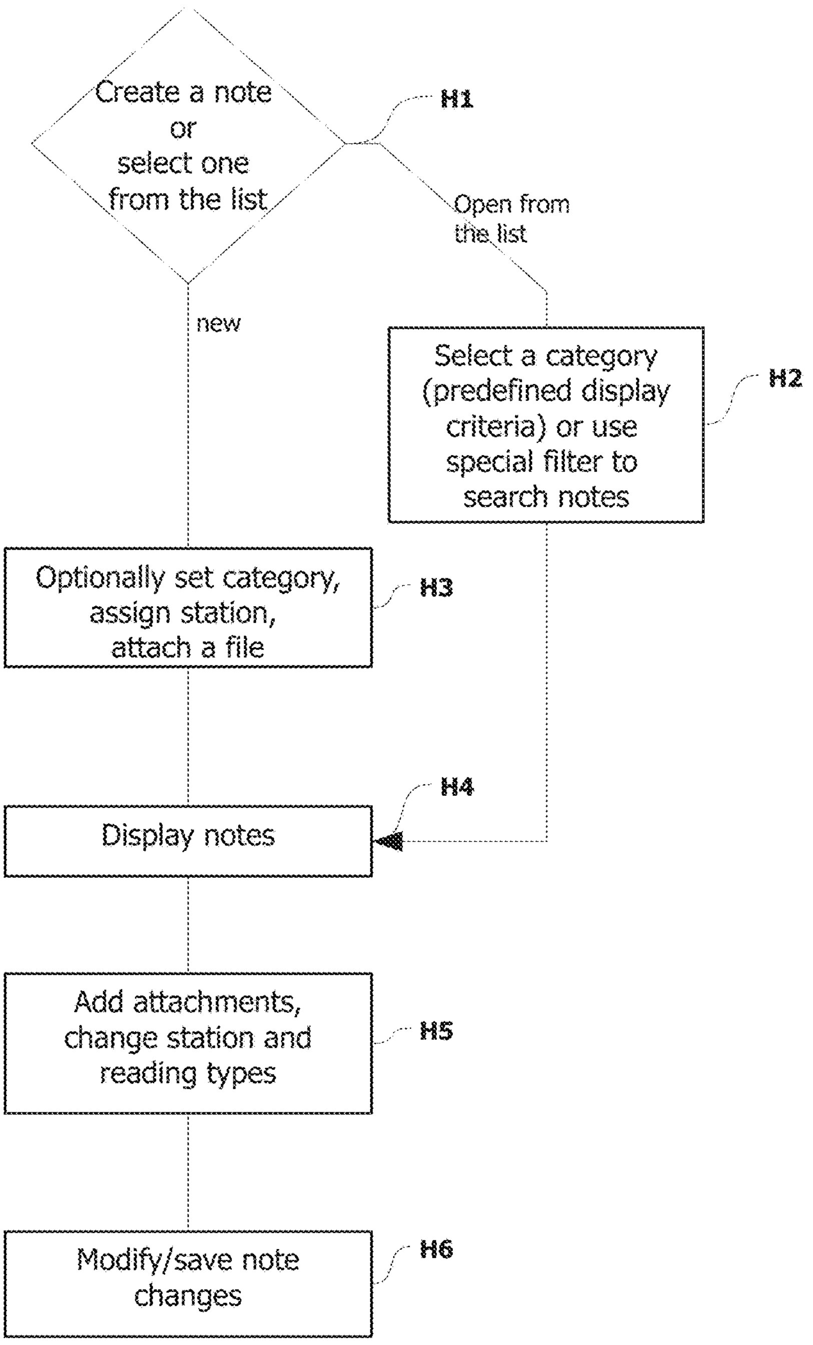
FIG. 9 is a flowchart illustrating an exemplary notepad usage process flow in accordance with one or more embodiments.
Figure 41:
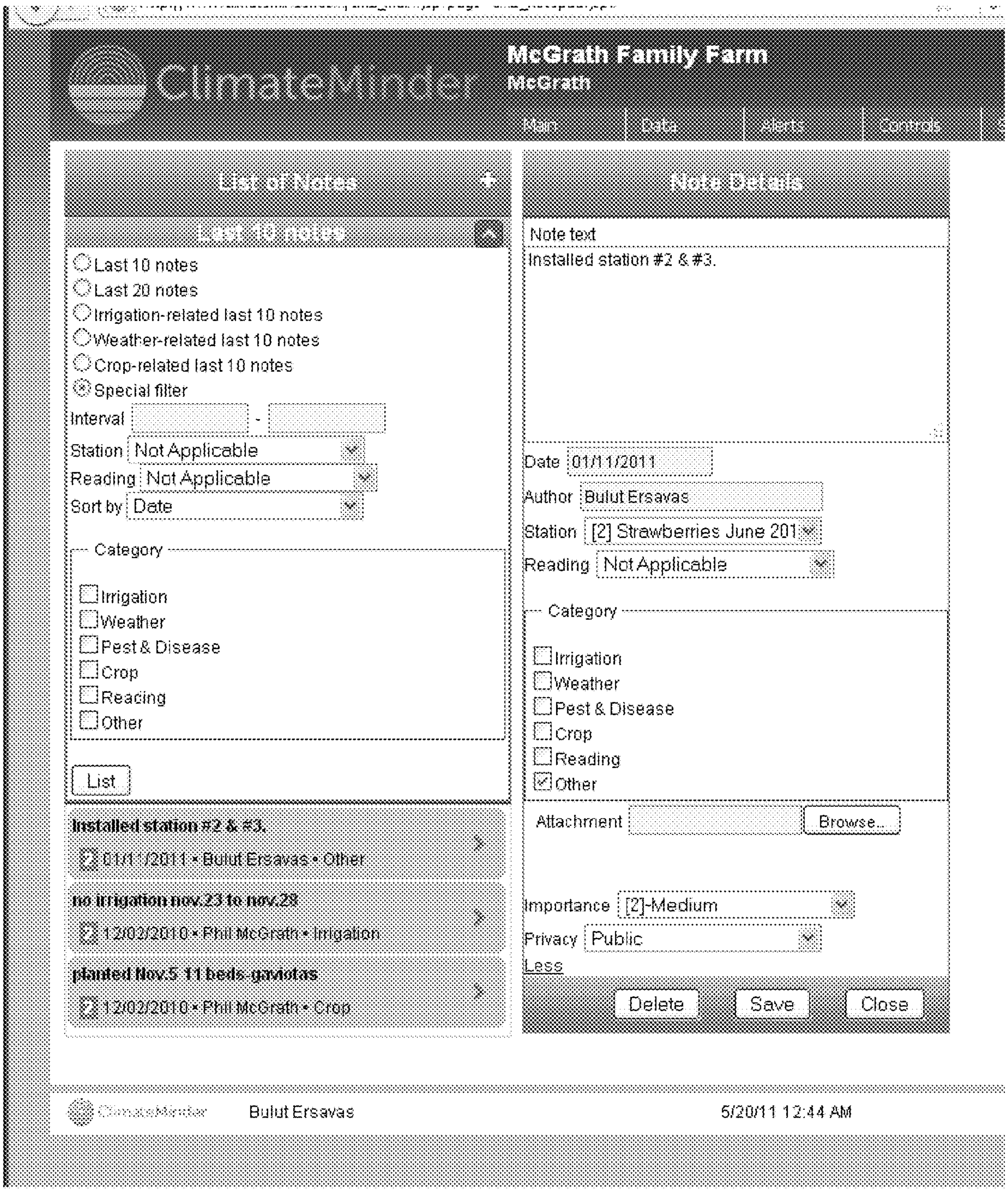

A Notes window shows the last edited notes by the users or the administrators for that site. Users can add or delete notes on the main page (dashboard) as shown in step (B4) and FIG. 13. Clicking on "More" button makes it very easy to access the note details and takes the user to the notepad as shown in step (B5) and exemplary FIG. 41. FIG. 9 describes the details for note creation and usage.

Figure 4:
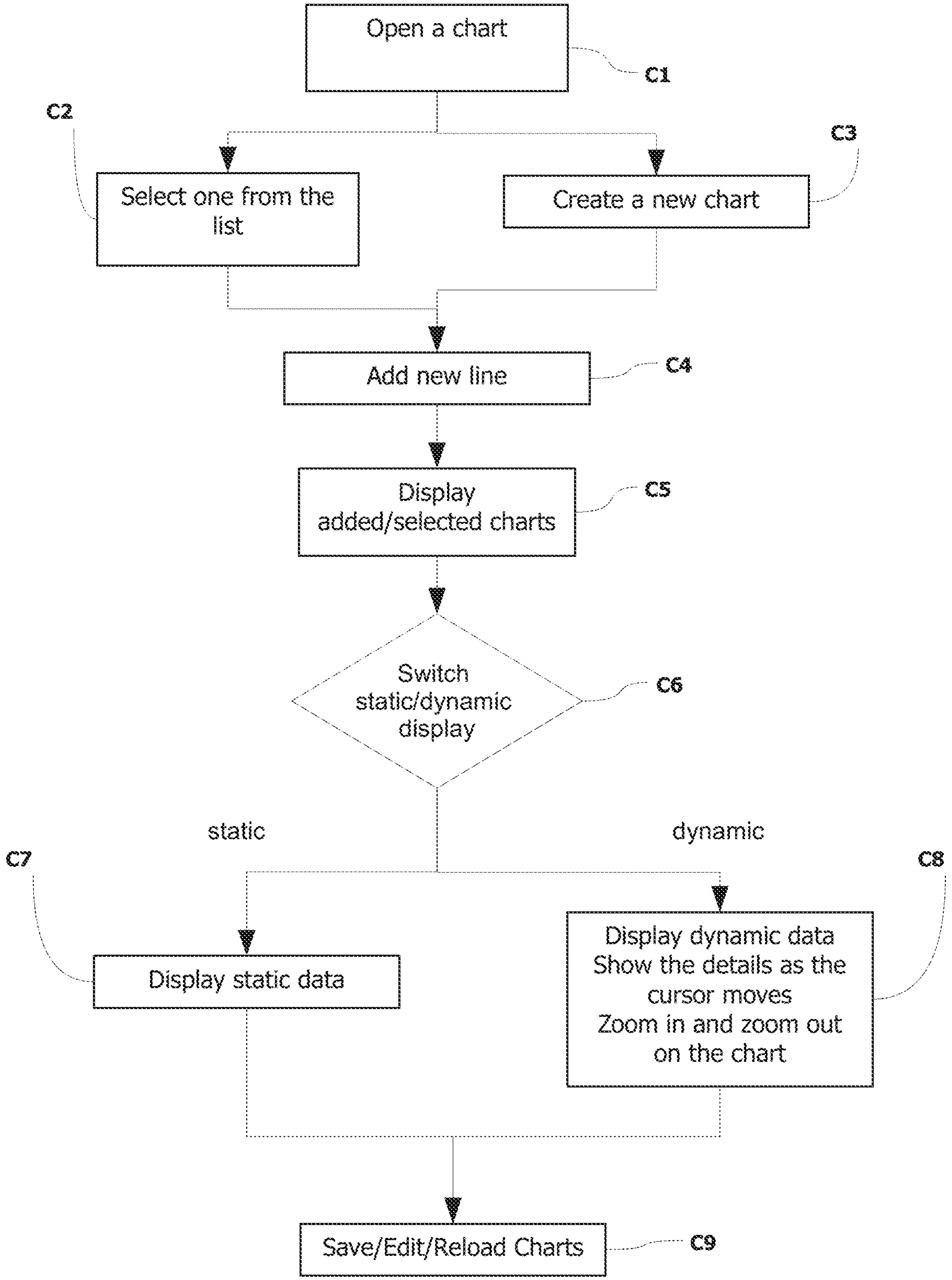
FIG. 4 is a flowchart illustrating an exemplary chart create/edit/display process flow in accordance with one or more embodiments.
Figure 17:
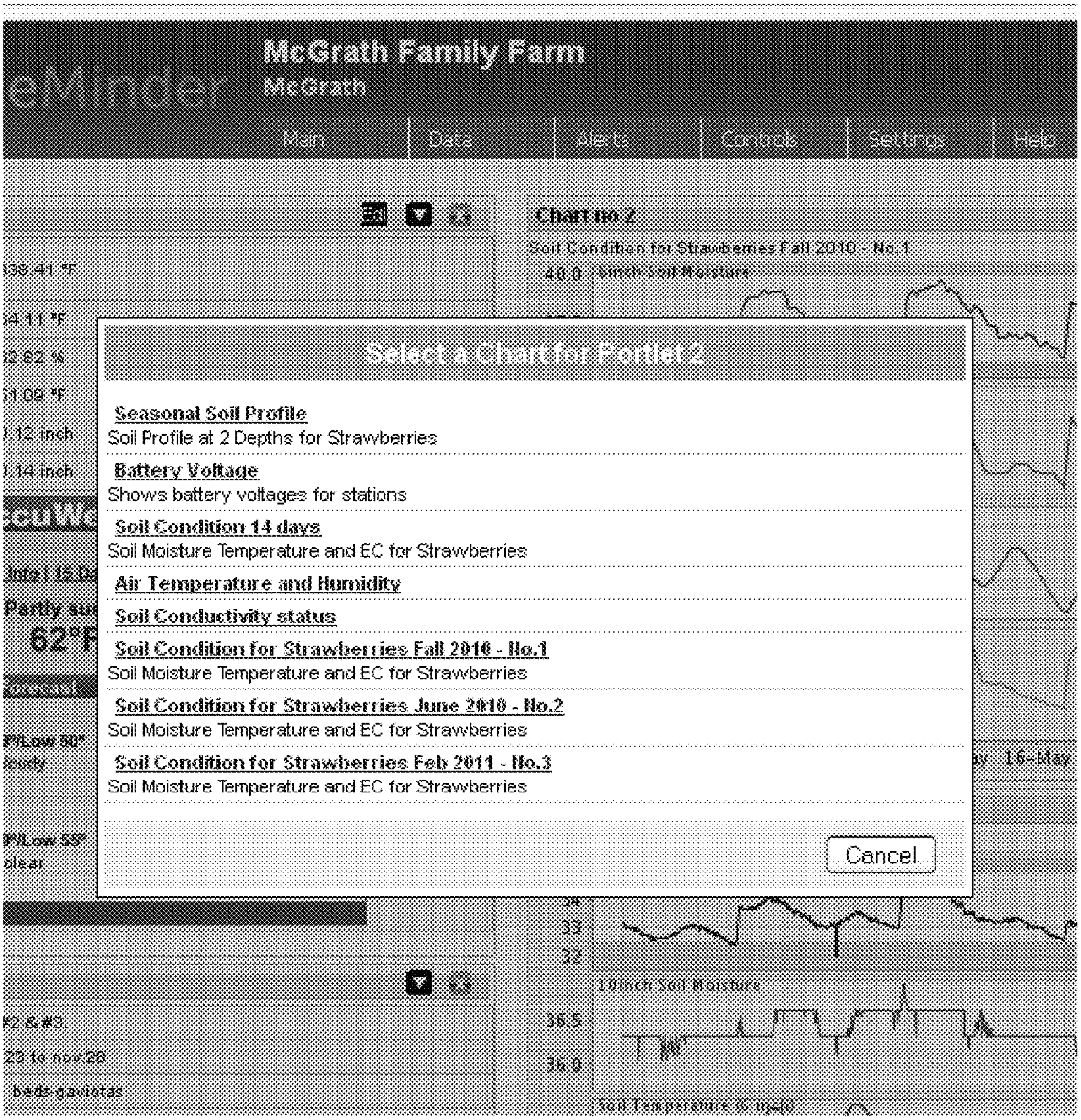

Users can add as many charts to the main page as they want as shown in step (B6) and FIG. 13 and FIG. 57. Clicking on edit lets the user add the predefined charts to the dashboard as shown in step (B7) and exemplary FIG. 17. Clicking on the charts makes it very easy to access chart details and takes the user to the charts page in static mode as shown in step (B8) and exemplary FIG. 19. FIG. 4 describes the details for charts.

Users can display last alert events, control events, and water events in respective windows as shown in steps (B9, B10, B11, B12, B13, B14) and FIG. 14. Clicking on "More" buttons takes the user to the respective event detail pages.

Last readings for selected stations can be viewed in another window as shown in step (B15) and FIG. 14. Users can change the station to be viewed on the edit menu (B16) and go to reading details page by clicking "More" button (B17).

Figure 5:
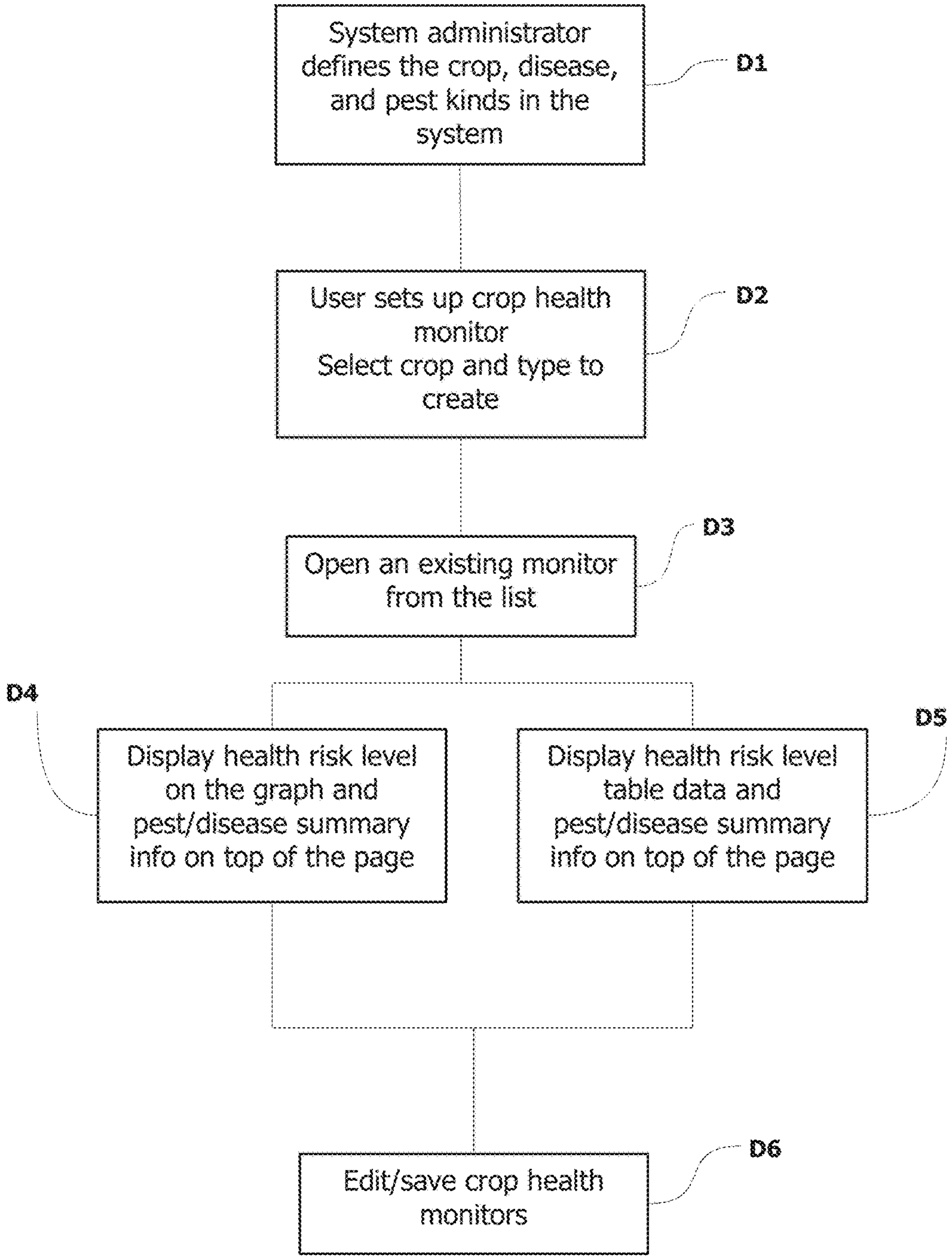
FIG. 5 is a flowchart illustrating an exemplary crop health monitor process flow in accordance with one or more embodiments.

Crop health information is important to the user to see on the main page. Predefined health monitors' summaries for pest and diseases are listed on the portlets at step (B18) and FIG. 14. Clicking on any data will open the crop health monitor configuration page at step (B19). FIG. 5 describes the details for crop health monitors.

Station status displays the reading success percentage for the stations, their battery usage, and signals. In addition to those temperature and humidity are displayed on the same table as shown in step (B21), FIG. 13 and FIG. 57. Irrigation portlet is a quick way to display the irrigation status (B20) as shown in exemplary FIG. 46. Other status portlets are farm management and information, pump status, and soil nutrient status (B22, B23, B24).

Refresh link is to refresh the windows on the dashboard instead of refreshing the entire page. All the windows can be moved to another position by clicking on the banner of the window and dragging to the new position. The windows can be minimized or closed. These are shown in step (B25).

Switching between mobile look and classic look can be done by clicking the switch link at the left bottom corner of the page as shown in step (B26).

Figure 18:
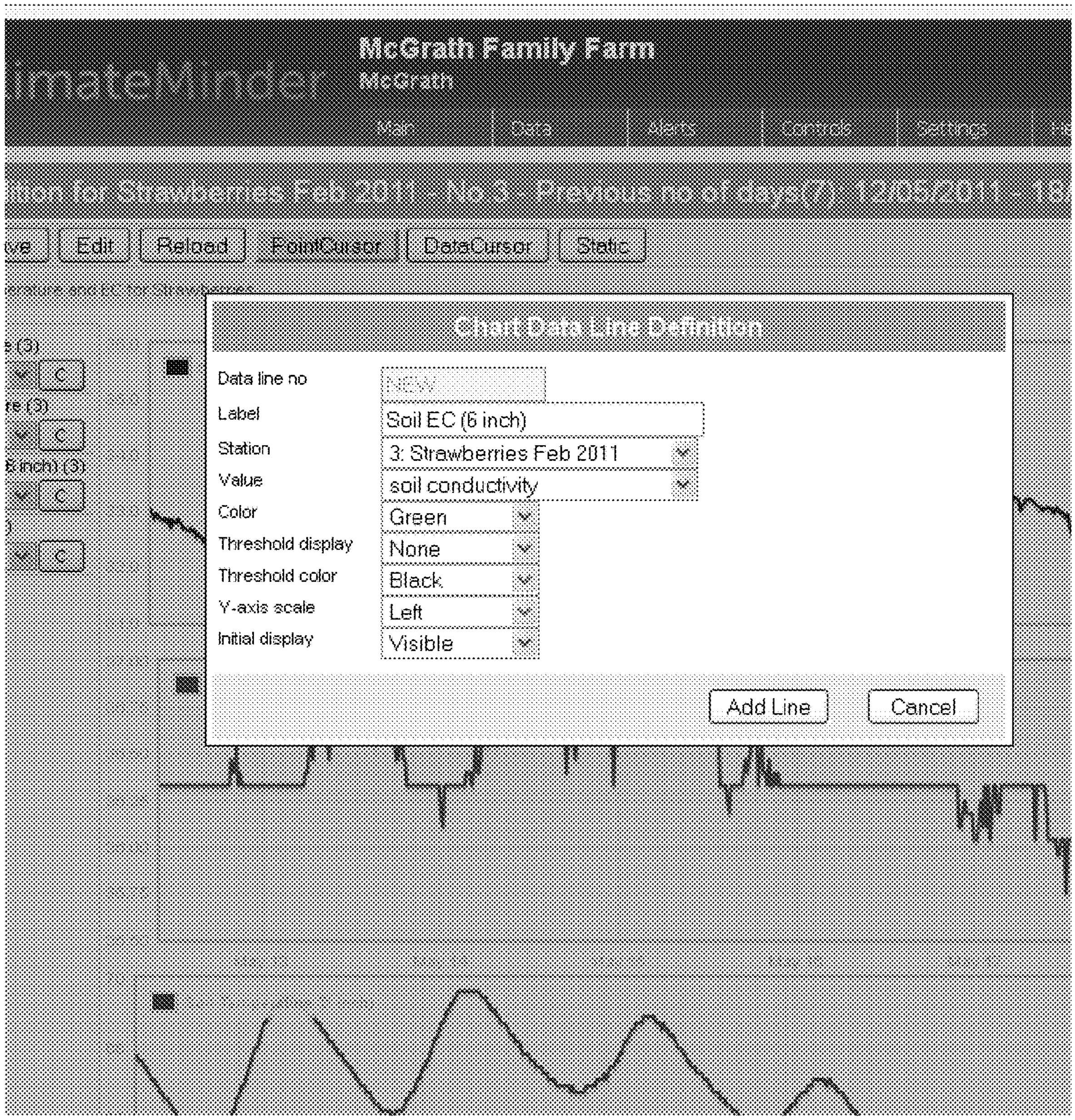

FIG. 4 illustrates the chart creation, configuration flow for the web-based remote monitoring system. From Data, charts menu, users can open the charts added before as shown in steps (C1 and C2), or add a new one as shown in step (C3). Charts can be created with preferred styles as bar, square wave, or line charts. Either during new chart addition or displaying an existing chart, users can add new lines to the charts as shown in step (C4) and the exemplary screenshot of FIG. 18. At this step, stations, what data to be read from that station should be selected from the dropdown list. Data lines can include sensor measurement, calculated values based on sensor data, predictions, disease and pest models. Data line's color, label can be changed. Threshold can be viewed either as band (colored in between) or as limit (can be drawn on the chart). Default initial display is visible, but can be changed to hidden. Lines can be removed or the configurations can be changed at any time by the users.

Figure 19:
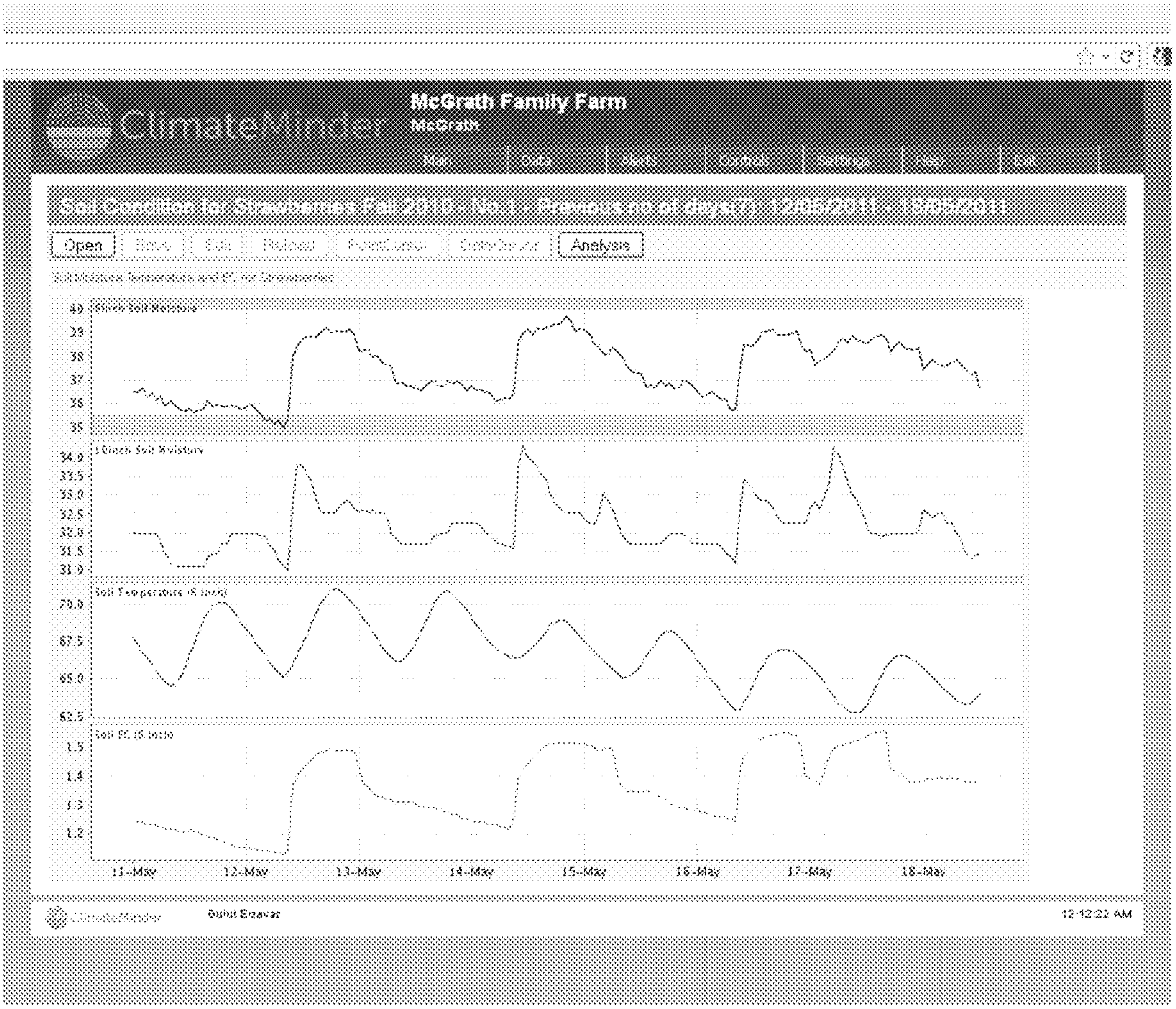
Figure 20:
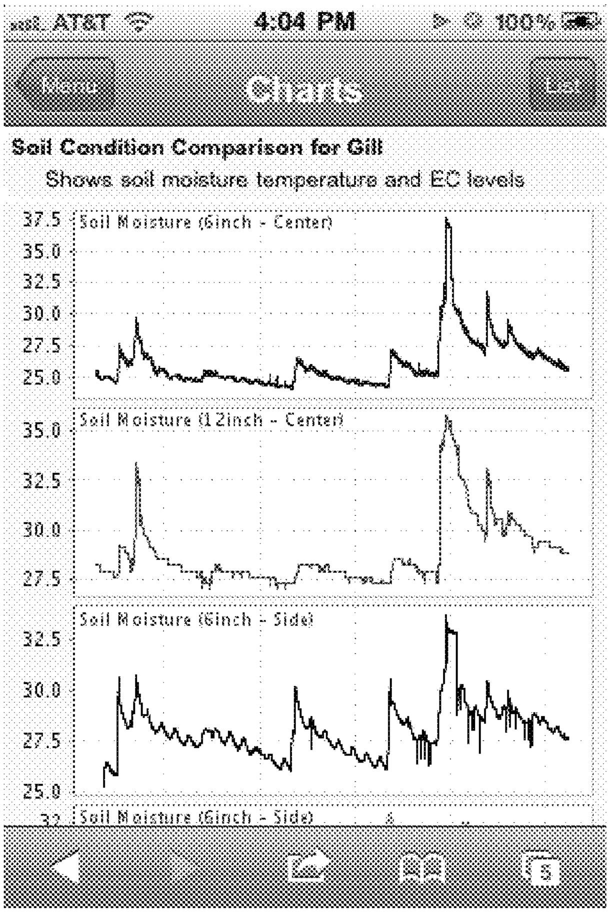
Figure 21:
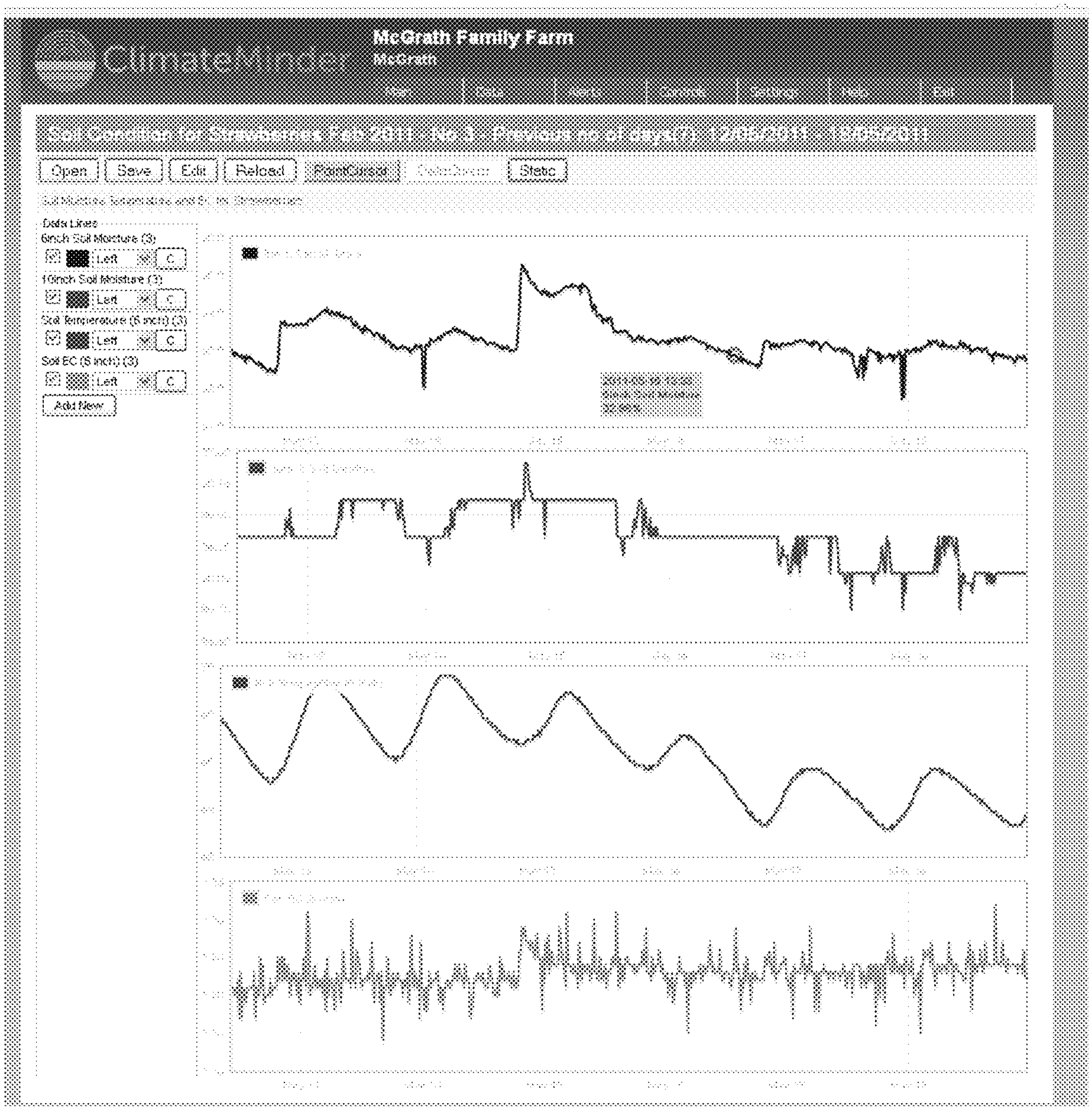
Figure 22:
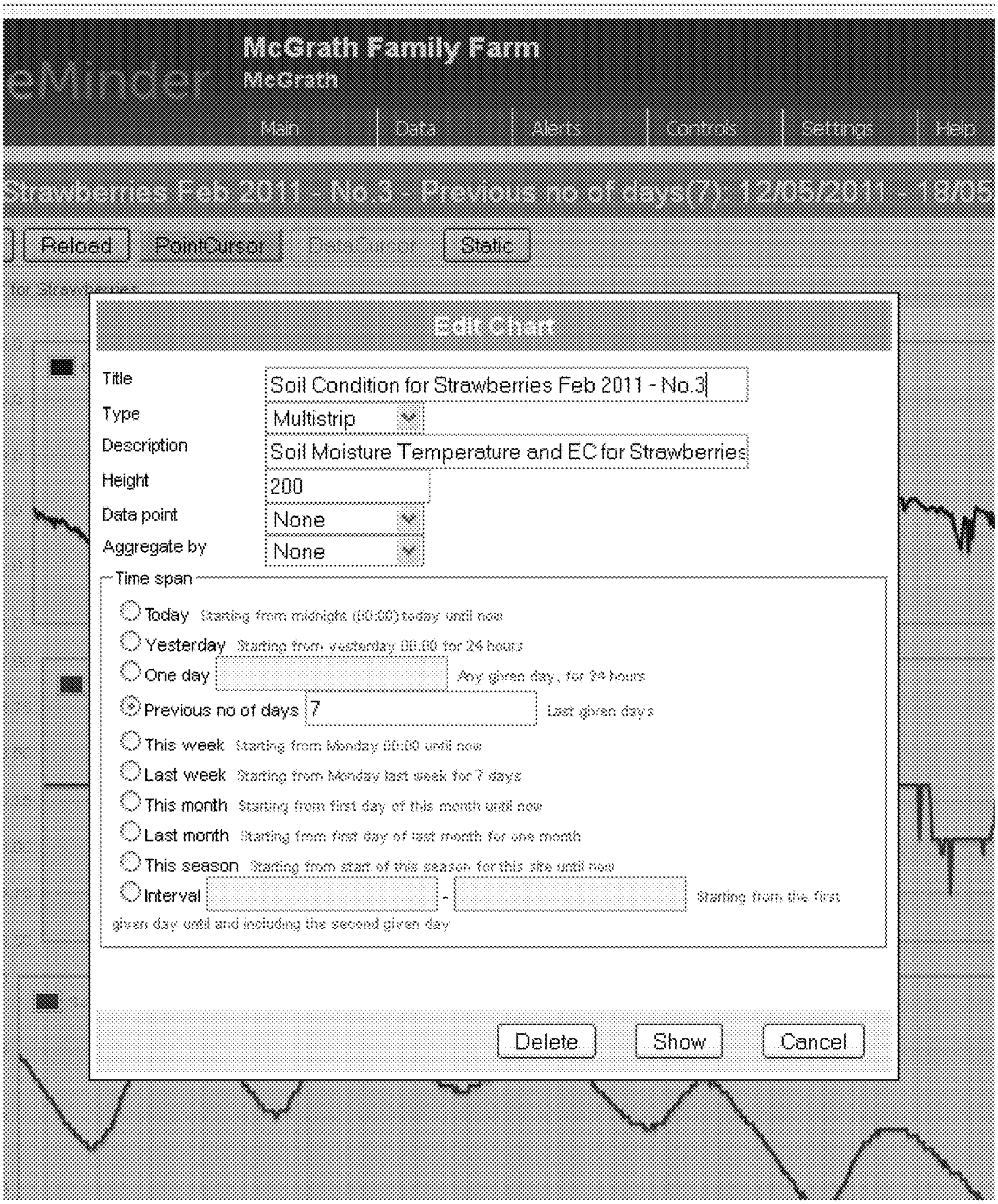

After creating a new one or selecting from the existing chart lists, charts are displayed on the screen as shown in step (C5), the exemplary screenshot of FIG. 19, and the exemplary mobile screen view of FIG. 20. The default display mode is static for all charts (C7). After opening a chart, its view mode can be changed to dynamic by clicking on "Analysis" button at step (C6) and the exemplary screenshot of FIG. 21. In the dynamic mode, the user can move the cursor and see the details as date, time and value of the points on the charts as shown in step (C8). Charts have zoom in and zoom out capabilities. Modes can be switched to static at any time. In step (C9) "Edit" button opens the configuration page for the current chart as shown in exemplary FIG. 22. Time frame can be changed at the configuration page. All changes can be saved and stored in the central database as shown in step (C9). These charts are available to be used in dashboard (classic or mobile), PDF reports, etc. Any changes can be viewed from mobile devices as well. Reloading a chart will refresh the chart with the most recent data from the central database.

Figure 23:
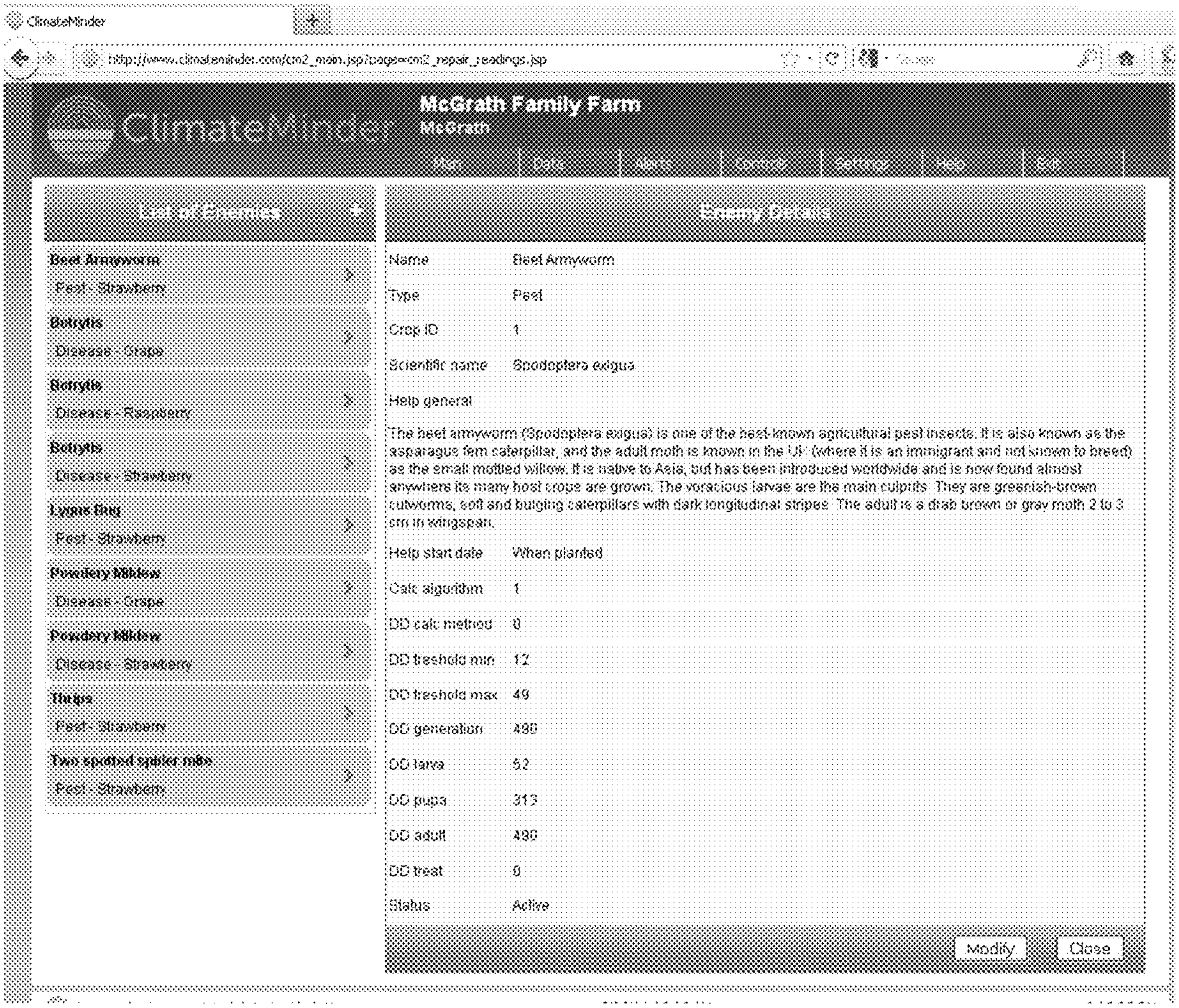
Figure 24:
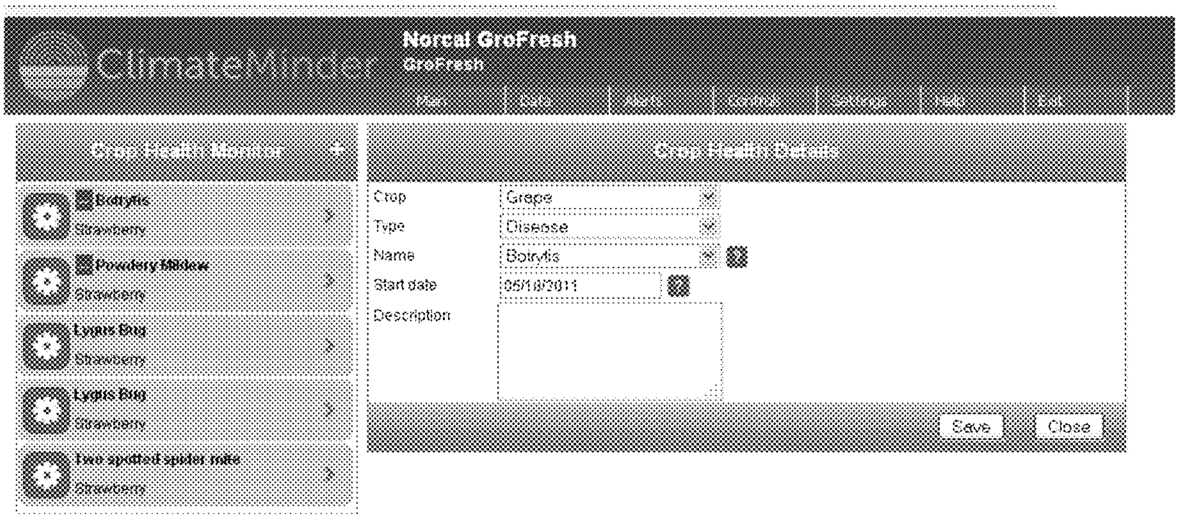
Figure 25:
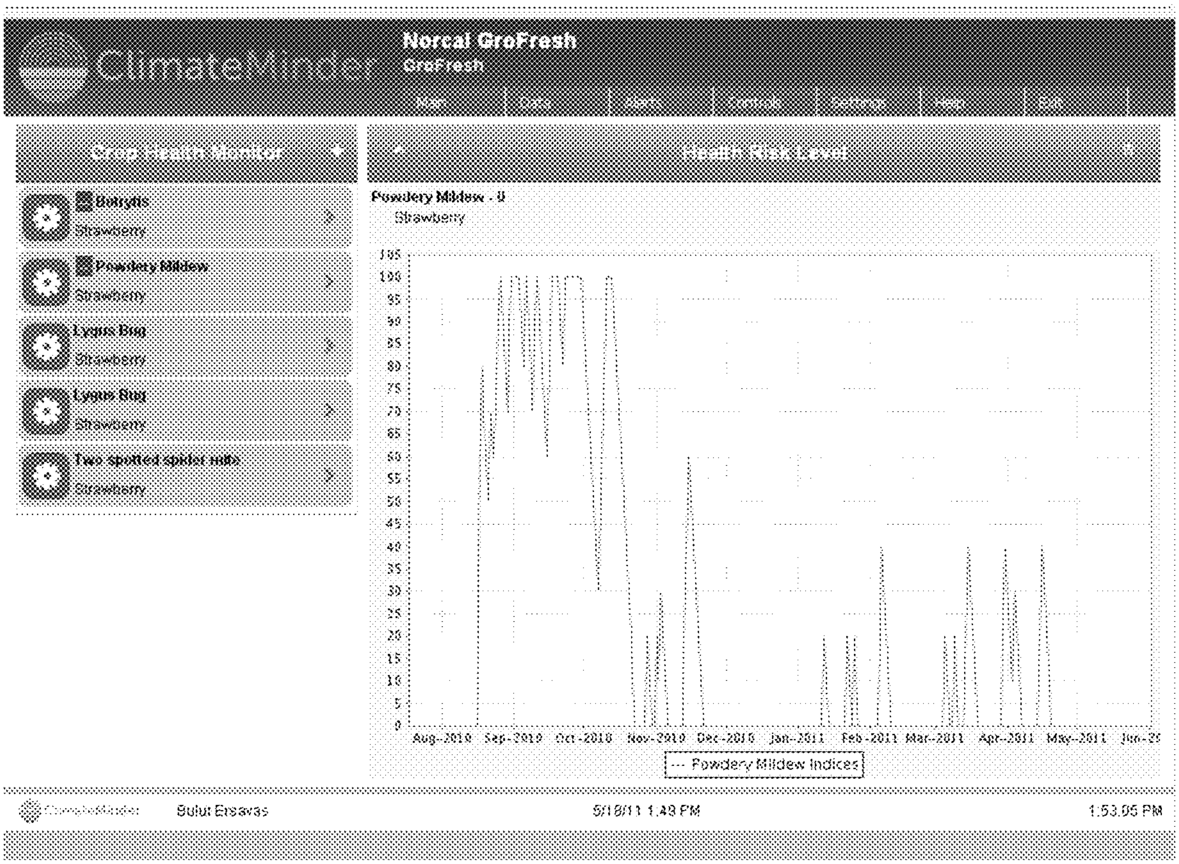
Figure 26:
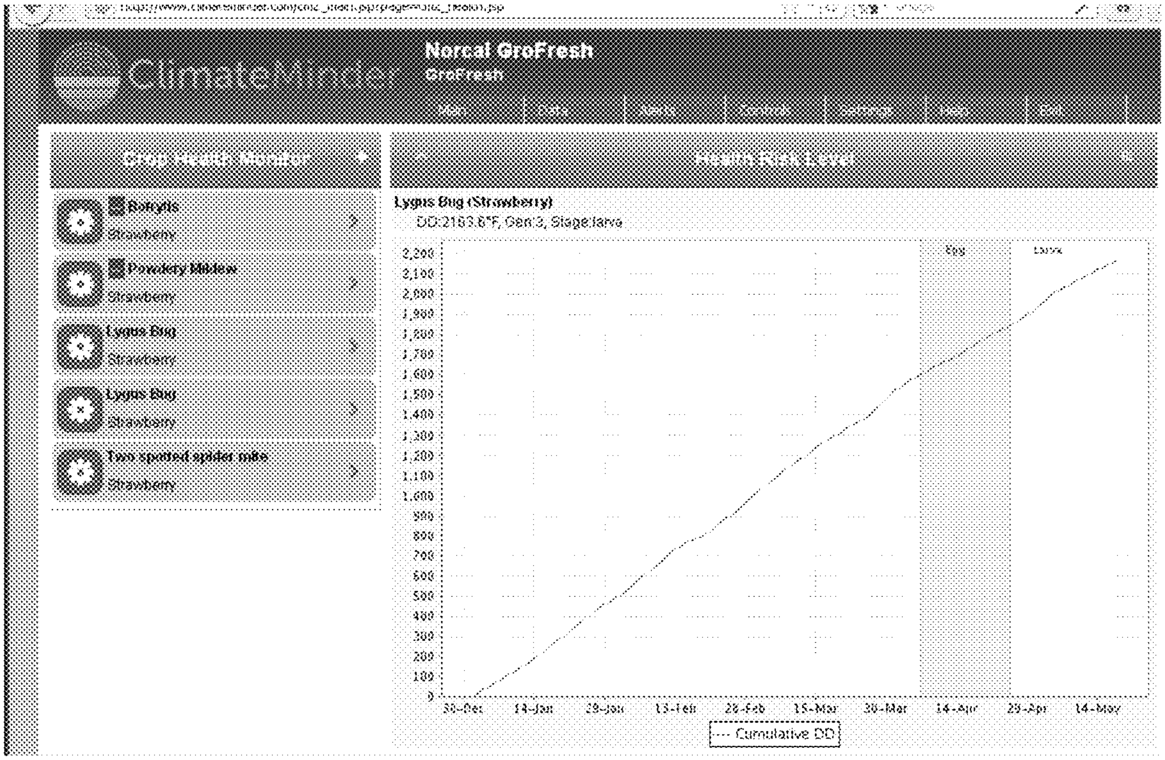
Figure 27:
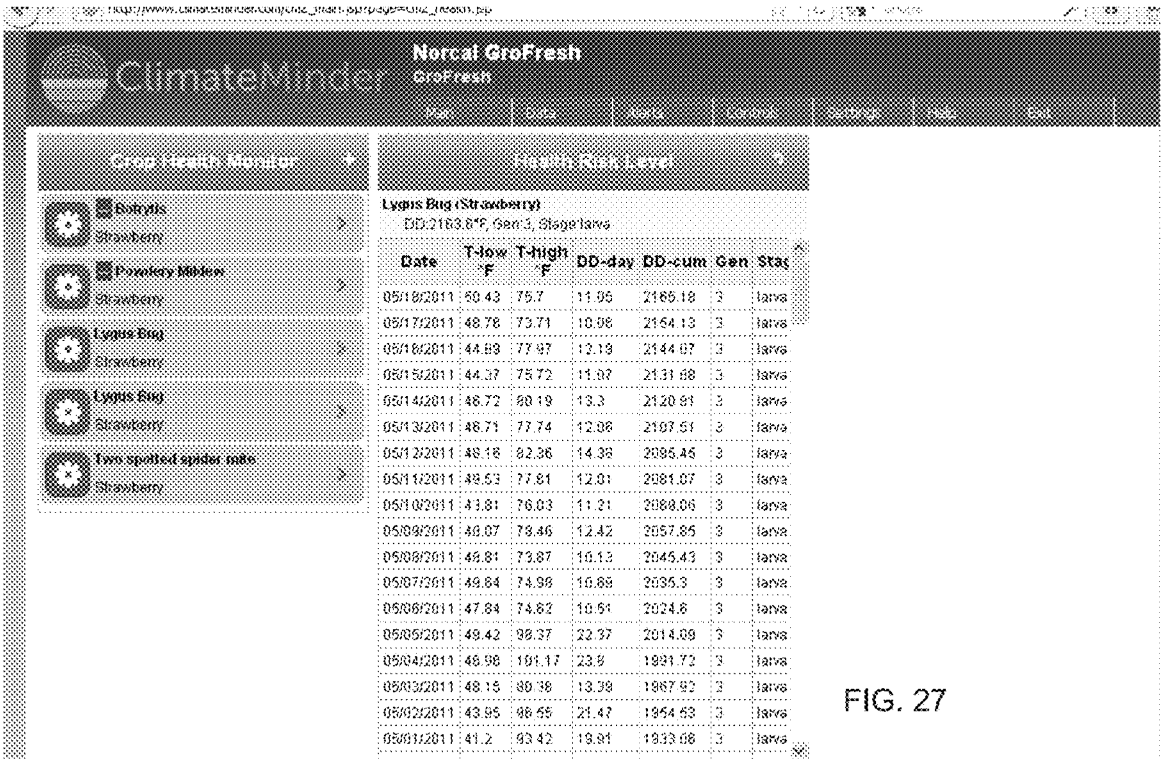
Figure 28:
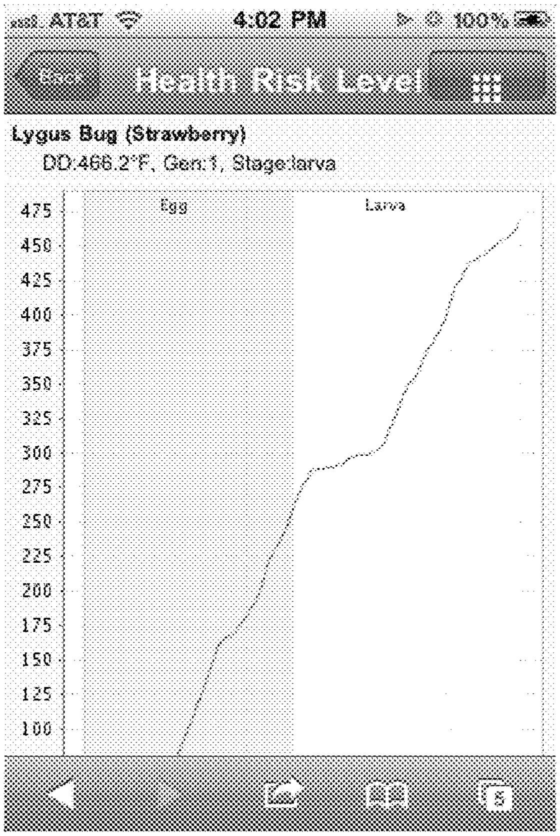
Figure 29:
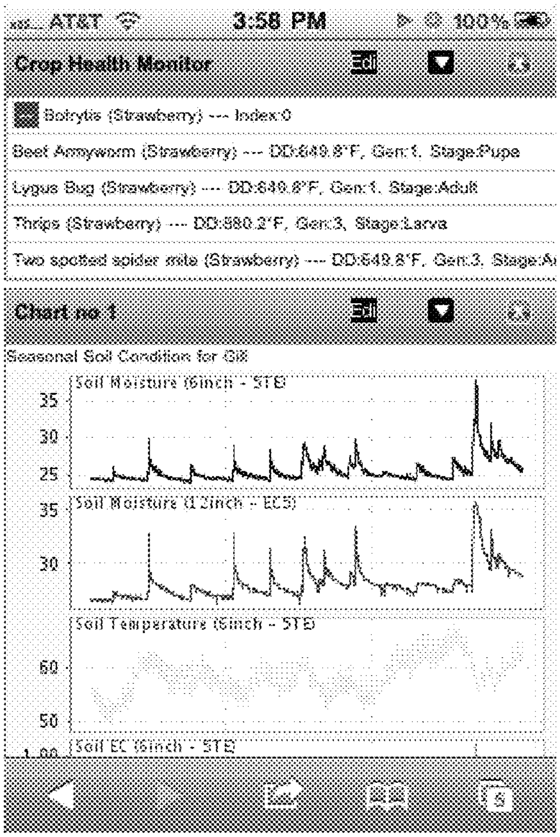

FIG. 5 illustrates the crop health monitoring for the web-based remote monitoring and control system. Crop health monitoring can be based on two types: disease and pest. Those types include disease risk indices and pest development stages based on non-proprietary models. These crop, disease, and pest kinds can be added by the system administrators at step (D1) as shown in exemplary FIG. 23. In step (D2) new crop health monitors can be created by clicking on the plus sign at the top right corner of the crop health monitor lists. Start date, name, the crop from the dropdown list and monitoring type should be defined as shown in exemplary FIG. 24. Gear icon at the beginning of the crop monitor's name takes the user to the configuration page to change the settings at step (D6). In step (D3) clicking on the name displays the monitor in any kind of chart with all different risk level zones shown in different colors as shown in step (D4), exemplary FIG. 25. In both cases (charts and table data), disease or pest summary information is displayed on top of the page as it has the same capability on the dashboard. Disease monitors have risk level (severe, high, medium) color codes next to their names as shown in FIG. 24. Pest type monitors have the charts with the last stage zones colored as shown in exemplary FIG. 26. In step (D5), users can choose to see the raw data in a table by clicking on the table sign on the top right corner of the monitor as shown in FIG. 27. FIG. 28 shows the mobile screen for a pest type crop health monitors and FIG. 29 displays the dashboard with crop health monitor on a mobile phone.

Figure 30:
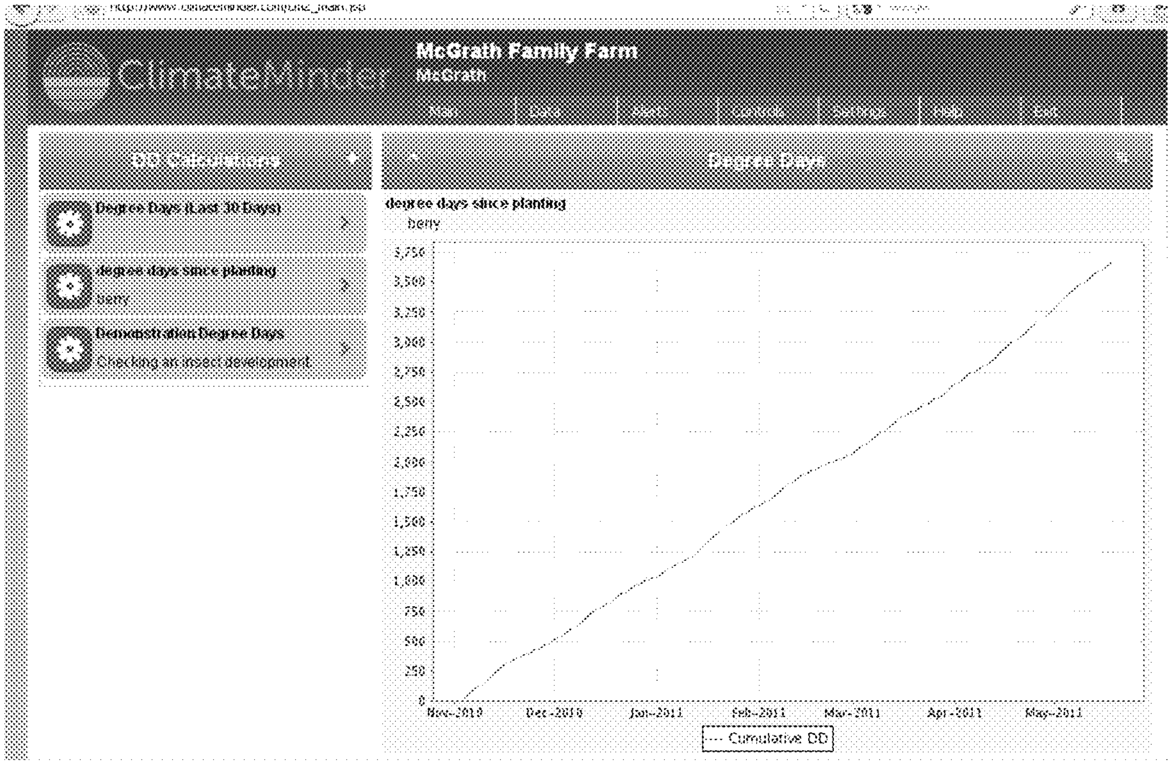
Figure 31:
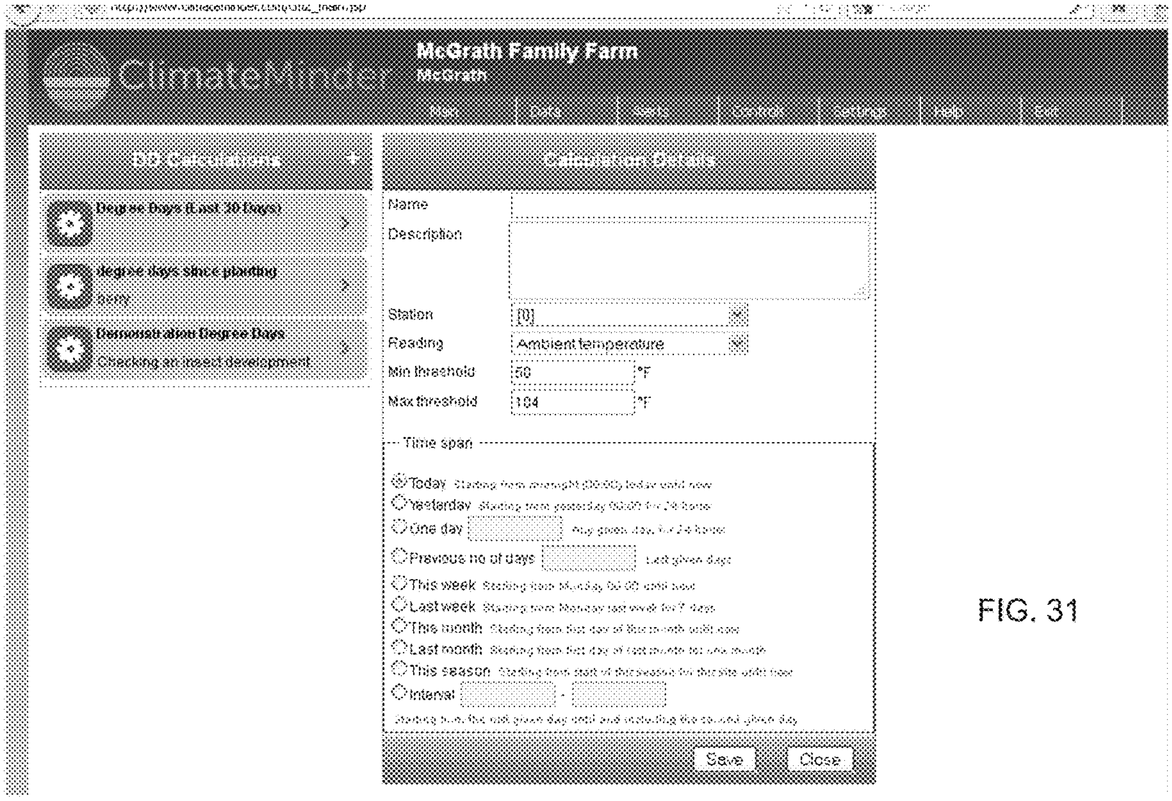
Figure 32:
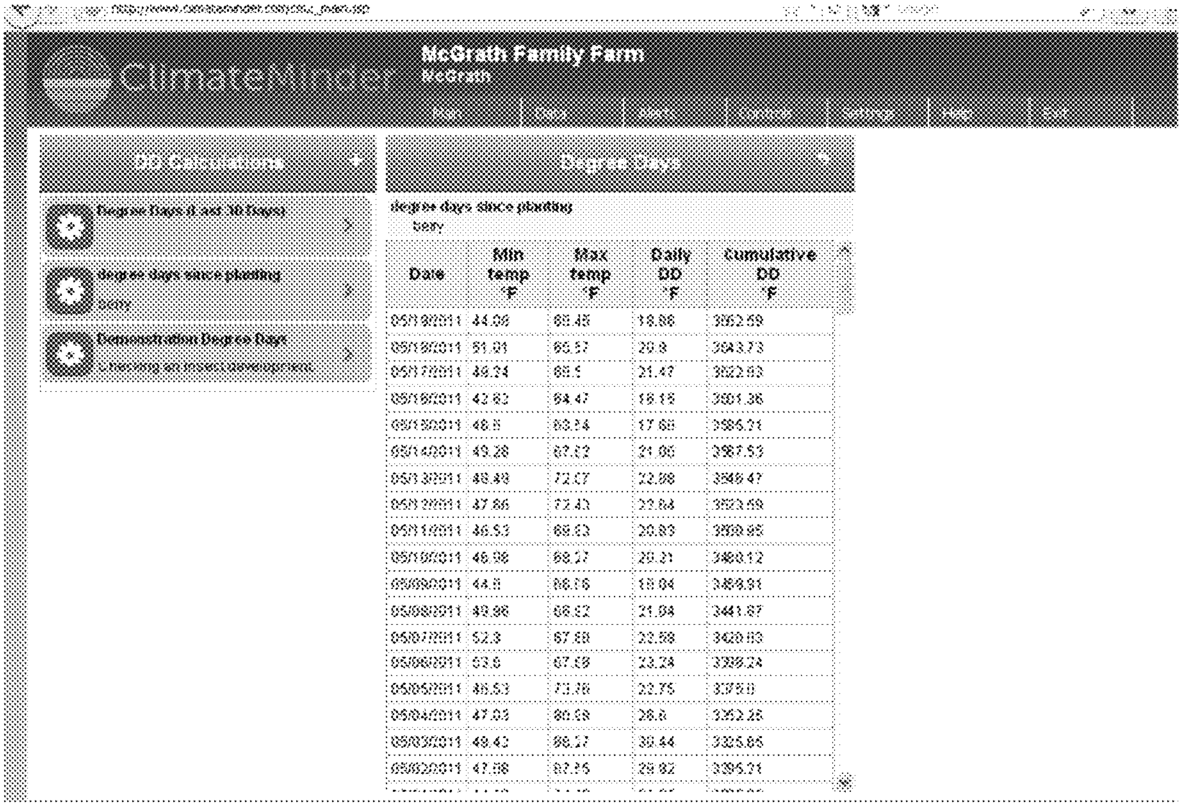
Figure 33:
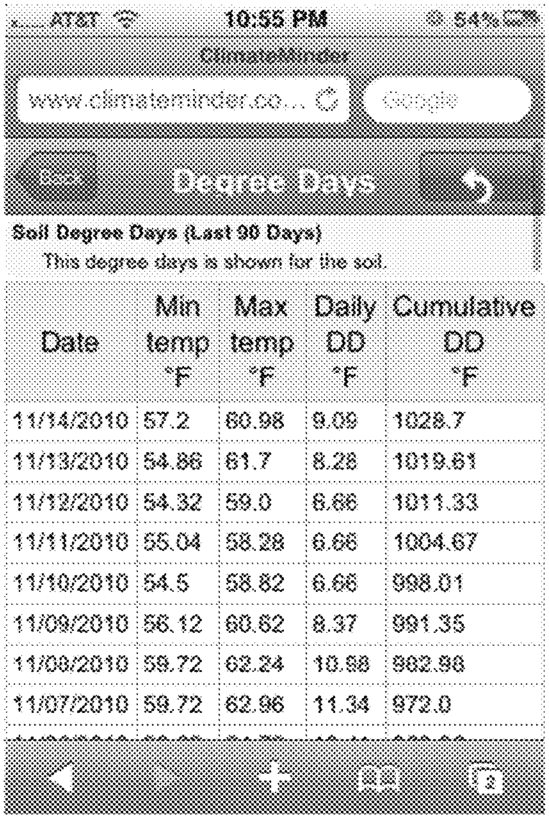

FIG. 6 illustrates the degree days calculation process flow for the web-based remote monitoring system. A degree day is a measure of heating or cooling. Totalized degree days from an appropriate starting date are used to plan the planting of crops and management of pests and pest control timing. Users can add new degree day calculations at step (E1) by clicking on the plus sign at the top right corner as shown in exemplary FIG. 31. Temperature reading and station should be defined in the process of degree day creation. Minimum and maximum thresholds, and time frame are used in the calculations. The gear icon at the beginning of the degree days calculations' name takes the user to the configuration page to change the settings at step (E5). In step (E2) clicking on the name displays the calculations in any kind of chart as shown in step (E3), exemplary FIG. 30. In step (E4), users can choose to see the raw data in a table by clicking on the table sign on the top right corner of the degree day calculation as shown in FIG. 32. FIG. 33 shows the mobile phone screen with the degree days calculation table. Users can always return to the graph by clicking on the return sign at the right top corner of the table.

Figure 7:
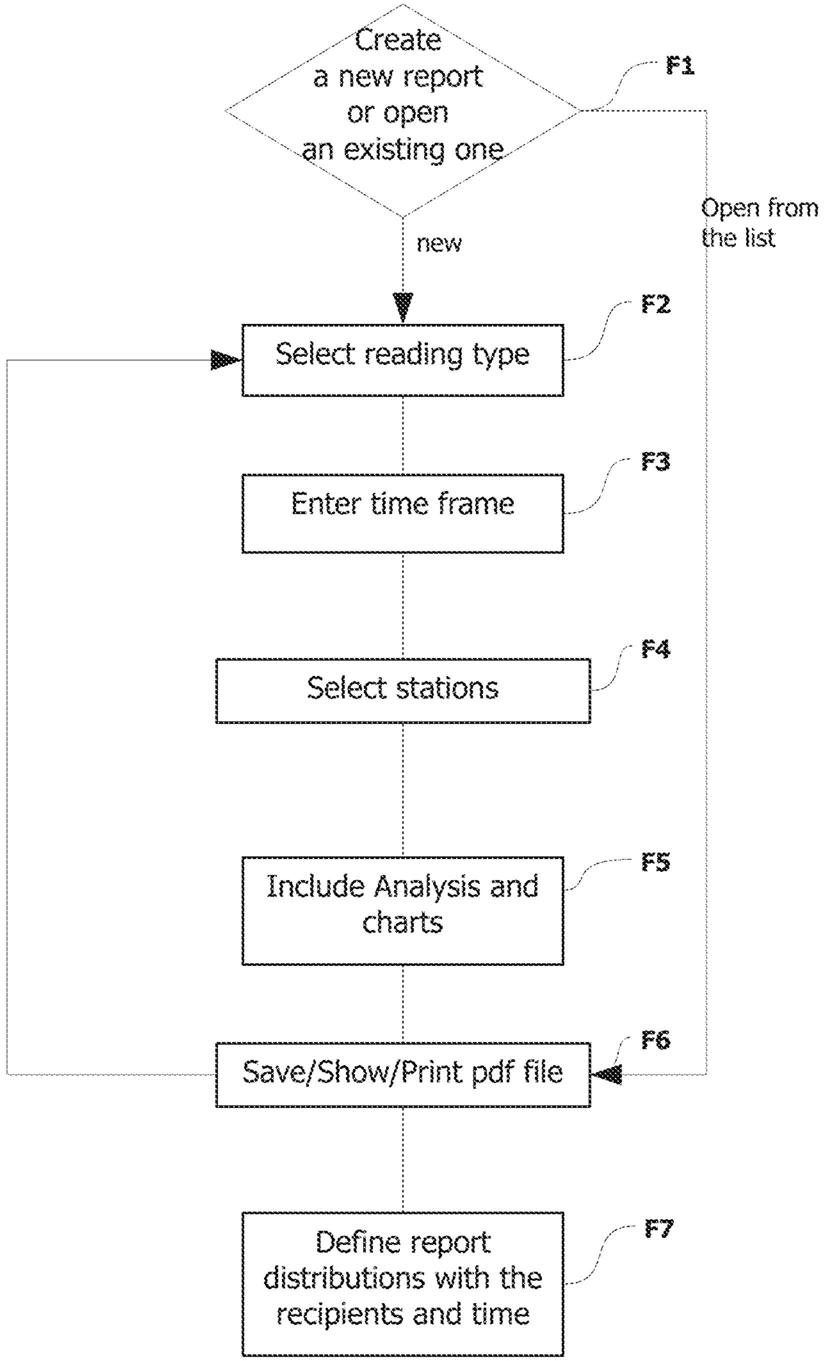
FIG. 7 is a flowchart illustrating an exemplary report creation process flow in accordance with one or more embodiments.
Figure 34:
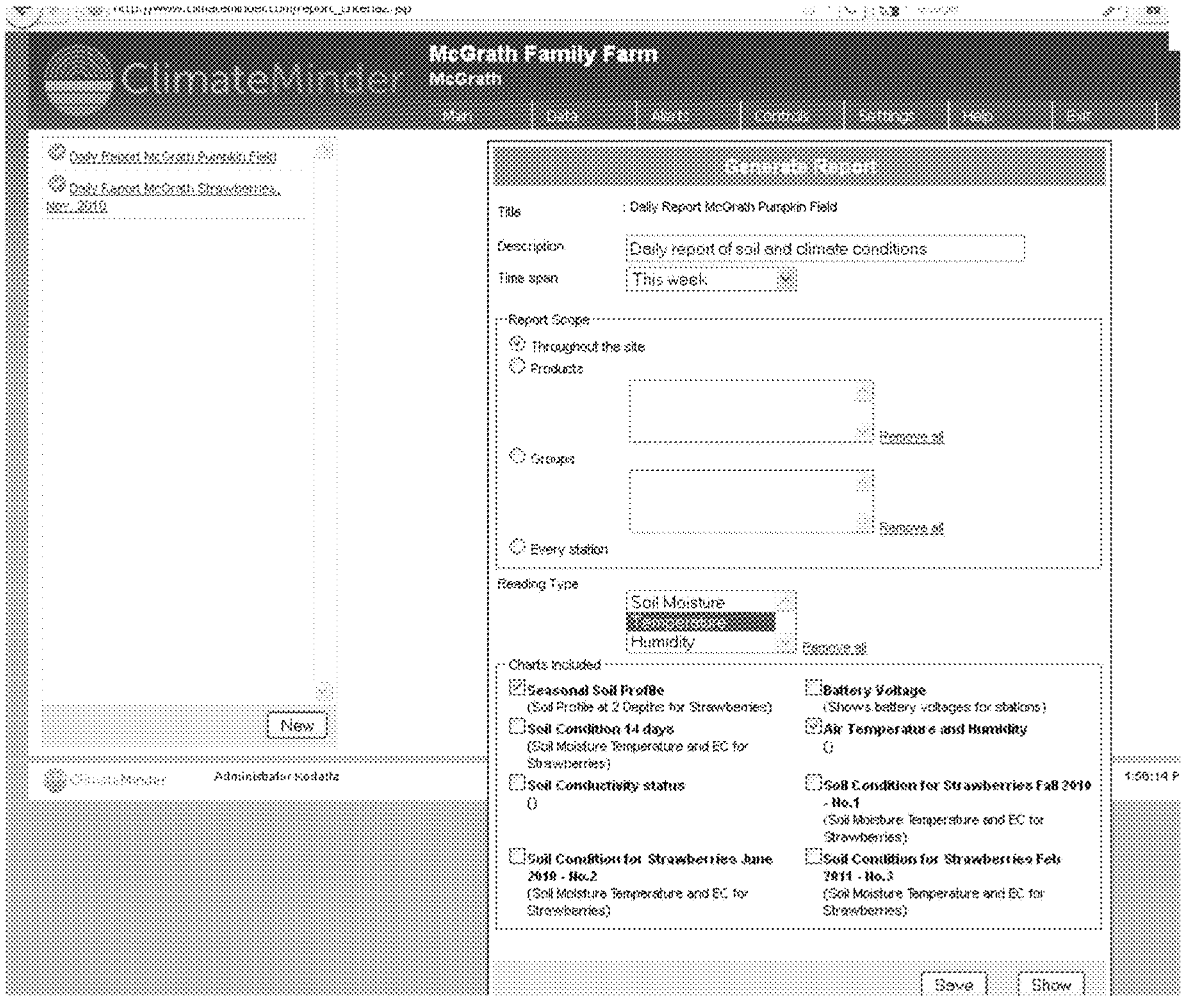
Figure 35:
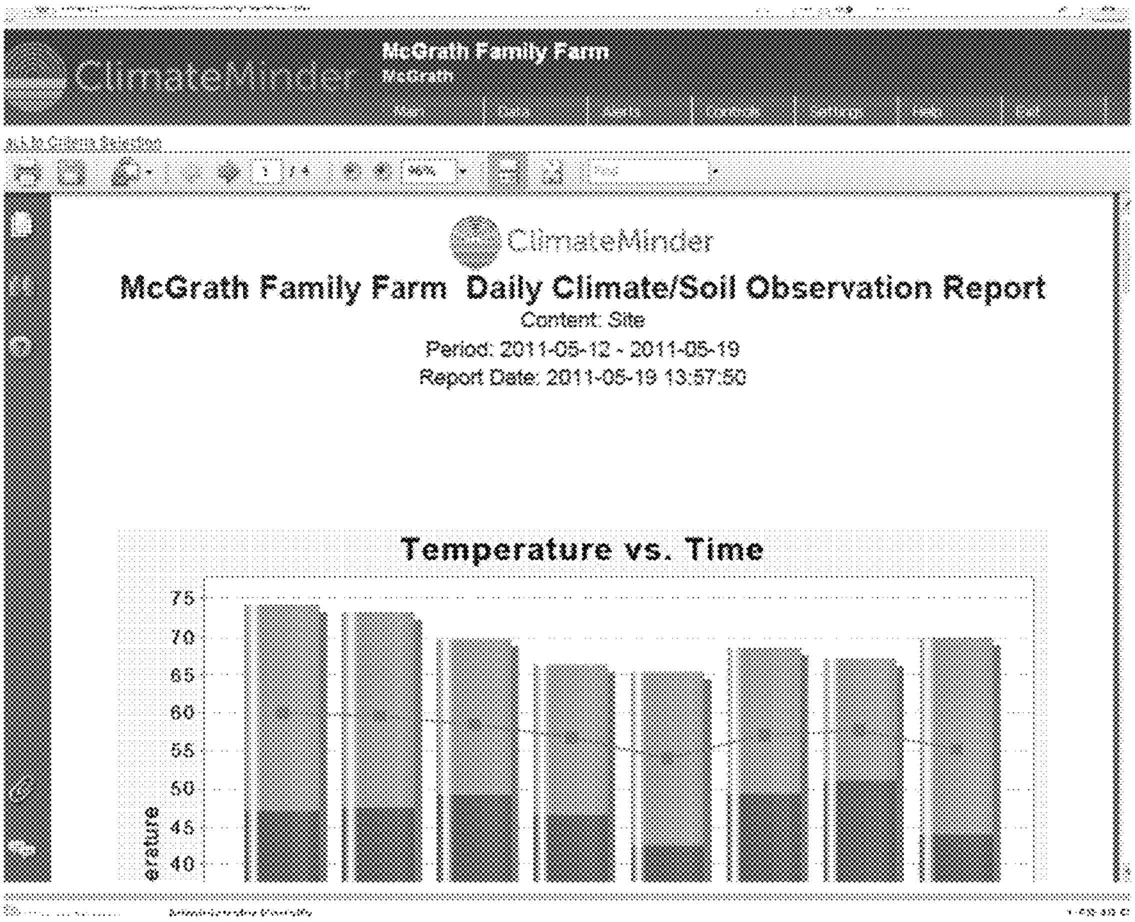
Figure 36:
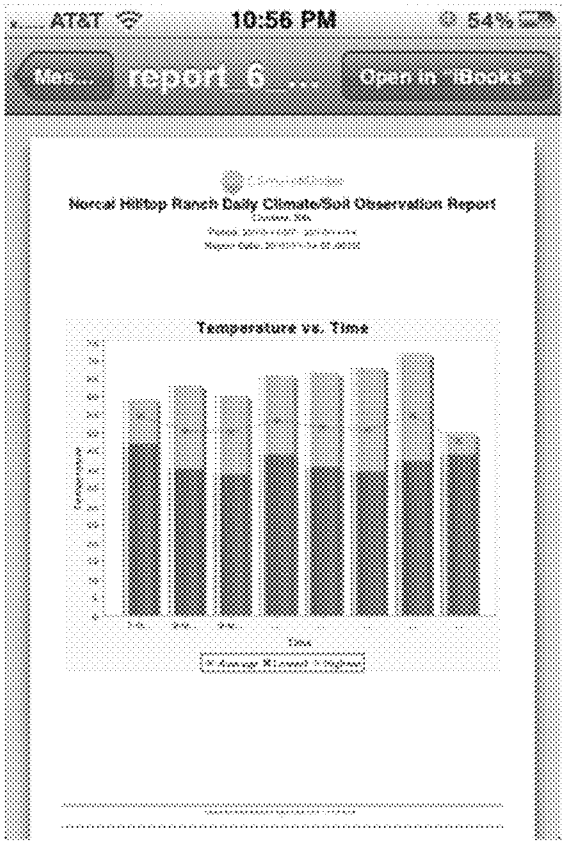
Figure 37:
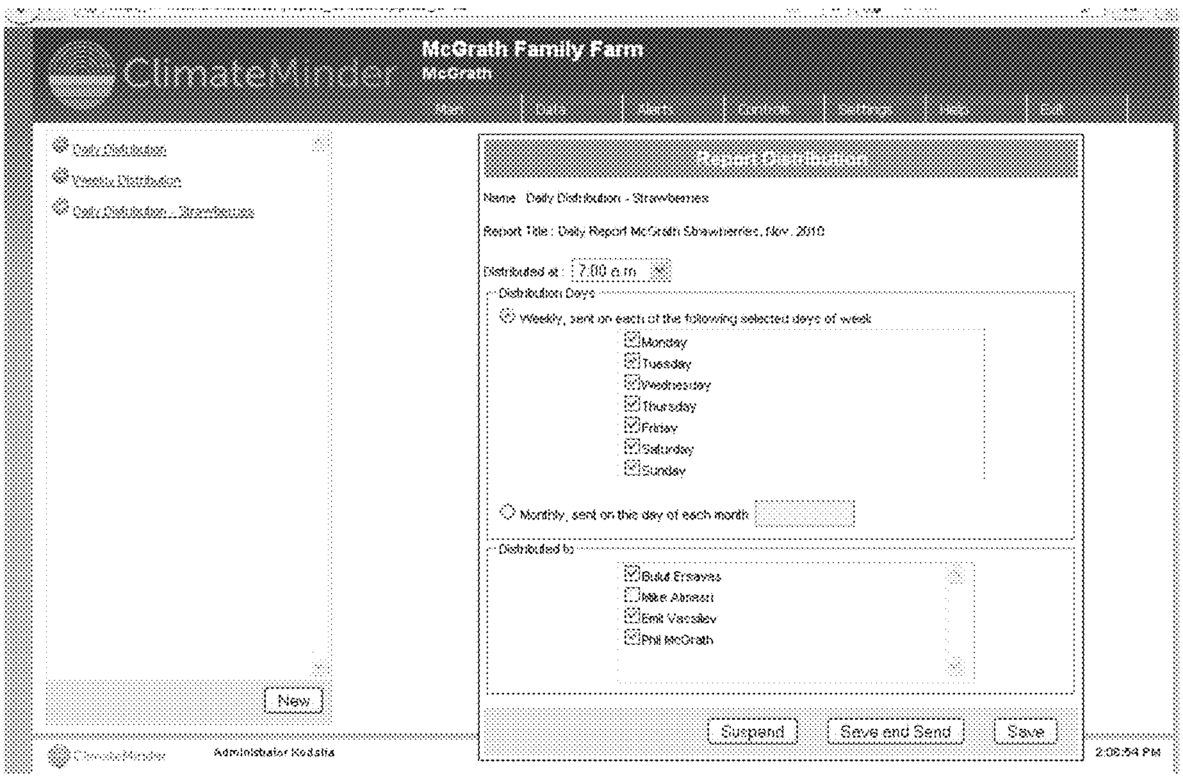

FIG. 7 illustrates the report creation process flow for the web-based remote monitoring system. At step (F1), as shown in exemplary FIG. 34, reports can be displayed from the list on left hand side of the screen or a new one can be created by clicking on the "New" button at the bottom of the report list. During the creation of a new report, reading type should be defined by selecting from the reading drop down list at step (F2). Reports will be created based on the entered time frame at step (F3). The user defines the station from which the reading will be read or reports can be created for the entire site at step (F4). Users can add their predefined charts described at FIG. 4 to the reports at step (F5). These steps are done as shown in FIG. 34. After specifying the details of the report, it can be saved, shown on the screen, printed, or exported to a PDF file at step (F6) as shown in exemplary FIG. 35 (personal computer screen) and in exemplary FIG. 36 (mobile phone screen). These reports can be distributed to more than one recipient at the specified time of the preferred days of every week or one day of every month at step (F7) as shown in exemplary FIG. 37. Reports may have multiple distributions with different recipients at different times.

Figure 8:
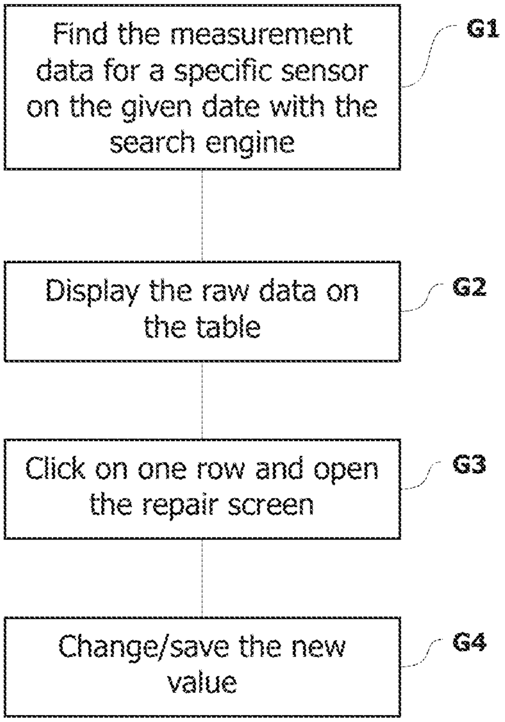
FIG. 8 is a flowchart illustrating an exemplary data repair process flow in accordance with one or more embodiments.
Figure 38:
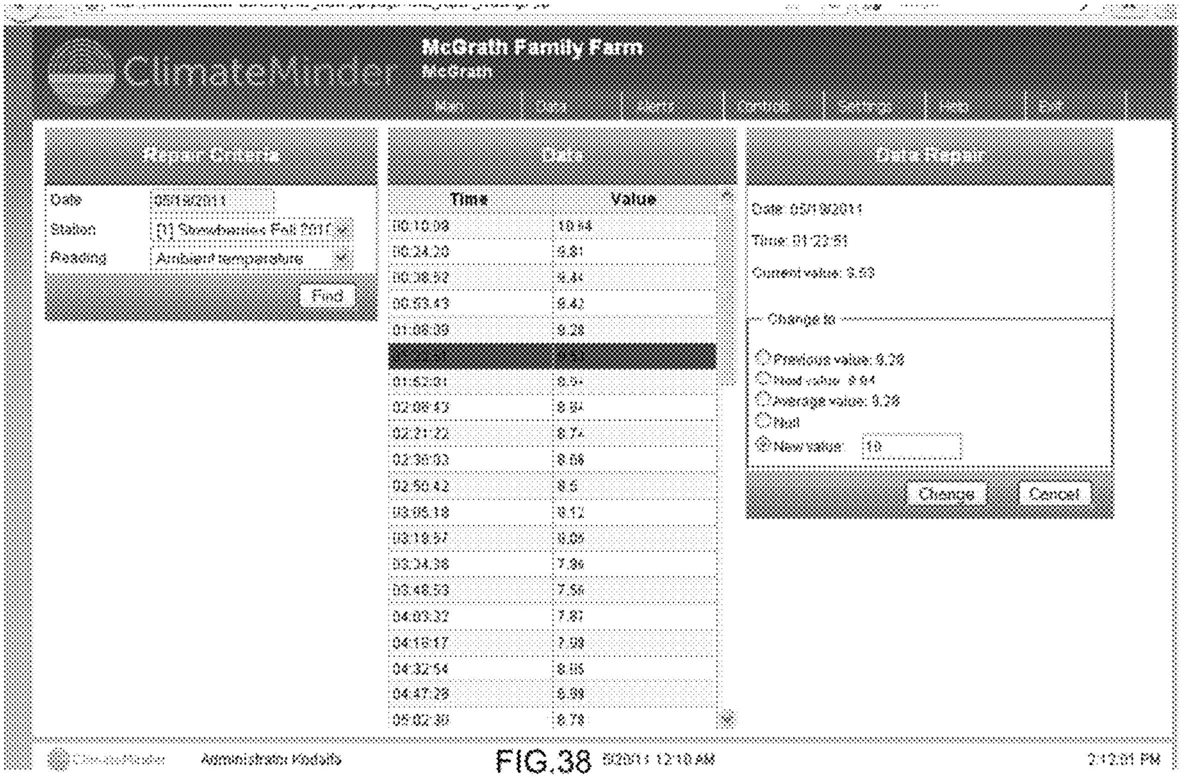

FIG. 8 illustrates the data repair process flow for the for the web-based remote monitoring system. On the repair criteria window, user can find the measurement data for a specific sensor on the given date at step (G1) as shown in exemplary FIG. 38. When the user enters the information and hits the "Find" button, "Data" window will display the data table at step (G2). When a row is selected on the table, a third window "Data Repair" will be shown to change the selected data at step (G3). The selected row data can be changed with the previous value, next value, average value, or a new value entered by the user at step (G4) as shown in FIG. 38.

Figure 39:
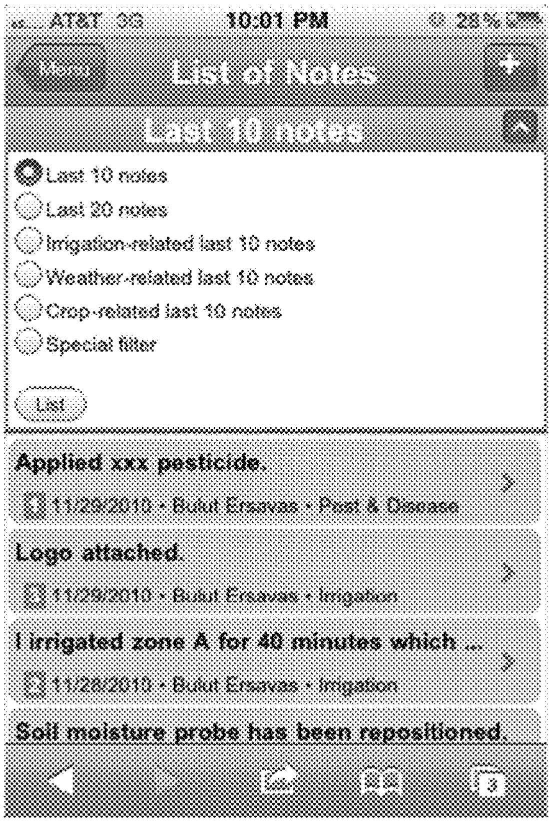
Figure 40:
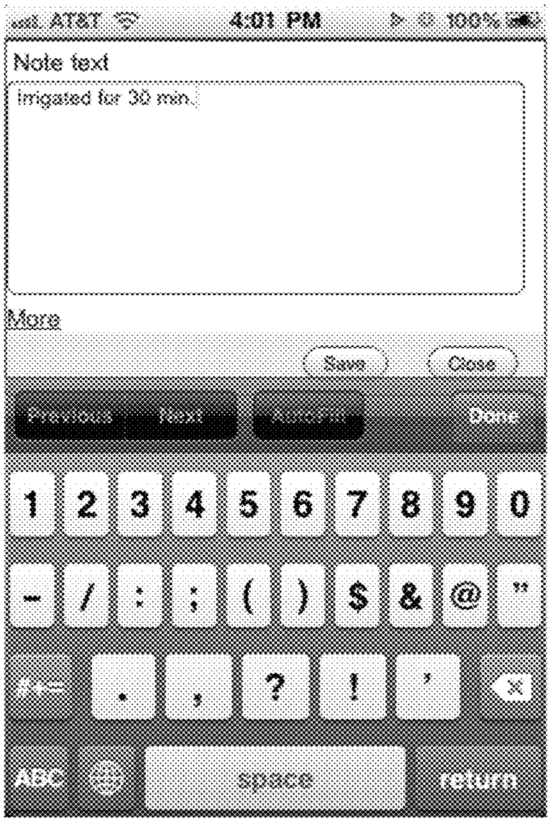

FIG. 9 illustrates the note creation process flow for the for the web-based remote monitoring system. Users can either open a note from the list by clicking on the name of the note or create a new one by clicking the plus sign on top right corner of the list window at step (H1). The note list screen can be expanded by the down arrow on the "List of Notes" window. User can select the category based notes, last specified number of nodes by clicking the radio buttons, or do an advanced search by "special filter" option at step (H2) as shown in exemplary FIG. 41. The notes can be sorted by date or importance. Clicking "List" button will change the note list shown right after the search window. During new note creation, note category can be set optionally, station is assigned, and related files may be attached at step (H3). At step (H4), note details will be shown in a new window. The default screen shows only the note text. There is a link "More" for more details. At step (H6), the station, category, reading type, date, author, importance (high, medium, low), and privacy (public, private) can be changed by clicking on "Modify" button. If needed, a screenshot, or any document can be added to the note at step (H5). User can always switch to the "only text" screen by clicking on the "Less" link. Notes can be saved or deleted by the user. User can display or edit the notes through mobile phones as shown in FIGS. 39-40.

Figure 10:
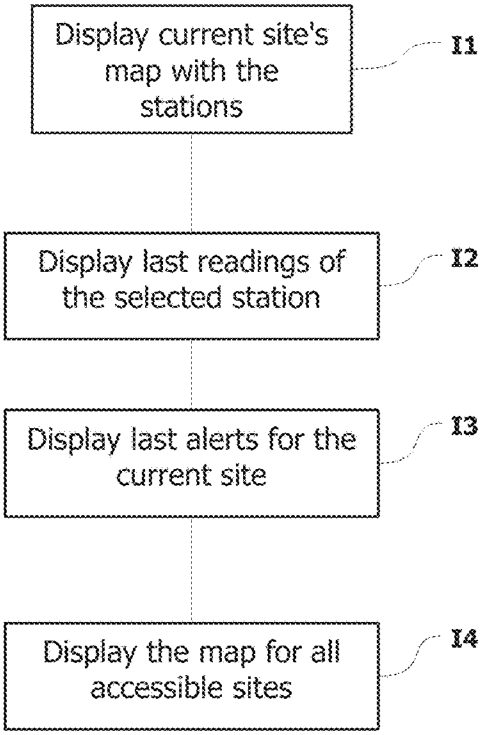
FIG. 10 is a flowchart illustrating an exemplary site or station map usage process flow in accordance with one or more embodiments.
Figure 42:
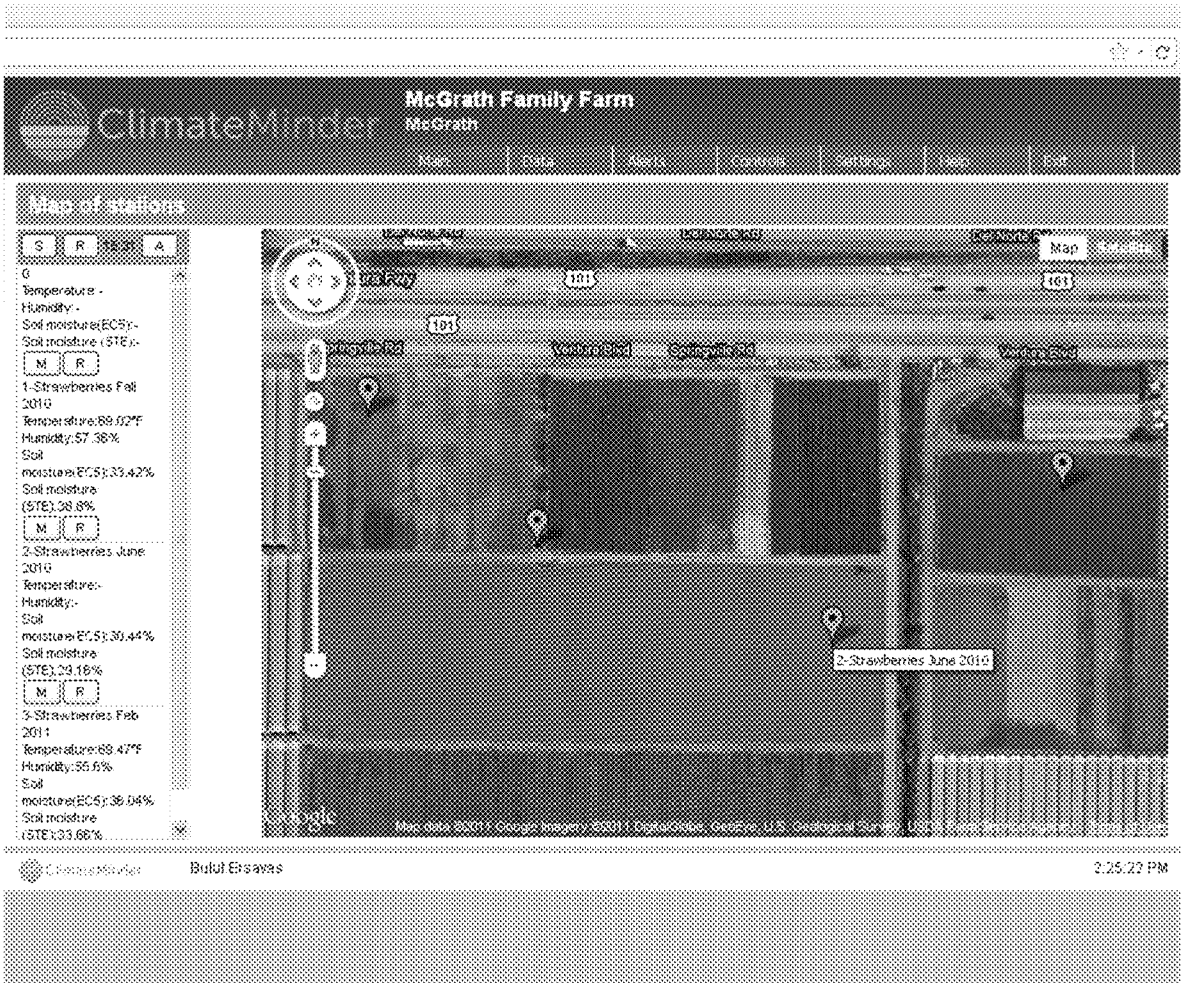
Figure 43:
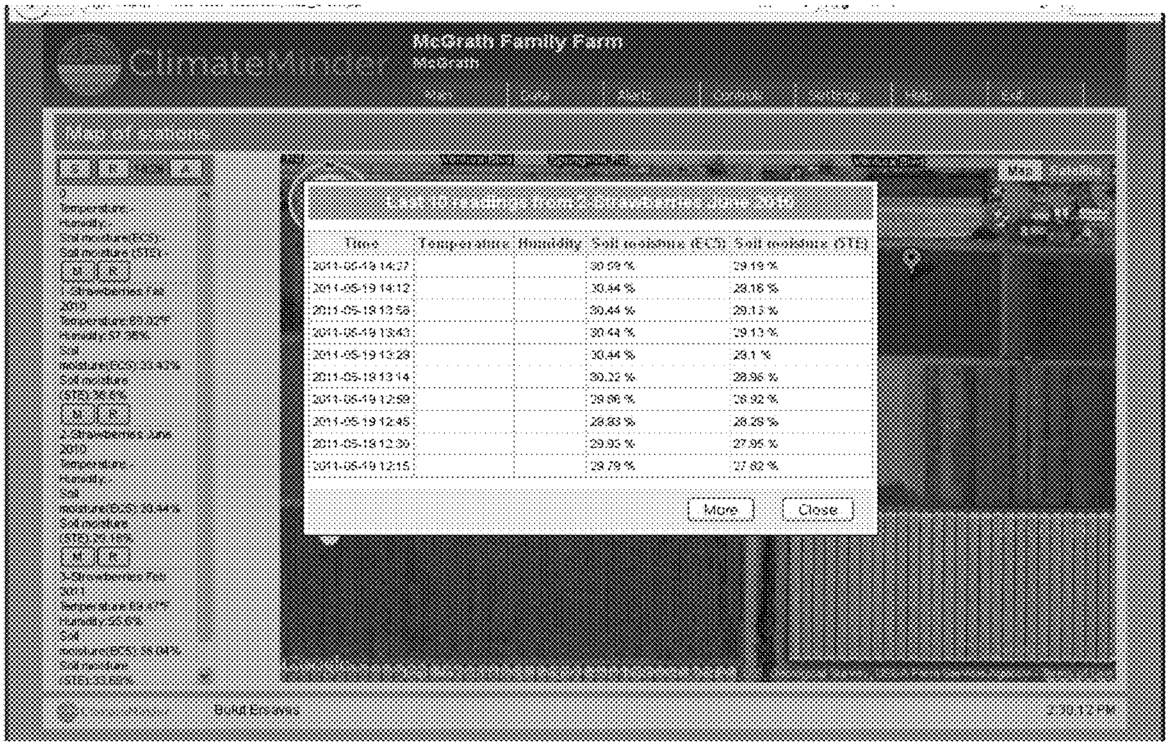
Figure 44:
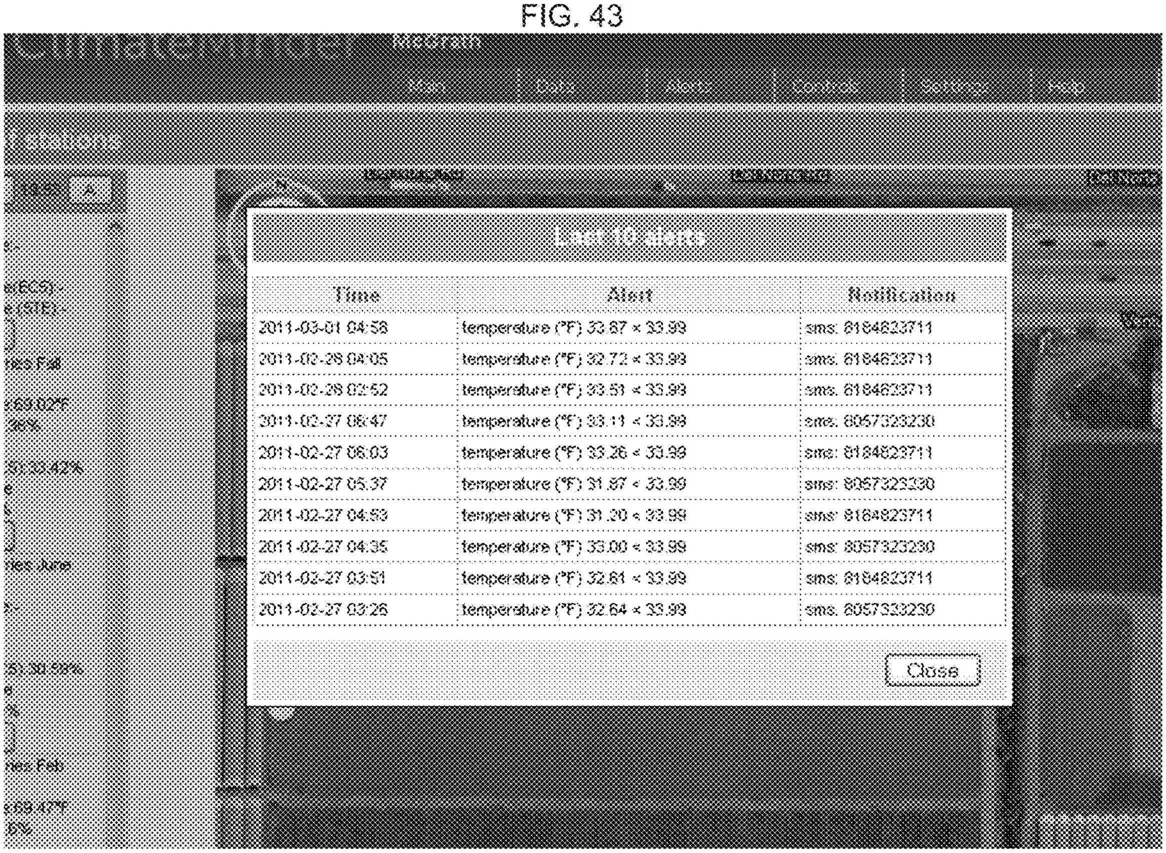
Figure 45:
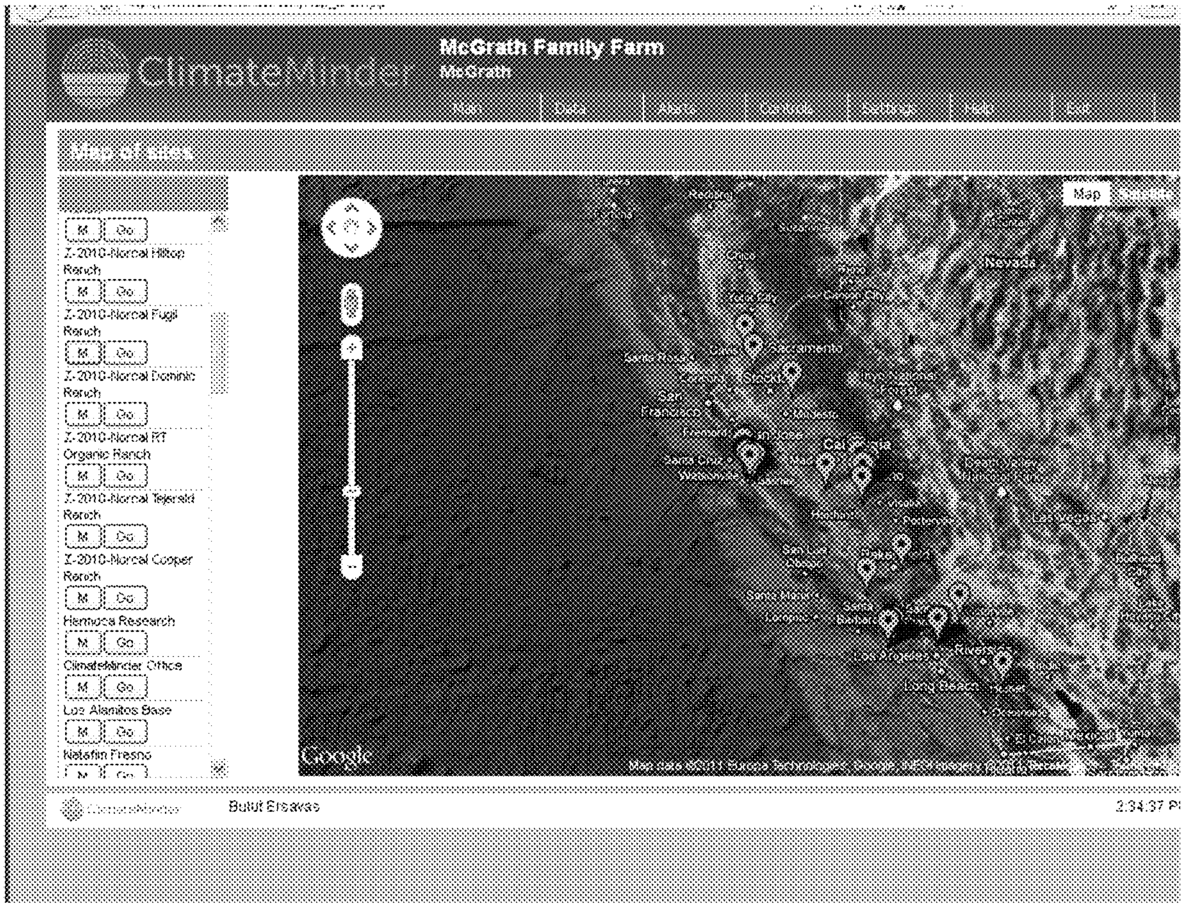

FIG. 10 illustrates the site/station map usage process flow for the for the web-based remote monitoring system. The system displays the current site map through, e.g., "Google maps" at step (I1) as shown on exemplary FIG. 42. The name of the station is shown when the cursor moves over the stations pivots. "M" button on the left hand side for the stations centers that station on the screen. At step (I2), "R" button displays the last readings from that station as shown in exemplary FIG. 43. "More" button takes the user to the detailed readings page. Top banner of the left hand side includes three buttons ("S", "R", and "A") and a digital clock. At step (I3), "A" button displays the last alerts for the current site as shown in exemplary FIG. 44. "R" refreshes the data and the alerts. At step (I4), "S" displays the map with all accessible sites for the current user as shown in FIG. 45. "M" button on the left hand side centers that site on the map, and "Go" switches the current site to the selected one as shown in FIG. 42.

Figure 11:
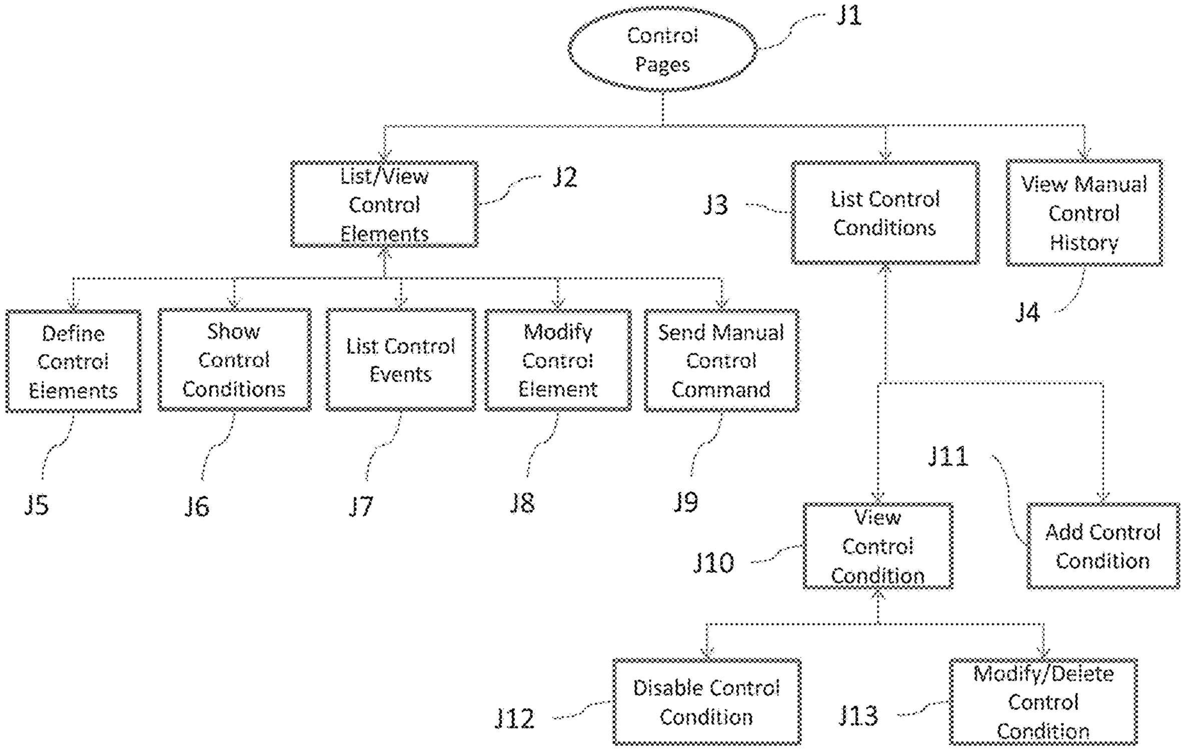
FIG. 11 is a flowchart illustrating an exemplary control process flow in accordance with one or more embodiments.

FIG. 11 illustrates the control element and condition management process flow. The system allows users to list and view control elements that define the elements which the controller physically controls (J2) as shown in exemplary FIG. 48 and FIG. 49. After a physical connection made between the controller equipment and the equipment to be controlled (e.g., irrigation valve, pump, heater, cooler, fan etc.), the user defines the control element in the software through step (J5). An exemplary control element definition page is provided in FIG. 47. For a selected control element, users can show defined control conditions (J6), list control event logs (J7) as shown in exemplary FIG. 50, modify the control element (J8) and send manual control commands to the element (J9). Through the control pages, users can also view the manual control history including the log of who turned on/off what and when (J4) and list control conditions (J3). When it comes to control conditions, users can view the details of each control condition (J10) as shown in exemplary FIG. 51 or add new ones (J11). Each control condition is stored on the central server's database as well as the related controller equipment at the site (e.g. field or greenhouse). Each condition can be disabled (J12), modified or deleted (J13). Control condition pages adapt to the device used for simplifying the browsing on a mobile device as shown in exemplary FIGS. 52A-52B.

Figure 12:
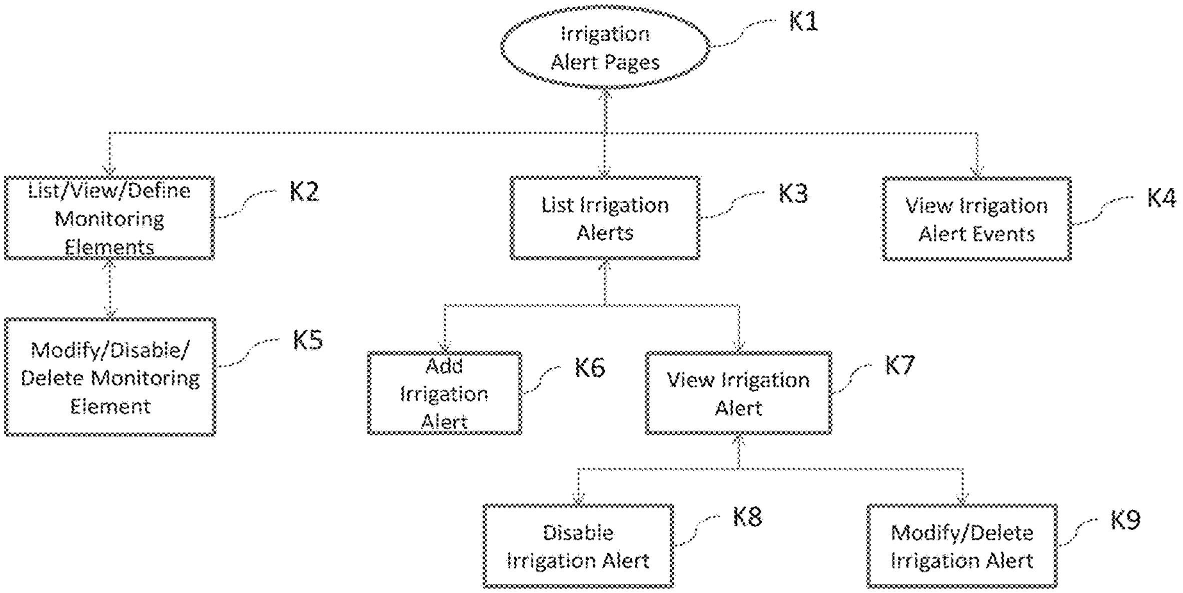
FIG. 12 is a flowchart illustrating an exemplary irrigation alert process flow in accordance with one or more embodiments.

FIG. 12 illustrates the irrigation alert definition and management process flow. The first step of setting up an irrigation alert is to define monitoring elements such as pressure switches or water flow meters. The purpose of the irrigation alerts is to notify or alert users when an expected (i.e., planned) irrigation activity does or does not occur. Users can list and view details of monitoring elements (K2) as shown in exemplary FIGS. 53, 54A, and 54B. By clicking or tapping on the + sign shown on these pictures, users can define new monitoring elements. Once the monitoring element is defined and the irrigation schedule or the control condition is known, users can add irrigation alerts (K6). Listing and viewing the details of previously created irrigation alerts can be done on the same page as shown in the exemplary FIGS. 55, 56A, and 56B (K3 & K7). Irrigation alerts can be disabled (K8), modified, or deleted (K9).

In some cases, a given end-user has the authorization to monitor conditions or status and/or control irrigation or climate control systems at more than one site (e.g., an agricultural or landscape site). Exemplary systems are shown in FIGS. 1 and 58, with FIG. 58 illustrating multiple sites. That is, referring to FIG. 58, a remote server 50 provides end-users access to one or more sites 1, 2, 3, 4, etc., for which the given user is authorized. Typically, users access the server 50 from remote user devices, such as a notebook or laptop computer 56, desktop computer 58 or mobile computer device 60, such as a smartphone or tablet computer. User devices can connect to the server 50 via the Internet 52 and/or other network (e.g., local or wide area networks). The server 50 is communicationally coupled to devices at the various site via the Internet 52, wireless network 54 (e.g., a cellular or satellite network) and/or other wired or wireless network. At any given site, there may be one or more sensor devices 62 and/or control devices 64, controllers or elements. These devices are separately illustrated, however, it is understood that a device may include both sensor and control functionality. At least one node or device (e.g., device 64) is coupled to a sensor and receives sensor data. At least one node or device is coupled to and controls at least a portion of the irrigation or climate system, e.g., at least one node (e.g., control device 64) is coupled to an irrigation valve controlling the flow of water therethrough. In some cases, a given node or device is a control only device or the node or device is a sensor only device. In other cases, a given node device is both a sensor device and control node device. It is understood that the number of devices at a given site depends on the needs of the irrigation site, e.g., a given site may have 1-n devices, each having sensor and/or control functionality. Further, the server 50 may communicate with local devices at the site through a gateway 66 or other router or network adapter, or otherwise communicate directly with the devices.

Thus, in a general sense, the various methods and systems described herein are applicable to a variety of irrigation and/or climate monitoring and/or control systems, such that authorized users are provided remote access to information from the system/s and/or to remotely control the system/s via interaction with a configurable user interface provided by a server system, such as server 50 (or server 4), in communication with the local system/s. Typically, the server is coupled to a wide area network accessible by the remote users, e.g., coupled to the Internet. The server 50 stores user information, user login and authorization information and system information for many irrigation and/or climate monitoring and/or control systems located at various sites. The server 50 manages access to such sites allowing users only to get access to those systems and sites that the particular user is so authorized, and is not provided access to those systems and sites that the user particular user is not so authorized.

Figure 59:
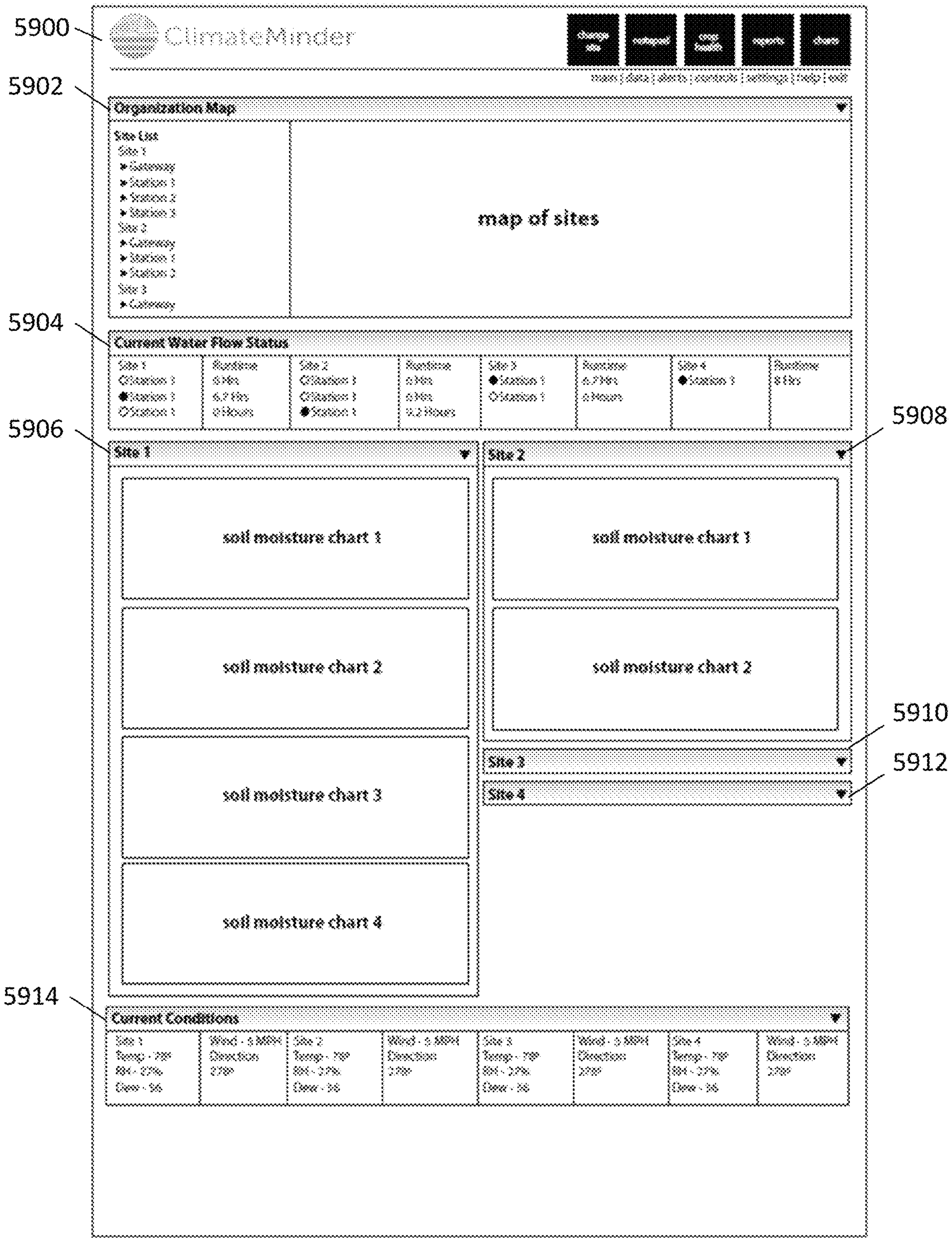

Accordingly, in some embodiments, the various user interfaces described herein may be adapted to allow for the configuration of the displayed information to display information and/or control systems relating to more than one site. In some forms, the status and/or control information or data is displayed in the user interface together to the end-user, e.g., as a dashboard. In some embodiments, data and/or control information for different sites is displayed at the same time to the end-user, and/or in the same window, and/or in adjacent windows viewable at the same time. In some embodiments, this allows the user authorized for multiple sites to monitor and control each of the sites from the same user interface without having to log out of one site at the server, and log in to another site at the server. This ability may apply to any of the embodiments described herein. By way of example, FIG. 59 illustrates a configurable user interface dashboard having configurable windows displaying status and/or control information for multiple sites for which the user is authorized. FIGS. 60-63 further illustrate various exemplary configurable windows/portlets that may be included in any of the user interfaces described herein.

Turning to FIG. 59 in more detail, the dashboard 5900 provides an organizational map window 5902 lists each site and its components or nodes/devices. There may be many configurable windows or portlets, several exemplary ones of which are described below. Window 5902 may also illustrate a map showing the various sites. For a given user with access to multiple sites, a map may be useful for many purposes. The current water flow status window 5904 indicates which stations are on and the runtime for each of the sites, as well as a map that would be used to illustrate a location of the sites. The site chart windows 5906, 5908, 5910 and 5912 provide user configurable (selected, created) charts. For example, soil moisture charts are illustrated for sites 1 and 2, whereas the charts for sites 3 and 4 are collapsed from view, but can be expanded. The current conditions window 5914 displays climate data specific to each site. As is clear, status and/or control data for multiple sites that the user has access to are displayed together to the user. Similar to the embodiments described herein, such windows may be user selected, positioned, sized, etc., such settings saved by the server system so that the user views the information for the multiples sites without requiring that the user log out of one site and log in to another site or switch between different sites.

FIGS. 60-63 illustrate exemplary configurable windows or portlets displaying information from multiple sites to an authorized user. Station map window 6000 of FIG. 60 illustrates a station mapping of various stations for multiple sites, e.g., Acme Field, Gandolf Ranch and Rigley Field being different sites. Also illustrated is a map helpful for the user to visual the relative location of the different sites. For example, an icon (square with star icon) designates a given site. The user can click on an icon to expand further. For example, clicking on one site icon, may enlarge to show the location of the stations for that site. The current Irrigation status window 6100 of FIG. 61 illustrates the current status of irrigation at each site. The current weather status window 6200 of FIG. 62 illustrates the current weather conditions for the different sites. In some embodiments, the weather information, such as forecast data, may be retrieved from external sources, e.g., NOAA, and displayed as part of a window and/or dashboard. The flow meter readings window 6300 of FIG. 63 illustrates the current readings from the flow meters at the different sites for which the user has access. It is noted that not all data is illustrated in FIGS. 61-63 but would be displayed if available in use. Again, the user can view this data together for multiple sites for which the user has access without switching between sites or logging out and into another site.

It is noted that in some embodiments, one or more of the various user interfaces described herein, such as one or more of the dashboards, and/or windows are mobile capable. For example, a user can switch between web and mobile modes. In some embodiments, the user device is detected and if a mobile or tablet device is detected, the screen will adapt itself to the mobile device's screen resolution, and rearrange the windows and menus for easy access from that particular mobile device.

The remote monitoring and control processes described above may be implemented in software, hardware, firmware, or any combination thereof. The processes are preferably implemented in one or more computer programs executing on a programmable computer (which can be part of the central server system 4) including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. For example, the screenshots are provided by way of example only, and can be modified in various ways. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the central server system may comprise a cluster of computers or numerous distributed computers that are connected by the Internet or another network.

Accordingly, the foregoing description and attached drawings are by way of example only, and are not intended to be limiting.

What is claimed is:

1. A remote monitoring and control system for landscape or agricultural environments, each of the landscape or agricultural environments having at least one irrigation zone including at least one irrigation device configured to monitor environmental, soil, or climate conditions and/or configured to control irrigation or climate, the remote monitoring and control system comprising:

a server computer system located remotely from the landscape or agricultural environments, said server computer system communicatively coupled to at least one irrigation device in each landscape or agricultural environment over a communications network and configured to receive data from and control operation of the at least one irrigation device, said server computer system also coupled to client devices operated by end-users over a communications network and wherein the server computer system is configured to transmit data to and receive remote control commands or queries from respective client devices as directed by the end-users for respective one or more of the at least one irrigation device;

wherein said server computer system provides a configurable user interface displayable on the client devices of the end-users, said user interface comprising a dashboard configured to be customized by an end-user to display at least a first map of at least one landscape or agricultural environment selected by the end-user and one or more notes created by the end-user in association with the at least one irrigation zone located in the at least one landscape or agricultural environment selected by the end-user, wherein the user interface is configured such that the dashboard permits the end-user to select a note of the one or more notes within the dashboard to view the note, sort the one or more notes using at least one sorting criteria selected within the dashboard by the end-user, and search for the one or more notes using a search filter defined by at least one search parameter selected within the dashboard by the end-user.

2. The remote monitoring and control system of claim 1, wherein the dashboard permits the end-user to associate the one or more notes with the at least one irrigation device selectable by the end-user and located within the at least one irrigation zone.

3. The remote monitoring and control system of claim 1, wherein the dashboard includes an interactive graphical element which, when selected by an end user, permits the end-user to create a new note.

4. The remote monitoring and control system of claim 3, wherein, during creation of the new note by the end user, the dashboard permits the end-user to select a category of the note, the category including at least one of irrigation, weather, pest and disease, crop, reading, other.

5. The remote monitoring and control system of claim 3, wherein, during creation of the new note by the end user, the dashboard permits the end-user to select a specific irrigation device located in the at least one irrigation zone to be associated with the new note.

6. The remote monitoring and control system of claim 3, wherein, during creation of the new note by the end user, the dashboard permits the end-user to attach one or more files to the new note.

7. The remote monitoring and control system of claim 1, wherein the dashboard includes an interactive graphical element which, when selected by an end user, permits the end-user to expand a list of the one or more notes visible within the dashboard.

8. The remote monitoring and control system of claim 1, wherein, after the end-user selects the note within the dashboard, the dashboard displays the note such that only a text of the note is visible to an end user, and wherein the dashboard includes an interactive graphical element which, when selected by the end-user, permits the end-user to view additional content of the note, the additional content including at least one of: a date when the note was created, an author of the note, at least one irrigation station associated with the note, a sensor reading included in the note, a category of the note, a file attached to the note, importance of the note, and an access level of the note.

9. The remote monitoring and control system of claim 1, wherein the sorting criteria selectable by the end-user within the dashboard to sort the one or more notes include at least one of: a date when the note was created, an author of the note, at least one irrigation station associated with the note, a sensor reading included in the note, a category of the note, importance of the note, and access level of the note.

10. The remote monitoring and control system of claim 1, wherein the at least one search parameter selectable within the dashboard to define the search filter includes at least one of: interval of time when the one or more notes were created, at least one irrigation station associated with the one or more notes, a sensor reading associated with the one or more notes, at least one category of the one or more notes, an end user-selected number of most recent ones of the one or more notes, and an end user-selected number of most recent ones of the one or more notes in an end user-specified category of the one or more notes.

11. A remote monitoring and control system for landscape or agricultural environments, each of the landscape or agricultural environments having at least one irrigation zone including at least one irrigation device configured to monitor environmental, soil, or climate conditions and/or configured to control irrigation or climate, the remote monitoring and control system comprising:

a server computer system located remotely from the landscape or agricultural environments, said server computer system communicatively coupled to at least one irrigation device in each landscape or agricultural environment over a communications network and configured to receive data from and control operation of the at least one irrigation device, said server computer system also coupled to client devices operated by end-users over a communications network and wherein the server computer system is configured to transmit data to and receive remote control commands or queries from respective client devices as directed by the end-users for respective one or more of the at least one irrigation device;

wherein said server computer system provides a configurable user interface displayable on the client devices of the end-users, said user interface comprising a dashboard configured to be customized by each end-user to display at least a first map of at least one landscape or agricultural environment selected by the end-user and data associated with the at least one irrigation zone located within the at least one landscape or agricultural environment displayed on the at least a first map, wherein the user interface is configured such that the dashboard permits the end-user to monitor and control the at least one irrigation device of the at least one irrigation zone located within the at least one landscape or agricultural environment displayed on the at least one map based on an access level authorized for the end-user, and wherein the server computer system provides the end-user with access only to portions of the user interface that the end-user is authorized to access based on the access level authorized for the end-user.

12. The remote monitoring and control system of claim 11, wherein the server computer system stores the data indicating the access level authorized for the end-user.

13. The remote monitoring and control system of claim 11, wherein the server computer system stores the data associated with the at least one irrigation zone located within the at least one landscape or agricultural environment displayed on the at least a first map.

14. The remote monitoring and control system of claim 11, wherein server computer system provides the end-user with access to the at least a first map within the dashboard only if the end-user is authorized to access the at least a first map based on the access level authorized for the end-user.

15. The remote monitoring and control system of claim 14, wherein server computer system provides the end-user with access only to the data associated with the at least one irrigation zone located within the at least one landscape or agricultural environment displayed on the at least a first map that the end-user is authorized to access based on the access level authorized for the end-user.

16. The remote monitoring and control system of claim 11, wherein the user interface requires the end-user to input login information of the end-user, and wherein the server computer system determines whether the login information of the end-user is valid and the access level authorized for the end-user having valid login information.

17. The remote monitoring and control system of claim 16, wherein, based on the access level authorized for the end-user, the server computer system either permits the end-user to access, within the dashboard, only the data associated with the at least one irrigation zone located within one of the landscapes or agricultural environments or the data associated with the at least one irrigation zone located within multiple ones of the landscapes or agricultural environments.

18. The remote monitoring and control system of claim 17, wherein, if the access level authorized for the end-user permits the end-user to access, within the dashboard, the data associated with the at least one irrigation zone located within multiple ones of the landscapes or agricultural environments, the dashboard permits the end-user to simultaneously view the data for the multiple ones of the landscapes or agricultural environments.

19. The remote monitoring and control system of claim 17, wherein, if the access level authorized for the end-user permits the end-user to access, within the dashboard, the data associated with the at least one irrigation zone located within multiple ones of the landscapes or agricultural environments, the dashboard permits the end-user to control the at least one irrigation device located within the multiple ones of the landscapes or agricultural environments.

20. The remote monitoring and control system of claim 17, wherein, if the access level authorized for the end-user permits the end-user to access, within the dashboard, the data associated with the at least one irrigation zone located within multiple ones of the landscapes or agricultural environments, the dashboard permits the end-user, without requiring the end-user to separately log in to each separate one of the landscapes or agricultural environments, to simultaneously view the data for, or control, the at least one irrigation zone located within the multiple ones of the landscapes or agricultural environments.

* * * * *